US012768792B1

(12) United States Patent
LaChapelle et al.

(10) Patent No.: US 12,768,792 B1
(45) Date of Patent: Oct. 20, 2026

(54) RAMAN SPECTROSCOPY SYSTEM FOR MEASUREMENT OF INTRAMOLECULAR VIBRATIONAL COUPLING SIGNAL

(71) Applicant: Haemanthus, Inc., Austin, TX (US)

(72) Inventors: Joseph G. LaChapelle, Austin, TX (US); Roger S. Cannon, Austin, TX (US)

(73) Assignee: Haemanthus, Inc., Austin, TX (US)

( * ) Notice: Subject to any disclaimer, the term of this patent is extended or adjusted under 35 U.S.C. 154(b) by 0 days.

(21) Appl. No.: 19/349,623

(22) Filed: Oct. 3, 2025

Related U.S. Application Data

(60) Provisional application No. 63/854,331, filed on Jul. 30, 2025.

(51) Int. Cl.
*G01N 21/65* (2006.01)

(52) U.S. Cl.
CPC ..... *G01N 21/65* (2013.01); *G01N 2201/0612* (2013.01)

(58) Field of Classification Search
CPC ....................... G01N 21/65; G01N 2201/0612
See application file for complete search history.

(56) References Cited

U.S. PATENT DOCUMENTS 4,193,690 A 3/1980 Levenson et al.
4,598,715 A 7/1986 Machler
4,858,238 A 8/1989 Cardimona
5,106,387 A 4/1992 Kittrell et al.
5,280,788 A 1/1994 Janes
5,418,797 A 5/1995 Bashkansky
5,510,895 A 4/1996 Sahagen
(Continued)

FOREIGN PATENT DOCUMENTS

CN 112097953 12/2020
CN 218739076 3/2023
(Continued)

OTHER PUBLICATIONS

Liu, Xiaosong, et al. "Selective excitation CARS spectroscopy: An efficient method for analysis of vibrational coupling and intramolecular vibrational energy transfer." Vibrational Spectroscopy 116 (2021): 103296 (Year: 2021).*
(Continued)

*Primary Examiner* — Tarifur R Chowdhury
*Assistant Examiner* — Carlos Perez-Guzman
(74) *Attorney, Agent, or Firm* — Sprinkle IP Law Group

(57) ABSTRACT

In one embodiment, a system includes a pump light source and a Stokes light source configured to produce three or more beams of light, where the three or more beams of light have a first pump-Stokes frequency offset $\Omega_1$ and a second pump-Stokes frequency offset $\Omega_2$ different from the first frequency offset. The system also includes one or more optical elements configured to direct the beams of light to a sample, where the three or more beams of light are configured to interact with a particular material in the sample via intramolecular vibrational coupling (IVC) to produce an IVC signal at an IVC frequency. The system further includes an optical receiver configured to measure the IVC signal. The optical receiver includes a probe light source, an optical detector, and an electronic circuit.

25 Claims, 28 Drawing Sheets

(56) References Cited

U.S. PATENT DOCUMENTS

| | | | | |
|---|---|---|---|---|
| 5,526,112 | A | 6/1996 | Sahagen | |
| 5,565,982 | A | 10/1996 | Lee | |
| 5,769,791 | A | 6/1998 | Benaron | |
| 5,849,595 | A | 12/1998 | Alfano | |
| 5,983,125 | A | 11/1999 | Alfano | |
| 6,208,887 | B1 | 3/2001 | Clarke | |
| 6,485,413 | B1 | 11/2002 | Boppart | |
| 6,564,087 | B1 | 5/2003 | Pitris | |
| 7,388,668 | B2 | 6/2008 | Potma et al. | |
| 8,873,041 | B1 * | 10/2014 | Chai | G01J 3/44 356/301 |
| 9,086,533 | B1 | 7/2015 | Wach | |
| 9,594,023 | B2 | 3/2017 | Tamada | |
| 9,638,638 | B2 | 5/2017 | Huber et al. | |
| 9,733,125 | B2 | 8/2017 | Liu et al. | |
| 10,718,668 | B2 | 7/2020 | Gu | |
| 12,203,862 | B1 | 1/2025 | LaChapelle et al. | |
| 12,618,714 | B2 | 5/2026 | LaChapelle et al. | |
| 2002/0122246 | A1 | 9/2002 | Teamey | |
| 2003/0045798 | A1 | 3/2003 | Hular | |
| 2004/0073120 | A1 | 4/2004 | Motz | |
| 2004/0127776 | A1 | 7/2004 | Walker | |
| 2004/0247268 | A1 | 12/2004 | Ishihara | |
| 2005/0153379 | A1 | 7/2005 | Hoon | |
| 2005/0203419 | A1 | 9/2005 | Ramanujam | |
| 2007/0078500 | A1 | 4/2007 | Ryan | |
| 2007/0167836 | A1 | 7/2007 | Scepanovic et al. | |
| 2007/0239033 | A1 | 10/2007 | Teamey | |
| 2008/0037024 | A1 | 2/2008 | Backman | |
| 2008/0214940 | A1 | 9/2008 | Benaron | |
| 2008/0221456 | A1 | 9/2008 | Babchenko | |
| 2008/0267562 | A1 | 10/2008 | Wang | |
| 2008/0304074 | A1 | 12/2008 | Brennan, III | |
| 2009/0088615 | A1 | 4/2009 | Robinson | |
| 2009/0177094 | A1 | 7/2009 | Brown | |
| 2009/0185191 | A1 | 7/2009 | Boppart | |
| 2009/0213370 | A1 | 8/2009 | Kim et al. | |
| 2010/0020318 | A1 | 1/2010 | Lee | |
| 2010/0317964 | A1 | 12/2010 | Hendriks | |
| 2011/0218445 | A1 | 9/2011 | Braun | |
| 2011/0251494 | A1 | 10/2011 | Hendriks | |
| 2011/0270093 | A1 | 11/2011 | Desjardins | |
| 2011/0282166 | A1 | 11/2011 | Chen | |
| 2012/0029360 | A1 | 2/2012 | Hendriks | |
| 2012/0092662 | A1 | 4/2012 | Langbein | |
| 2012/0116234 | A1 | 5/2012 | Farcy | |
| 2012/0220880 | A1 | 8/2012 | Zuluaga | |
| 2012/0287428 | A1 | 11/2012 | Tamada | |
| 2013/0050683 | A1 | 2/2013 | Hendriks | |
| 2013/0217989 | A1 | 8/2013 | Hendriks | |
| 2013/0310680 | A1 | 11/2013 | Werahera | |
| 2014/0046197 | A1 | 2/2014 | Lucassen | |
| 2014/0121538 | A1 | 5/2014 | Hendriks | |
| 2014/0213911 | A1 | 7/2014 | Bierhoff | |
| 2014/0226157 | A1 | 8/2014 | Dogariu | |
| 2014/0236023 | A1 | 8/2014 | Day | |
| 2014/0236024 | A1 | 8/2014 | Bierhoff | |
| 2014/0268131 | A1 | 9/2014 | Tamada | |
| 2014/0354987 | A1 | 12/2014 | Satoh | |
| 2015/0080712 | A1 | 3/2015 | Van Keersop | |
| 2015/0148629 | A1 | 5/2015 | Wilson | |
| 2015/0182206 | A1 | 7/2015 | Hendriks | |
| 2015/0204790 | A1 | 7/2015 | Yonetani | |
| 2015/0265256 | A1 | 9/2015 | Bierhoff | |
| 2015/0313471 | A1 | 11/2015 | Dholakia | |
| 2015/0359525 | A1 | 12/2015 | Hendriks | |
| 2016/0178439 | A1 | 6/2016 | Freudiger et al. | |
| 2016/0256101 | A1 | 9/2016 | Aharoni et al. | |
| 2016/0278694 | A1 | 9/2016 | Aharoni | |
| 2016/0344158 | A1 | 11/2016 | Onose | |
| 2017/0023482 | A1 | 1/2017 | Cicerone et al. | |
| 2017/0052015 | A1 | 2/2017 | Swanson | |
| 2018/0088044 | A1 | 3/2018 | Wijbrans et al. | |
| 2018/0238738 | A1 | 8/2018 | Alfano | |
| 2018/0323572 | A1 | 11/2018 | Mildren et al. | |
| 2020/0003619 | A1 | 1/2020 | Hu | |
| 2020/0015684 | A1 | 1/2020 | Stone | |
| 2020/0085308 | A1 | 3/2020 | Day | |
| 2020/0124530 | A1 | 4/2020 | Stolow et al. | |
| 2021/0068665 | A1 | 3/2021 | Pahlevaninezhad | |
| 2021/0381985 | A1 | 12/2021 | Rigneault | |
| 2021/0404958 | A1 | 12/2021 | Min | |
| 2022/0015635 | A1 | 1/2022 | Sipple | |
| 2022/0042916 | A1 | 2/2022 | Notingher | |
| 2022/0155233 | A1 | 5/2022 | Zeng | |
| 2022/0202292 | A1 | 6/2022 | Anderson | |
| 2022/0317044 | A1 | 10/2022 | Anderson | |
| 2022/0370010 | A1 | 11/2022 | Zilkie | |
| 2022/0409100 | A1 | 12/2022 | Sipple | |
| 2023/0172443 | A1 | 6/2023 | Bec | |
| 2023/0375525 | A1 | 11/2023 | Merritt | |
| 2024/0041328 | A1 | 2/2024 | Mannion | |
| 2024/0057872 | A1 | 2/2024 | Khorasaninejad | |
| 2024/0130171 | A1 * | 4/2024 | Wang | H10K 59/1213 |
| 2024/0131267 | A1 | 4/2024 | Wanner | |
| 2024/0206783 | A1 | 6/2024 | Dubrovsky | |
| 2025/0017471 | A1 | 1/2025 | Goth | |
| 2025/0134386 | A1 | 5/2025 | Puppels | |
| 2025/0244230 | A1 | 7/2025 | Cheng | |
| 2025/0244231 | A1 | 7/2025 | Cheng | |
| 2025/0277699 | A1 | 9/2025 | LaChapelle et al. | |
| 2025/0277701 | A1 | 9/2025 | LaChapelle et al. | |
| 2025/0277702 | A1 | 9/2025 | LaChapelle et al. | |
| 2025/0277742 | A1 | 9/2025 | LaChapelle et al. | |
| 2025/0277743 | A1 | 9/2025 | LaChapelle et al. | |
| 2025/0277744 | A1 | 9/2025 | LaChapelle et al. | |
| 2025/0277745 | A1 | 9/2025 | LaChapelle et al. | |
| 2025/0277746 | A1 | 9/2025 | LaChapelle et al. | |
| 2026/0000341 | A1 | 1/2026 | Alix | |
| 2026/0165585 | A1 | 6/2026 | Stat et al. | |
| 2026/0165587 | A1 | 6/2026 | Cannon et al. | |
| 2026/0165616 | A1 | 6/2026 | Gupta et al. | |
| 2026/0168849 | A1 | 6/2026 | LaChapelle et al. | |
| 2026/0168850 | A1 | 6/2026 | Gupta et al. | |
| 2026/0168862 | A1 | 6/2026 | Cho | |

FOREIGN PATENT DOCUMENTS

| | | |
|---|---|---|
| CN | 116327138 | 6/2023 |
| DE | 10311452 | 4/2006 |
| EP | 1760424 | 3/2007 |
| JP | 2011180504 | 9/2011 |
| JP | 2015222276 | 12/2015 |
| JP | 2016029340 | 3/2016 |
| WO | WO2008144831 | 12/2008 |
| WO | WO2009081358 | 7/2009 |
| WO | WO2013084621 | 6/2013 |
| WO | WO2015121115 | 8/2015 |
| WO | WO2020075548 | 9/2021 |
| WO | WO2022204441 | 9/2022 |
| WO | WO2023/058710 | 4/2023 |
| WO | WO 2023196388 | 10/2023 |

OTHER PUBLICATIONS

Freudiger, Christian W., et al. "Optical heterodyne-detected Raman-induced Kerr effect (OHD-RIKE) microscopy." *The Journal of Physical Chemistry B*, vol. 115, No. 18, Apr. 19, 2011, pp. 5574-5581, https://doi.org/10.1021/jp1113834.

Ideguchi, T., et al. "Raman-Induced Kerr-Effect Dual-Comb Spectroscopy." Optics Letters, vol. 37, No. 21, Oct. 26, 2012, p. 4498, doi:10.1364/ol.37.004498.

Evans, Conor L., et al. "Coherent Anti-Stokes Raman Scattering Spectral Interferometry: Determination of the Real and Imaginary Components of Nonlinear Susceptibility X/\(3) for Vibrational Microscopy." Optics Letters, vol. 29, No. 24, Dec. 15, 2004, p. 2923, doi:10.1364/ol.29.002923.

Potma, Eric O., et al. "Heterodyne Coherent Anti-Stokes Raman Scattering (CARS) Imaging." Optics Letters, vol. 31, No. 2, Jan. 15, 2006, p. 241, doi:10.1364/ol.31.000241.

(56) References Cited

OTHER PUBLICATIONS

Yu, Mengjie, et al. "Silicon-Chip-Based Mid-Infrared Dual-Comb Spectroscopy." *Nature Communications*, vol. 9, No. 1, May 14, 2018, doi:10.1038/s41467-018-04350-1.
Ettabib, Mohamed A., et al. "Waveguide-Enhanced Raman Spectroscopy." *Nature Reviews Methods Primers*, vol. 4, No. 1, Jan. 11, 2024, doi: 10.1038/s43586-023-00281-4.
"Waveguide-Enhanced Raman Spectroscopy." *Nature Reviews Methods Primers*, vol. 4, No. 1, Jan. 11, 2024, doi:10.1038/s43586-024-00290-x.
Moawad, Amira A., et al. "A Machine Learning-Based Raman Spectroscopic Assay for the Identification of Burkholderia Mallei and Related Species." *Molecules*, vol. 24, No. 24, Dec. 10, 2019, p. 4516, doi:10.3390/molecules24244516.
Kita, Derek M., et al. "A Packaged, Fiber-Coupled Waveguide-Enhanced Raman Spectroscopic Sensor." *Optics Express*, vol. 28, No. 10, May 1, 2020, p. 14963, doi:10.1364/OE.392486.
Ye, Jiarong, et al. "Accurate Virus Identification with Interpretable Raman Signatures by Machine Learning." *Proceedings of the National Academy of Sciences*, vol. 119, No. 23, Jun. 2, 2022, doi:10.1073/pnas.2118836119.
Shi-An, Zhang, et al. "Achievement of Narrow-Band CARS Signal by Manipulating Broad-Band Laser Spectrum." Chinese Physics Letters, vol. 25, No. 9, Sep. 2008, pp. 3260-3263, doi:10.1088/0256-307x/25/9/045.
Pegoraro, Adrian F., et al. "All-Fiber CARS Microscopy of Live Cells." Optics Express, vol. 17, No. 23, Oct. 27, 2009, p. 20700, doi:10.1364/oe.17.020700.
Yu, Shixiang, et al. "Analysis of Raman Spectra by Using Deep Learning Methods in the Identification of Marine Pathogens." Analytical Chemistry, vol. 93, No. 32, Aug. 2, 2021, pp. 11089-11098, doi:10.1021/acs.analchem.1c00431.
Jurna, M., et al. "Background Free CARS Imaging by Phase Sensitive Heterodyne CARS." Optics Express, vol. 16, No. 20, Sep. 22, 2008, p. 15863, doi:10.1364/oe.16.015863.
Kuhar, Nikki, et al. "Challenges in Application of Raman Spectroscopy to Biology and Materials." RSC Advances, vol. 8, No. 46, 2018, pp. 25888-25908, doi:10.1039/c8ra04491k.
Marron, Joseph C., et al. "Coherent Detection with an Asynchronous Geiger Mode Array." Imaging and Applied Optics 2015, 2015, doi:10.1364/lsc.2015.lw3d.1.
Brzozowski, K., et al. "Coherent Raman Spectroscopy: Quo Vadis?" Vibrational Spectroscopy, vol. 132, May 2024, p. 103684, doi:10.1016/j.vibspec.2024.103684.
Nakar, Amir, et al. "Detection of Multi-Resistant Clinical Strains of *E. Coli* with Raman Spectroscopy." Analytical and Bioanalytical Chemistry, vol. 414, No. 4, Jan. 4, 2022, pp. 1481-1492, doi:10.1007/s00216-021-03800-y.
Zahn, Jessica, et al. "Discriminating Cell Line Specific Features of Antibiotic-resistant Strains of *Escherichia coli* from Raman Spectra via Machine Learning Analysis." Journal of Biophotonics, vol. 15, No. 7, Apr. 6, 2022, doi:10.1002/jbio.202100274.
Wang, Xi, et al. "Heterodyne Coherent Anti-Stokes Raman Scattering by the Phase Control of Its Intrinsic Background." Physical Review A, vol. 84, No. 2, Aug. 5, 2011, doi:10.1103/physreva.84.021801.
Wang, Xi, et al. "Heterodyne Coherent Anti-Stokes Raman Scattering for Spectral Phase Retrieval and Signal Amplification." Optics Letters, vol. 35, No. 5, Feb. 25, 2010, p. 721, doi:10.1364/ol.35.000721.
Müller, Christina, et al. "Heterodyne Single-beam CARS Microscopy." Journal of Raman Spectroscopy, vol. 40, No. 7, Apr. 8, 2009, pp. 809-816, doi:10.1002/jrs.2260.
Kieu, Khanh, et al. "High-Power Picosecond Fiber Source for Coherent Raman Microscopy." Optics Letters, vol. 34, No. 13, Jun. 29, 2009, p. 2051, doi:10.1364/ol.34.002051.
Xu, Jiabao, et al. "High-Speed Diagnosis of Bacterial Pathogens at the Single Cell Level by Raman Microspectroscopy with Machine Learning Filters and Denoising Autoencoders." ACS Chemical Biology, vol. 17, No. 2, Jan. 13, 2022, pp. 376-385, doi:10.1021/acschembio.1c00834.
Lim, Ryan S., et al. "Identification of Cholesterol Crystals in Plaques of Atherosclerotic Mice Using Hyperspectral CARS Imaging." Journal of Lipid Research, vol. 52, No. 12, Dec. 2011, pp. 2177-2186, doi:10.1194/jlr.m018077.
Lu, Wei, et al. "Improving the Signal-to-Noise Ratio of GM-APD Coherent Lidar System Based on Phase Synchronization Method." Optics & Laser Technology, vol. 150, Jun. 2022, p. 107994, doi:10.1016/j.optlastec.2022.107994.
Ji, Minbiao, et al. "Label-Free Imaging of Amyloid Plaques in Alzheimer's Disease with Stimulated Raman Scattering Microscopy." Science Advances, vol. 4, No. 11, Nov. 2, 2018, doi:10.1126/sciadv.aat7715.
Gottschall, Thomas, et al. "Fiber-based Light Sources for Biomedical Applications of Coherent Anti-stokes Raman Scattering Microscopy." Laser & Photonics Reviews, vol. 9, No. 5, Aug. 6, 2015, pp. 435-451, doi:10.1002/lpor.201500023.
Allen, Ashley, et al. "Miniature Spatial Heterodyne Spectrometer for Remote Laser Induced Breakdown and Raman Spectroscopy Using Fresnel Collection Optics." Spectrochimica Acta Part B: Atomic Spectroscopy, vol. 149, Nov. 2018, pp. 91-98, doi:10.1016/j.sab.2018.07.013.
Lin, Chia-Yu, et al. "Picosecond Spectral Coherent Anti-Stokes Raman Scattering Imaging with Principal Component Analysis of Meibomian Glands." Journal of Biomedical Optics, vol. 16, No. 2, 2011, p. 021104, doi:10.1117/1.3533716.
Germond, Arno, et al. "Raman Spectral Signature Reflects Transcriptomic Features of Antibiotic Resistance in *Escherichia coli*." Communications Biology, vol. 1, No. 1, Jul. 2, 2018, doi:10.1038/s42003-018-0093-8.
Walter, Angela, et al. "Raman Spectroscopic Detection of Physiology Changes in Plasmid-Bearing *Escherichia coli* with and without Antibiotic Treatment." Analytical and Bioanalytical Chemistry, vol. 400, No. 9, Mar. 20, 2011, pp. 2763-2773, doi:10.1007/s00216-011-4819-4.
Yan, Shuaishuai, et al. "Raman Spectroscopy Combined with Machine Learning for Rapid Detection of Food-Borne Pathogens at the Single-Cell Level." Talanta, vol. 226, May 2021, p. 122195, doi:10.1016/j.talanta.2021.122195.
Kukula, Kaitlyn, et al. "Rapid Detection of Bacteria Using Raman Spectroscopy and Deep Learning." 2021 IEEE 11th Annual Computing and Communication Workshop and Conference (CCWC), Jan. 27, 2021, doi:10.1109/ccwc51732.2021.9375955.
Ho, Chi-Sing, et al. "Rapid Identification of Pathogenic Bacteria Using Raman Spectroscopy and Deep Learning." Nature Communications, vol. 10, No. 1, Oct. 30, 2019, doi:10.1038/s41467-019-12898-9.
Lim, Sang-Hyun, et al. "Single-Pulse Phase-Control Interferometric Coherent Anti-Stokes Raman Scattering Spectroscopy." Physical Review A, vol. 72, No. 4, Oct. 17, 2005, doi:10.1103/physreva.72.041803.
Owyoung, Adelbert, et al. "Stimulated Raman Spectroscopy Using Low-Power CW Lasers." Optics Letters, vol. 1, No. 5, Nov. 1, 1977, p. 152, doi:10.1364/ol.1.000152.
Zong, Cheng, et al. "Surface-Enhanced Raman Spectroscopy for Bioanalysis: Reliability and Challenges." Chemical Reviews, vol. 118, No. 10, Apr. 11, 2018, pp. 4946-4980, doi:10.1021/acs.chemrev.7b00668.
Selm, Romedi, et al. "Ultrabroadband Background-Free Coherent Anti-Stokes Raman Scattering Microscopy Based on a Compact ER:Fiber Laser System." Optics Letters, vol. 35, No. 19, Sep. 28, 2010, p. 3282, doi:10.1364/ol.35.003282.
Ashok, Praveen C., et al. "Waveguide Confined Raman Spectroscopy for Microfluidic Interrogation." Lab on a Chip, vol. 11, No. 7, 2011, p. 1262, doi:10.1039/c0lc00462f.
Ettabib, Mohamed A., et al. "Waveguide Enhanced Raman Spectroscopy for Biosensing: A Review." ACS Sensors, vol. 6, No. 6, Jun. 11, 2021, pp. 2025-2045, doi:10.1021/acssensors.1c00366.
Tyndall, Nathan F., et al. "Waveguide-Enhanced Raman Spectroscopy of Trace Chemical Warfare Agent Simulants." Optics Letters, vol. 43, No. 19, Sep. 28, 2018, p. 4803, doi:10.1364/ol.43.004803.

(56) References Cited

OTHER PUBLICATIONS

Tyndall, Nathan F., et al. "Foundry-Based Waveguide-Enhanced Raman Spectroscopy in the Visible." Optics Express, vol. 32, No. 4, Jan. 29, 2024, p. 4745, doi:10.1364/oe.504195.
Ettabib, Mohamed A., et al. "Grating-Incoupled Waveguide-Enhanced Raman Sensor." PLOS ONE, vol. 18, No. 8, Aug. 10, 2023, doi:10.1371/journal.pone.0284058.
Ettabib, Mohamed A., et al. "Optimized Design for Grating-Coupled Waveguide-Enhanced Raman Spectroscopy." Optics Express, vol. 28, No. 25, Nov. 23, 2020, p. 37226, doi:10.1364/oe.410602.
Turk, Nina, et al. "Waveguide-Based Surface-Enhanced Raman Spectroscopy Detection of Protease Activity Using Non-Natural Aromatic Amino Acids." Biomedical Optics Express, vol. 11, No. 8, Jul. 31, 2020, p. 4800, doi:10.1364/boe.398038.
Robertson, John L., et al. "Alterations in the Molecular Composition of COVID-19 Patient Urine, Detected Using Raman Spectroscopic/Computational Analysis." PLOS ONE, vol. 17, No. 7, Jul. 18, 2022, doi:10.1371/journal.pone.0270914.
Robertson, John L., et al. "Cancer Detection in Dogs Using Rapid Raman Molecular Urinalysis." Frontiers in Veterinary Science, vol. 11, Feb. 7, 2024, doi:10.3389/fvets.2024.1328058.
Schröder, Ulrich-Christian, et al. "Combined Dielectrophoresis-Raman Setup for the Classification of Pathogens Recovered from the Urinary Tract." Analytical Chemistry, vol. 85, No. 22, Nov. 6, 2013, pp. 10717-10724, doi:10.1021/ac4021616.
Bispo, Jeyse Aliana, et al. "Correlating the Amount of Urea, Creatinine, and Glucose in Urine from Patients with Diabetes Mellitus and Hypertension with the Risk of Developing Renal Lesions by Means of Raman Spectroscopy and Principal Component Analysis." Journal of Biomedical Optics, vol. 18, No. 8, Aug. 8, 2013, p. 087004, doi:10.1117/1.jbo.18.8.087004.
Kloß, Sandra, et al. "Culture Independent Raman Spectroscopic Identification of Urinary Tract Infection Pathogens: A Proof of Principle Study." Analytical Chemistry, vol. 85, No. 20, Sep. 24, 2013, pp. 9610-9616, doi:10.1021/ac401806f.
Hu, Dayu, et al. "Detecting Urine Metabolites of Bladder Cancer by Surface-Enhanced Raman Spectroscopy." Spectrochimica Acta Part A: Molecular and Biomolecular Spectroscopy, vol. 247, Feb. 2021, p. 119108, doi:10.1016/j.saa.2020.119108.
Senger, Ryan S., et al. "Disease-Associated Multimolecular Signature in the Urine of Patients with Lyme Disease Detected Using Raman Spectroscopy and Chemometrics." Applied Spectroscopy, vol. 76, No. 3, Feb. 1, 2022, pp. 284-299, doi:10.1177/00037028211061769.
Brindha, Elumalai, et al. "High Wavenumber Raman Spectroscopy in the Characterization of Urinary Metabolites of Normal Subjects, Oral Premalignant and Malignant Patients." Spectrochimica Acta Part A: Molecular and Biomolecular Spectroscopy, vol. 171, Jan. 2017, pp. 52-59, doi:10.1016/j.saa.2016.06.048.
Bhattacharjee, T., et al. "A Preliminary Raman Spectroscopic Study of Urine: Diagnosis of Breast Cancer in Animal Models." The Analyst, vol. 140, No. 2, 2015, pp. 456-466, doi:10.1039/c4an01703j.
Huttanus, Herbert M., et al. "Raman Chemometric Urinalysis (Rametrix) as a Screen for Bladder Cancer." PLOS ONE, vol. 15, No. 8, Aug. 21, 2020, doi:10.1371/journal.pone.0237070.
Moreira, Letícia Parada, et al. "Raman Spectroscopy Applied to Identify Metabolites in Urine of Physically Active Subjects." Journal of Photochemistry and Photobiology B: Biology, vol. 176, Nov. 2017, pp. 92-99, doi:10.1016/j.jphotobiol.2017.09.019.
Mcmurdy, John W., et al. "Raman Spectroscopy-Based Creatinine Measurement in Urine Samples from a Multipatient Population." Applied Spectroscopy, vol. 57, No. 5, May 2003, pp. 522-525, doi:10.1366/000370203321666533.
Jeng, Ming-Jer, et al. "Raman Spectral Characterization of Urine for Rapid Diagnosis of Acute Kidney Injury." Journal of Clinical Medicine, vol. 11, No. 16, Aug. 18, 2022, p. 4829, doi:10.3390/jcm11164829.
Zhang, Xueqin, et al. "Rapid Diagnosis of Membranous Nephropathy Based on Serum and Urine Raman Spectroscopy Combined with Deep Learning Methods." Scientific Reports, vol. 13, No. 1, Feb. 28, 2023, doi:10.1038/s41598-022-22204-1.
Senger, Ryan S., et al. "Spectral Characteristics of Urine Specimens from Healthy Human Volunteers Analyzed Using Raman Chemometric Urinalysis (Rametrix)." PLOS ONE, vol. 14, No. 9, Sep. 27, 2019, doi:10.1371/journal.pone.0222115.
Dawuti, Wubulitalifu, et al. "Urine Surface-Enhanced Raman Spectroscopy Combined with SVM Algorithm for Rapid Diagnosis of Liver Cirrhosis and Hepatocellular Carcinoma." Photodiagnosis and Photodynamic Therapy, vol. 38, Jun. 2022, p. 102811, doi:10.1016/j.pdpdt.2022.102811.
Vigo, Francesco, et al. "Vibrational Spectroscopy in Urine Samples as a Medical Tool: Review and Overview on the Current State-of-the-Art." Diagnostics, vol. 13, No. 1, Dec. 22, 2022, p. 27, doi:10.3390/diagnostics13010027.
Sahu, Avinash, et al. A Novel Lab-on-Chip Cartridge Overcoming Centrifugation and Slide Preparation for Automated Urinalysis, Jan. 19, 2024, doi:10.21203/rs.3.rs-3872166/v1.
Álvarez, Rosa, et al. "Raman Spectroscopic Study of the Conformational Changes of Thyroxine Induced by Interactions with Phospholipid." European Biophysics Journal, vol. 31, No. 6, Oct. 1, 2002, pp. 448-453, doi:10.1007/s00249-002-0238-y.
Li, Yizhe, et al. "Serum Raman Spectroscopy Combined with Deep Neural Network for Analysis and Rapid Screening of Hyperthyroidism and Hypothyroidism." Photodiagnosis and Photodynamic Therapy, vol. 35, Sep. 2021, p. 102382, doi:10.1016/j.pdpdt.2021.102382.
Medina-Gutiérrez, C., et al. "The Application of NIR Raman Spectroscopy in the Assessment of Serum Thyroid-Stimulating Hormone in Rats." Spectrochimica Acta Part A: Molecular and Biomolecular Spectroscopy, vol. 61, No. 1-2, Jan. 2005, pp. 87-91, doi:10.1016/j.saa.2004.03.016.
V. K. Rizzon, et al. "Thyroxine: A Theoretical Study of the Vibrational and Electronic Properties." Quarks: Brazilian Electronic Journal of Physics, Chemistry and Materials Science, vol. 3, No. 1, Nov. 28, 2020, pp. 31-40, doi:10.34019/2674-9688.2020.v3.30941.
Borah, Mukunda Madhab, et al. "Vibrational Studies of Thyroxine Hormone: Comparative Study with Quantum Chemical Calculations." Journal of Molecular Structure, vol. 1148, Nov. 2017, pp. 293-313, doi:10.1016/j.molstruc.2017.07.063.
Burns, Kristen H., et al. "Absolute Cross Sections of Liquids from Broadband Stimulated Raman Scattering with Femtosecond and Picosecond Pulses." Analytical Chemistry, vol. 92, No. 15, Jun. 29, 2020, pp. 10686-10692, doi:10.1021/acs.analchem.0c01785.
Li, Nan, et al. "A Noninvasive Accurate Measurement of Blood Glucose Levels with Raman Spectroscopy of Blood in Microvessels." Molecules, vol. 24, No. 8, Apr. 17, 2019, p. 1500, doi:10.3390/molecules24081500.
Lundsgaard-Nielsen, Signe M., et al. "Critical-Depth Raman Spectroscopy Enables Home-Use Non-Invasive Glucose Monitoring." PLOS ONE, vol. 13, No. 5, May 11, 2018, doi:10.1371/journal.pone.0197134.
Anand, Jaskaran Singh. "Development of an Electrochemical Surface Enhanced Raman Spectroscopy (EC-SERS) Fabric Sensor to Detect Cortisol for Early Diagnosis of Post-Traumatic Stress Disorder." Saint Mary's University, 2022.
Golparvar, Ata, et al. "Soft Epidermal Paperfluidics for Sweat Analysis by Ratiometric Raman Spectroscopy." Biosensors, vol. 14, No. 1, Dec. 25, 2023, p. 12, doi:10.3390/bios14010012.
Ju, Jian, et al. "Surface Enhanced Raman Spectroscopy Based Biosensor with a Microneedle Array for Minimally Invasive in Vivo Glucose Measurements." ACS Sensors, vol. 5, No. 6, May 19, 2020, pp. 1777-1785, doi:10.1021/acssensors.0c00444.
Liu, Guoran, et al. "Surface-Enhanced Raman Scattering as a Potential Strategy for Wearable Flexible Sensing and Point-of-Care Testing Non-Invasive Medical Diagnosis." Frontiers in Chemistry, vol. 10, Nov. 3, 2022, doi:10.3389/fchem.2022.1060322.
Carlomagno, C., et al. "Human Salivary Raman Fingerprint as Biomarker for the Diagnosis of Amyotrophic Lateral Sclerosis." Scientific Reports, vol. 10, No. 1, Jun. 23, 2020, doi:10.1038/s41598-020-67138-8.

(56) References Cited

OTHER PUBLICATIONS

Hardy, Mike, et al. "Methods in Raman Spectroscopy for Saliva Studies—A Review." Applied Spectroscopy Reviews, vol. 57, No. 3, Aug. 30, 2021, pp. 177-233, doi:10.1080/05704928.2021.1969944.
Calado, Genecy, et al. "Raman Spectroscopic Characterisation of Non Stimulated and Stimulated Human Whole Saliva." Clinical Spectroscopy, vol. 3, Dec. 2021, p. 100010, doi:10.1016/j.clispe.2021.100010.
Buchan, Emma, et al. "Raman Spectroscopic Molecular Fingerprinting of Biomarkers for Inflammatory Bowel Disease." Clinical and Translational Medicine, vol. 13, No. 11, Nov. 2023, doi:10.1002/ctm2.1345.
Pahlow, Susanne, et al. "Application of Vibrational Spectroscopy and Imaging to Point-of-Care Medicine: A Review." Applied Spectroscopy, vol. 72, No. 1_suppl, Sep. 2018, pp. 52-84, doi:10.1177/0003702818791939.
Baker, Matthew J., et al. "Clinical Applications of Infrared and Raman Spectroscopy: State of Play and Future Challenges." The Analyst, vol. 143, No. 8, 2018, pp. 1735-1757, doi:10.1039/c7an01871a.
Atkins, Chad G., et al. "Raman Spectroscopy of Blood and Blood Components." Applied Spectroscopy, vol. 71, No. 5, Apr. 11, 2017, pp. 767-793, doi:10.1177/0003702816686593.
Freudiger, Christian W., et al. "Label-Free Biomedical Imaging with High Sensitivity by Stimulated Raman Scattering Microscopy." Science, vol. 322, No. 5909, Dec. 19, 2008, pp. 1857-1861, doi:10.1126/science.1165758.
Casacio, Catxere A., et al. "Quantum-Enhanced Nonlinear Microscopy." Nature, vol. 594, No. 7862, Jun. 9, 2021, pp. 201-206, doi:10.1038/s41586-021-03528-w.
Saar, Brian G., et al. "Video-Rate Molecular Imaging in Vivo with Stimulated Raman Scattering." Science, vol. 330, No. 6009, Dec. 3, 2010, pp. 1368-1370, doi:10.1126/science.1197236.
Borges, Rita De, et al. "Detecting Alterations of Glucose and Lipid Components in Human Serum by Near-Infrared Raman Spectroscopy." Research on Biomedical Engineering, vol. 31, No. 2, Jun. 2015, pp. 160-168, doi:10.1590/2446-4740.0593.
Gracie, Kirsten, et al. "Detection of Cortisol in Serum Using Quantitative Resonance Raman Spectroscopy." Analytical Methods, vol. 9, No. 10, 2017, pp. 1589-1594, doi:10.1039/c6ay03296f.
"Detection of Glucose Levels Using Excitation and Difference Raman Spectroscopy at the IUSL." (2004).
El-Mashtoly, Samir F., et al. "Diagnostics and Therapy Assessment Using Label-Free Raman Imaging." Analytical Chemistry, vol. 94, No. 1, Dec. 1, 2021, pp. 120-142, doi:10.1021/acs.analchem.1c04483.
Shao, Jingwei, et al. "In Vivo Blood Glucose Quantification Using Raman Spectroscopy." PLOS ONE, vol. 7, No. 10, Oct. 25, 2012, doi:10.1371/journal.pone.0048127.
Tubbesing, Kate, et al. "Iron-Binding Cellular Profile of Transferrin Using Label-Free Raman Hyperspectral Imaging and Singular Value Decomposition (SVD)." Free Radical Biology and Medicine, vol. 169, Jun. 2021, pp. 416-424, doi:10.1016/j.freeradbiomed.2021.04.030.
Berger, Andrew J., et al. "Multicomponent Blood Analysis by Near-Infrared Raman Spectroscopy." Applied Optics, vol. 38, No. 13, May 1, 1999, p. 2916, doi:10.1364/ao.38.002916.
Kawagoe, Hiroyuki, et al. "Multiwell Raman Plate Reader for High-Throughput Biochemical Screening." Scientific Reports, vol. 11, No. 1, Aug. 3, 2021, doi:10.1038/s41598-021-95139-8.
Bergholt, M. S., et al. "Quantification of C-Reactive Protein in Human Blood Plasma Using near-Infrared Raman Spectroscopy." The Analyst, vol. 134, No. 10, 2009, p. 2123, doi:10.1039/b903089a.
Byrne, Hugh J., et al. "Quantitative Analysis of Human Blood Serum Using Vibrational Spectroscopy." Clinical Spectroscopy, vol. 2, Dec. 2020, p. 100004, doi:10.1016/j.clispe.2020.100004.
Pelletier, M. J. "Quantitative Analysis Using Raman Spectrometry." Applied Spectroscopy, vol. 57, No. 1, Jan. 2003, doi:10.1366/000370203321165133.
Shih, Wei-Chuan, et al. "Quantitative Biological Raman Spectroscopy." Handbook of Optical Sensing of Glucose in Biological Fluids and Tissues, Editor: Valery V. Tuchin (Taylor & Francis 2008), pp. 365-397.
Parachalil, Drishya Rajan, et al. "Raman Spectroscopic Screening of High and Low Molecular Weight Fractions of Human Serum." The Analyst, vol. 144, No. 14, 2019, pp. 4295-4311, doi:10.1039/c9an00599d.
Ricciardi, Alessandra, et al. "Raman Spectroscopy Characterization of the Major Classes of Plasma Lipoproteins." Vibrational Spectroscopy, vol. 109, Jul. 2020, p. 103073, doi:10.1016/j.vibspec.2020.103073.
Dodo, Kosuke, et al. "Raman Spectroscopy for Chemical Biology Research." Journal of the American Chemical Society, vol. 144, No. 43, Oct. 10, 2022, pp. 19651-19667, doi:10.1021/jacs.2c05359.
Sheehy, Guillaume, et al. "Open-Sourced Raman Spectroscopy Data Processing Package Implementing a Baseline Removal Algorithm Validated from Multiple Datasets Acquired in Human Tissue and Biofluids." Journal of Biomedical Optics, vol. 28, No. 02, Feb. 21, 2023, doi:10.1117/1.jbo.28.2.025002.
Schmidt, Robert W, et al. "RamanLIGHT—a Graphical User-Friendly Tool for Pre-Processing and Unmixing Hyperspectral Raman Spectroscopy Images." Journal of Optics, vol. 24, No. 6, May 6, 2022, p. 064011, doi:10.1088/2040-8986/ac6883.
Senger, Ryan S., et al. "The RametrixTM pro Toolbox v1.0 for Matlab®." PeerJ, vol. 8, Jan. 6, 2020, doi:10.7717/peerj.8179.
Chen, Kuan-Hung, et al. "A 3D-ACEK/SERS System for Highly Efficient and Selectable Electrokinetic Bacteria Concentration/Detection/ Antibiotic-Susceptibility-Test on Whole Blood." Biosensors and Bioelectronics, vol. 197, Feb. 2022, p. 113740, doi:10.1016/j.bios.2021.113740.
Carlomagno, C., et al. "Covid-19 Salivary Raman Fingerprint: Innovative Approach for the Detection of Current and Past SARS-COV-2 Infections." Scientific Reports, vol. 11, No. 1, Mar. 2, 2021, doi:10.1038/s41598-021-84565-3.
Novelli-Rousseau, A., et al. "Culture-Free Antibiotic-Susceptibility Determination from Single-Bacterium Raman Spectra." Scientific Reports, vol. 8, No. 1, Mar. 2, 2018, doi:10.1038/s41598-018-22392-9.
Deckert, Volker, et al. "Laser Spectroscopic Technique for Direct Identification of a Single Virus I: Faster Cars." Proceedings of the National Academy of Sciences, vol. 117, No. 45, Oct. 22, 2020, pp. 27820-27824, doi:10.1073/pnas.2013169117.
Ali, Ahmed, et al. "Miniaturized Raman Instruments for SERS-Based Point-of-Care Testing on Respiratory Viruses." Biosensors, vol. 12, No. 8, Aug. 2, 2022, p. 590, doi:10.3390/bios12080590.
Duarte, Janaína, et al. "Near-Infrared Raman Spectroscopy to Detect Anti-Toxoplasma Gondii Antibody in Blood Sera of Domestic Cats: Quantitative Analysis Based on Partial Least-Squares Multivariate Statistics." Journal of Biomedical Optics, vol. 15, No. 4, 2010, p. 047002, doi:10.1117/1.3463006.
Brewster, Victoria L., et al. "Monitoring the Glycosylation Status of Proteins Using Raman Spectroscopy." Analytical Chemistry, vol. 83, No. 15, Jul. 7, 2011, pp. 6074-6081, doi:10.1021/ac2012009.
Acri, Giuseppe, et al. "Raman Spectroscopy as Noninvasive Method of Diagnosis of Pediatric Onset Inflammatory Bowel Disease." Applied Sciences, vol. 10, No. 19, Oct. 5, 2020, p. 6974, doi:10.3390/app10196974.
Westley, Chloe, et al. "Real-time Monitoring of Enzyme-catalysed Reactions Using Deep UV Resonance Raman Spectroscopy." Chemistry—A European Journal, vol. 23, No. 29, May 2, 2017, pp. 6983-6987, doi:10.1002/chem.201701388.
Larmour, Iain A., et al. "The Past, Present and Future of Enzyme Measurements Using Surface Enhanced Raman Spectroscopy." Chemical Science, vol. 1, No. 2, 2010, p. 151, doi:10.1039/c0sc00226g.
Fan, Xiaqiong, et al. "A Universal and Accurate Method for Easily Identifying Components in Raman Spectroscopy Based on Deep Learning." Analytical Chemistry, vol. 95, No. 11, Mar. 13, 2023, pp. 4863-4870, doi:10.1021/acs.analchem.2c03853.

(56) References Cited

OTHER PUBLICATIONS

Fan, Xiaqiong, et al. "A Universal and Accurate Method for Easily Identifying Components in Raman Spectroscopy Based on Deep Learning—Supporting Information." Analytical Chemistry, vol. 95, No. 11, Mar. 13, 2023, doi:10.1021/acs.analchem.2c03853.s001.
Luo, Ruihao, et al. "Deep Learning for Raman Spectroscopy: A Review." Analytica, vol. 3, No. 3, Jul. 19, 2022, pp. 287-301, doi:10.3390/analytica3030020.
Fan, Xiaqiong, et al. "Deep Learning-Based Component Identification for the Raman Spectra of Mixtures." The Analyst, vol. 144, No. 5, 2019, pp. 1789-1798, doi:10.1039/c8an02212g.
Jensen, Emil Alstrup, et al. "Label-Free Blood Typing by Raman Spectroscopy and Artificial Intelligence." Advanced Materials Technologies, vol. 9, No. 2, Dec. 6, 2023, doi:10.1002/admt.202301462.
Qi, Yaping, et al. "Recent Progresses in Machine Learning Assisted Raman Spectroscopy." Advanced Optical Materials, vol. 11, No. 14, Apr. 26, 2023, doi:10.1002/adom.202203104.
Lopes, Daniela Franco, et al. "Characterization of Biomarkers in Blood Serum for Cancer Diagnosis in Dogs Using Raman Spectroscopy." Journal of Biophotonics, vol. 17, No. 3, Dec. 15, 2023, doi:10.1002/jbio.202300338.
Papadakis, Vassilis M., et al. "Label-Free Human Disease Characterization through Circulating Cell-Free DNA Analysis Using Raman Spectroscopy." International Journal of Molecular Sciences, vol. 24, No. 15, Aug. 3, 2023, p. 12384, doi:10.3390/ijms241512384.
Shin, Hyunku, et al. "Single Test-Based Diagnosis of Multiple Cancer Types Using Exosome-SERS-AI for Early Stage Cancers." Nature Communications, vol. 14, No. 1, Mar. 24, 2023, doi:10.1038/s41467-023-37403-1.
Maiti, Kiran Sankar, et al. "Detection of Disease-Specific Volatile Organic Compounds Using Infrared Spectroscopy." The 16th International Workshop on Advanced Infrared Technology & Applications, Nov. 22, 2021, doi:10.3390/engproc2021008015.
Hanf, Stefan, et al. "Fast and Highly Sensitive Fiber-Enhanced Raman Spectroscopic Monitoring of Molecular H2 and CH4 for Point-of-Care Diagnosis of Malabsorption Disorders in Exhaled Human Breath." Analytical Chemistry, vol. 87, No. 2, Dec. 29, 2014, pp. 982-988, doi:10.1021/ac503450y.
Bögözi, Timea, et al. "Fiber-Enhanced Raman Multi-Gas Spectroscopy: What Is the Potential of Its Application to Breath Analysis?" Bioanalysis, vol. 7, No. 3, Feb. 2015, pp. 281-284, doi:10.4155/bio.14.299.
Huang, Liping, et al. "Noninvasive Diagnosis of Gastric Cancer Based on Breath Analysis with a Tubular Surface-Enhanced Raman Scattering Sensor." ACS Sensors, vol. 7, No. 5, May 13, 2022, pp. 1439-1450, doi:10.1021/acssensors.2c00146.
Popov, Evgeniy, et al. "Raman Spectroscopy for Urea Breath Test." Biosensors, vol. 13, No. 6, Jun. 2, 2023, p. 609, doi:10.3390/bios13060609.
Shen, Yujie, et al. "A Versatile Setup Using Femtosecond Adaptive Spectroscopic Techniques for Coherent Anti-Stokes Raman Scattering." Review of Scientific Instruments, vol. 86, No. 8, Aug. 1, 2015, doi:10.1063/1.4929380.
Shutova, Mariia, et al. "Adaptive Optics Approach to Surface-Enhanced Raman Scattering." Optics Letters, vol. 45, No. 13, Jun. 30, 2020, p. 3709, doi:10.1364/ol.394548.
Christopher B. Marble, et al. "Biomedical Optics Applications of Advanced Lasers and Nonlinear Optics." Journal of Biomedical Optics, vol. 25, No. 04, Apr. 23, 2020, p. 1, doi:10.1117/1.jbo.25.4.040902.
Shutov, Anton D., et al. "Coherent Anti-Stokes Raman Scattering Microspectroscopy: An Emerging Technique for Non-Invasive Optical Assessment of a Local Bio-Nano-Environment." IEEE Journal of Selected Topics in Quantum Electronics, vol. 27, No. 5, Sep. 2021, pp. 1-6, doi:10.1109/jstqe.2021.3083687.
Shutova, Mariia, et al. "Coherent Raman Generation Controlled by Wavefront Shaping." Scientific Reports, vol. 9, No. 1, Feb. 7, 2019, doi:10.1038/s41598-018-38302-y.
Arora, Rajan, et al. "Detecting Anthrax in the Mail by Coherent Raman Microspectroscopy." Proceedings of the National Academy of Sciences, vol. 109, No. 4, Jan. 3, 2012, pp. 1151-1153, doi:10.1073/pnas.1115242108.
Petrov, Georgi I., et al. "Detection of Bacillus Subtilis Spores in Water by Means of Broadband Coherent Anti-Stokes Raman Spectroscopy." Optics Express, vol. 13, No. 23, 2005, p. 9537, doi:10.1364/opex.13.009537.
Traverso, Andrew J., et al. "Dual Raman-Brillouin Microscope for Chemical and Mechanical Characterization and Imaging." Analytical Chemistry, vol. 87, No. 15, Jul. 24, 2015, pp. 7519-7523, doi:10.1021/acs.analchem.5b02104.
Petrov, Georgi I., et al. "Electronically Tunable Coherent Raman Spectroscopy Using Acousto-Optics Tunable Filter." Optics Express, vol. 23, No. 19, Sep. 10, 2015, p. 24669, doi:10.1364/oe.23.024669.
Hokr, Brett H., et al. "Enabling Time Resolved Microscopy with Random Raman Lasing." Scientific Reports, vol. 7, No. 1, Mar. 15, 2017, doi:10.1038/srep44572.
Zhu, Hanlin, et al. "Enhanced Chemical Sensing with Multiorder Coherent Raman Scattering Spectroscopic Dephasing." Analytical Chemistry, vol. 94, No. 23, May 27, 2022, pp. 8409-8415, doi:10.1021/acs.analchem.2c01060.
Zhang, Zhedong, et al. "Entangled Photons Enabled Time-Frequency- Resolved Coherent Raman Spectroscopy and Applications to Electronic Coherences at Femtosecond Scale." Light: Science & Applications, vol. 11, No. 1, Sep. 14, 2022, doi:10.1038/s41377-022-00953-y.
Hokr, Brett H., et al. "Higher Order Processes in Random Raman Lasing." Applied Physics A, vol. 117, No. 2, Aug. 27, 2014, pp. 681-685, doi:10.1007/s00339-014-8722-7.
Shutov, Anton D., et al. "Highly Efficient Tunable Picosecond Deep Ultraviolet Laser System for Raman Spectroscopy." Optics Letters, vol. 44, No. 23, Nov. 27, 2019, p. 5760, doi:10.1364/ol.44.005760.
Zhang, Yingchao, et al. "Improving Resolution in Quantum Subnanometre-Gap Tip-Enhanced Raman Nanoimaging." Scientific Reports, vol. 6, No. 1, May 25, 2016, doi:10.1038/srep25788.
Altangerel, Narangerel, et al. "In Vivo Diagnostics of Early Abiotic Plant Stress Response via Raman Spectroscopy." Proceedings of the National Academy of Sciences, vol. 114, No. 13, Mar. 13, 2017, pp. 3393-3396, doi:10.1073/pnas.1701328114.
Altangerel, Narangerel, et al. "Label-Free Drug Interaction Screening via Raman Microscopy." Proceedings of the National Academy of Sciences, vol. 120, No. 30, Jul. 18, 2023, doi:10.1073/pnas.2218826120.
Meng, Zhaokai, et al. "Lightweight Raman Spectroscope Using Time-Correlated Photon-Counting Detection." Proceedings of the National Academy of Sciences, vol. 112, No. 40, Sep. 21, 2015, pp. 12315-12320, doi:10.1073/pnas.1516249112.
Shen, Yujie, et al. "Picosecond Supercontinuum Generation in Large Mode Area Photonic Crystal Fibers for Coherent Anti-Stokes Raman Scattering Microspectroscopy." Scientific Reports, vol. 8, No. 1, Jun. 22, 2018, doi:10.1038/s41598-018-27811-5.
Meng, Zhaokai, et al. "Pure Electrical, Highly-Efficient and Sidelobe Free Coherent Raman Spectroscopy Using Acousto-Optics Tunable Filter (AOTF)." Scientific Reports, vol. 6, No. 1, Feb. 1, 2016, doi:10.1038/srep20017.
Altangerel, Narangerel, et al. "Raman Spectroscopy as a Robust New Tool for Rapid and Accurate Evaluation of Drought Tolerance Levels in Both Genetically Diverse and Near-Isogenic Maize Lines." Frontiers in Plant Science, vol. 12, Jul. 12, 2021, doi:10.3389/fpls.2021.621711.
Thompson, Jonathan V., et al. "Single-Shot Chemical Detection and Identification with Compressed Hyperspectral Raman Imaging." Optics Letters, vol. 42, No. 11, May 30, 2017, p. 2169, doi:10.1364/ol.42.002169.
Yakovlev, Vladislav V., et al. "Stimulated Raman Photoacoustic Imaging." Proceedings of the National Academy of Sciences, vol. 107, No. 47, Nov. 8, 2010, pp. 20335-20339, doi:10.1073/pnas.1012432107.
Zhu, Hanlin, et al. "Time-Resolved Vibrational Dynamics: Novel Opportunities for Sensing and Imaging." Talanta, vol. 266, Jan. 2024, p. 125046, doi:10.1016/j.talanta.2023.125046.

(56) References Cited

OTHER PUBLICATIONS

Traverso, Andrew J., et al. "Two-Photon Infrared Resonance Can Enhance Coherent Raman Scattering." Physical Review Letters, vol. 120, No. 6, Feb. 6, 2018, doi:10.1103/physrevlett.120.063602.
Karpf, Sebastian, et al. "A Time-Encoded Technique for Fibre-Based Hyperspectral Broadband Stimulated Raman Microscopy." Nature Communications, vol. 6, No. 1, Apr. 17, 2015, doi:10.1038/ncomms7784.
Safir, Fareeha, et al. "Combining Acoustic Bioprinting with AI-Assisted Raman Spectroscopy for High-Throughput Identification of Bacteria in Blood." Nano Letters, vol. 23, No. 6, Mar. 1, 2023, pp. 2065-2073, doi:10.1021/acs.nanolett.2c03015.
Song, Jeonggeun, et al. "Swept-Source Raman Spectroscopy of Chemical and Biological Materials." Journal of Biomedical Optics, vol. 29, No. S2, Apr. 3, 2024, doi:10.1117/1.jbo.29.s2.s22703.
Koster, Hanna J., et al. "Fused Raman Spectroscopic Analysis of Blood and Saliva Delivers High Accuracy for Head and Neck Cancer Diagnostics." Scientific Reports, vol. 12, No. 1, Nov. 2, 2022, doi:10.1038/s41598-022-22197-x.
Hobbs, Philip C.D., "Ultrasensitive Laser Measurements without Tears." Optical Society of America, vol. 36, No. 4, Feb. 1, 1997, pp. 903-920.
Notice of Allowance issued for U.S. Appl. No. 18/762,412, mailed Sep. 9, 2024, 10 pages.
International Search Report and Written Opinion issued for International Application No. PCT/US2024/053635, mailed Nov. 21, 2024, 6 pages.
Wolfe, T. J., et al. "A study of major cannabinoids via Raman spectroscopy and density functional theory." Spectrochimica Acta Part A: Molecular and Biomolecular Spectroscopy, vol. 303, Jul. 11, 2023, p. 123133, https://doi.org/10.1016/j.saa.2023.123133.
Hédoux, A., et al. "Raman spectroscopy of racemic ibuprofen: Evidence of molecular disorder in phase II." International Journal of Pharmaceutics, vol. 421, No. 1, 2011, pp. 45-52, https://doi.org/10.1016/j.ijpharm.2011.09.015.
Zhang, S., et al. "Raman spectroscopy study on xylitol at low- and high-temperature conditions." Journal of Molecular Structure, vol. 1321, No. 3, 2025, p. 140032, https://doi.org/10.1016/j.molstruc.2024.140032.
Balcers, O., et al. "Study of ergocalciferol and cholecalciferol (Vitamin D): Modeled optical properties and optical detection using absorption and Raman spectroscopy." Spectrochimica Acta Part A: Molecular and Biomolecular Spectroscopy, vol. 269, 2022, p. 120725, https://doi.org/10.1016/j.saa.2021.120725.
Jenkins, C. A., et al. "A high-throughput serum Raman spectroscopy platform and methodology for colorectal cancer diagnostics." Analyst, vol. 143, No. 24, 2018, pp. 6014-6024, https://doi.org/10.1039/C8AN01323C.
Xia, Z., et al. "Giant Enhancement of Raman Scattering by a Hollow-Core Microstructured Optical Fiber Allows Single Exosome Probing." ACS Sensors, vol. 8, No. 4, 2023, pp. 1799-1809, https://doi.org/10.1021/acssensors.3c00131.
Bilal, M., et al. "Optical Screening of Female Breast Cancer from Whole Blood Using Raman Spectroscopy." Applied Spectroscopy, vol. 71, No. 5, 2017, pp. 1004-1013, https://doi.org/10.1177/0003702816667516.
Gaba, F., et al. "Raman Spectroscopy in Prostate Cancer: Techniques, Applications and Advancements." Cancers, vol. 14, No. 6, 2022, p. 1535, https://doi.org/10.3390/cancers 14061535.
Xiong, C. C., et al. "Rapid and precise detection of cancers via label-free SERS and deep learning." Analytical and Bioanalytical Chemistry, vol. 415, 2023, pp. 3449-3462, https://doi.org/10.1007/s00216-023-04730-7.
Enejder, A. M. K., et al. "Blood analysis by Raman spectroscopy." Optics Letters, vol. 27, 2002, pp. 2004-2006, https://doi.org/10.1364/OL.27.002004.
Casella, M., et al. "Raman and SERS recognition of β-carotene and haemoglobin fingerprints in human whole blood." Spectrochimica Acta Part A: Molecular and Biomolecular Spectroscopy, vol. 79, No. 5, 2011, pp. 915-919, https://doi.org/10.1016/j.saa.2011.03.048.
Da Silva, A. M., et al. "Spectral model for diagnosis of acute leukemias in whole blood and plasma through Raman spectroscopy." Journal of Biomedical Optics, vol. 23, No. 10, 2018, pp. 1-11, https://doi.org/10.1117/1.JBO.23.10.107002.
Wang, Q., et al. "Simultaneous detection of glucose, triglycerides, and total cholesterol in whole blood by Fourier-Transform Raman spectroscopy." Spectrochimica Acta Part A: Molecular and Biomolecular Spectroscopy, vol. 260, 2021, p. 119906, https://doi.org/10.1016/j.saa.2021.119906.
Premasiri, W. R., et al. "Surface-Enhanced Raman Scattering of Whole Human Blood, Blood Plasma, and Red Blood Cells: Cellular Processes and Bioanalytical Sensing." The Journal of Physical Chemistry B, vol. 116, No. 31, 2012, pp. 9376-9386, https://doi.org/10.1021/jp304932g.
Gottschall, T., et al. "Advances in laser concepts for multiplex, coherent Raman scattering micro-spectroscopy and imaging." TrAC Trends in Analytical Chemistry, vol. 102, 2018, pp. 103-109, https://doi.org/10.1016/j.trac.2018.01.010.
Biswas, S., et al. "Coherent Two-Dimensional and Broadband Electronic Spectroscopies." Chemical Reviews, vol. 122, No. 3, 2022, pp. 4257-4321, https://doi.org/10.1021/acs.chemrev.1c00623.
Cho, M., et al. "Coherent Two-Dimensional Optical Spectroscopy." Chemical Reviews, vol. 108, No. 4, 2008, pp. 1331-1418, https://doi.org/10.1021/cr078377b.
Lee, J. H., et al. "Detection of hazardous chemical using dual-wavelength Raman spectroscopy in the ultraviolet region." Spectrochimica Acta Part A: Molecular and Biomolecular Spectroscopy, vol. 287, No. 1, 2023, p. 122061, https://doi.org/10.1016/j.saa.2022.122061.
Mcdonnell, R. P., et al. "Direct Probe of Vibrational Fingerprint and Combination Band Coupling." The Journal of Physical Chemistry Letters, vol. 15, No. 14, 2024, pp. 3975-3981, https://doi.org/10.1021/acs.jpclett.4c00297.
Chen, P. C., et al. "High Resolution Coherent 2D Spectroscopy." The Journal of Physical Chemistry A, vol. 114, No. 43, 2010, pp. 11365-11375, https://doi.org/10.1021/jp102401s.
Yellampalle, B., et al. "High-sensitivity explosives detection using dual-excitation-wavelength resonance-Raman detector." Proceedings of SPIE, vol. 9073, 2014, p. 90730H, https://doi.org/10.1117/12.2050441.
Chen, P. C., et al. "Multidimensional Pattern Recognition in High-Resolution 2D and 3D Spectra of Gas-Phase Molecules." Accounts of Chemical Research, vol. 56, No. 11, 2023, pp. 1295-1303, https://doi.org/10.1021/acs.accounts.2c00637.
Yellampalle, B., et al. "Performance comparison of single and dual-excitation-wavelength resonance-Raman explosives detectors." Proceedings of SPIE, vol. 10183, 2017, p. 101830E, https://doi.org/10.1117/12.2262636.
Fu, D., et al. "Quantitative Chemical Imaging with Multiplex Stimulated Raman Scattering Microscopy." Journal of the American Chemical Society, vol. 134, No. 8, 2012, pp. 3623-3626, https://doi.org/10.1021/ja210081h.
Zhang, D., et al. "Quantitative Vibrational Imaging by Hyperspectral Stimulated Raman Scattering Microscopy and Multivariate Curve Resolution Analysis." Analytical Chemistry, vol. 85, No. 1, 2013, pp. 98-106, https://doi.org/10.1021/ac3019119.
Spencer, A. P., et al. "Quantum coherence selective 2D Raman-2D electronic spectroscopy." Nature Communications, vol. 8, No. 1, 2017, p. 14732, https://doi.org/10.1038/ncomms14732.
Schulze, H. G., et al. "Rapid Vector-Based Peak Fitting and Resolution Enhancement for Correlation Analyses of Raman Hyperspectra." Applied Spectroscopy, vol. 77, No. 8, 2023, pp. 957-969, https://doi.org/10.1177/00037028231176805.
Chen, P. C., et al. "Two-Dimensional Coherent Double Resonance Electronic Spectroscopy." The Journal of Physical Chemistry A, vol. 112, No. 14, 2008, pp. 2999-3001, https://doi.org/10.1021/jp710247h.
Chen, P. C., et al. "Two-Dimensional Spectroscopy Isolates Infrared Rovibrational Patterns." The Journal of Physical Chemistry Letters, vol. 15, No. 5, 2024, pp. 1234-1240, https://doi.org/10.1021/acs.jpclett.3c03254.
Gogal'ová, Z., et al. "An improved design of the fused silica capillary flow cell for absorbance detection in microcolumn liquid

(56) References Cited

OTHER PUBLICATIONS chromatography." Analytica Chimica Acta, vol. 1238, 2023, p. 340637, https://doi.org/10.1016/j.aca.2022.340637.
Compaan, A., et al. "Coherent anti-Stokes Raman scattering with counterpropagating laser beams." Optics Letters, vol. 4, 1979, pp. 170-172, https://doi.org/10.1364/OL.4.000170.
Smetanin, S. N., et al. "Determination of the stimulated raman scattering threshold for a pump pulse of arbitrary width." Optics and Spectroscopy, vol. 121, No. 3, 2016, pp. 395-404, https://doi.org/10.1134/S0030400X1608021X.
Ginovart, F., et al. "Polarization effects in stimulated Raman scattering." Physics Letters A, vol. 194, No. 5-6, 1994, pp. 397-404, https://doi.org/10.1016/0375-9601(94)90330-1.
Baranov, A. V., et al. "Spectroscopy of resonance hyper-Raman scattering of light." Soviet Physics Uspekhi, vol. 33, No. 10, 1990, p. 812, https://doi.org/10.1070/PU1990v033n10ABEH002635.
Xiong, H., et al. "Stimulated Raman excited fluorescence spectroscopy and imaging." Nature Photonics, vol. 13, No. 6, 2019, pp. 412-417, https://doi.org/10.1038/s41566-019-0396-4.
Nestor, J., et al. "Stimulated Raman Gain Spectroscopy Utilizing Counter-propagating Pulsed Dye Lasers." Applied Spectroscopy, vol. 35, 1981, pp. 81-85.
Perry, B., et al. "Stimulated Raman scattering with a tightly focused pump beam." Optics Letters, vol. 10, 1985, pp. 146-148, https://doi.org/10.1364/OL.10.000146.
Min, W., et al. "The Duality of Raman Scattering." Accounts of Chemical Research, vol. 57, No. 14, 2024, pp. 1896-1905, https://doi.org/10.1021/acs.accounts.4c00159.
Verma, S.P., et al. "Erythrocyte membranes undergo cooperative, pH-sensitive state transitions in the physiological temperature range: evidence from Raman spectroscopy." Proc. Natl. Acad. Sci. USA, vol. 73, 1976, pp. 3558-3561, https://doi.org/10.1073/pnas.73.10.3558.
Aslanian, D., et al. "Thermotropic State Transition in Isolated Platelet Membranes Studied by Raman Spectroscopy." European Journal of Biochemistry, vol. 131, 1983, pp. 555-558, https://doi.org/10.1111/j.1432-1033.1983.tb07298.x.
Tuschel, D. "Raman Thermometry." Spectroscopy, vol. 31, 2016, pp. 8-13.
Ghita, A., et al. "Sensitivity of Transmission Raman Spectroscopy Signals to Temperature of Biological Tissues." Scientific Reports, vol. 8, 2018, pp. 8379, https://doi.org/10.1038/s41598-018-25465-x.
Arachchige, C.M., et al. "Raman scattering applied to human breath analysis." TrAC Trends in Analytical Chemistry, vol. 177, 2024, pp. 117791, https://doi.org/10.1016/j.trac.2024.117791.
Han, Y., et al. "Sweat Sensor Based on Wearable Janus Textiles for Sweat Collection and Microstructured Optical Fiber for Surface-Enhanced Raman Scattering Analysis." ACS Sensors, vol. 8, 2023, pp. 4774-4781, https://doi.org/10.1021/acssensors.3c01863.
Li, Y., et al. "Flexible Wearable Plasmonic Paper-Based Microfluidics with Expandable Channel and Adjustable Flow Rate for Portable Surface-Enhanced Raman Scattering Sweat Sensing." ACS Photonics, vol. 11, 2024, pp. 613-625, https://doi.org/10.1021/acsphotonics.3c01490.
Dybas, J., et al. "Trends in biomedical analysis of red blood cells—Raman spectroscopy against other spectroscopic, microscopic and classical techniques." TrAC Trends in Analytical Chemistry, vol. 146, 2022, pp. 116481, https://doi.org/10.1016/j.trac.2021.116481.
Goulart, A.C.C., et al. "Diagnosing COVID-19 in human serum using Raman spectroscopy." Lasers in Medical Science, vol. 37, 2022, pp. 2217-2226, https://doi.org/10.1007/s10103-021-03488-7.
Lister, A.P., et al. "Multi-Excitation Raman Spectroscopy for Label-Free, Strain-Level Characterization of Bacterial Pathogens in Artificial Sputum Media." Analytical Chemistry, vol. 94, 2022, pp. 669-677, https://doi.org/10.1021/acs.analchem.1c02501.
Cheng, I-F., et al. "Rapid (<5 min) Identification of Pathogen in Human Blood by Electrokinetic Concentration and Surface-Enhanced Raman Spectroscopy." Scientific Reports, vol. 3, 2013, pp. 2365, https://doi.org/10.1038/srep02365.
Xiong, C., et al. "Multi-branch attention Raman network and surface-enhanced Raman spectroscopy for the classification of neurological disorders." Biomedical Optics Express, vol. 15, 2024, pp. 3523-3540, https://doi.org/10.1364/BOE.514196.
Macleod, N., et al. "Broadband standoff detection of large molecules by mid-infrared active coherent laser spectrometry." Optics Express, vol. 23, 2015, pp. 912-928, https://doi.org/10.1364/OE.23.000912.
Sharma, S.K., et al. "Detection of Chemicals with Standoff Raman Spectroscopy." Spectroscopy Supplements, 2011.
Macleod, N.A., et al. "High sensitivity stand-off detection and quantification of chemical mixtures using an active coherent laser spectrometer (ACLaS)." Proceedings of SPIE, vol. 9824, 2016, pp. 98240B, https://doi.org/10.1117/12.2223045.
Narlagiri, L.M., et al. "Recent trends in laser-based standoff detection of hazardous molecules." TrAC Trends in Analytical Chemistry, vol. 153, 2022, pp. 116645, https://doi.org/10.1016/j.trac.2022.116645.
Glenn, R., et al. "Single Broadband Phase-Shaped Pulse Stimulated Raman Spectroscopy for Standoff Trace Explosive Detection." The Journal of Physical Chemistry Letters, vol. 7, 2016, pp. 117-125, https://doi.org/10.1021/acs.jpclett.5b01894.
Coluccelli, N., et al. "Standoff detection of bacterial spores by field deployable coherent Raman spectroscopy." Scientific Reports, vol. 13, 2023, pp. 2634, https://doi.org/10.1038/s41598-023-29589-7.
Zachhuber, B., et al. "Stand-off Raman spectroscopy of explosives." Proceedings of SPIE, vol. 7838, 2010, pp. 78380F, https://doi.org/10.1117/12.864564.
Zachhuber, B., et al. "Stand-Off Spatial Offset Raman Spectroscopy for the Detection of Concealed Content in Distant Objects." Analytical Chemistry, vol. 83, 2011, pp. 9438-9442, https://doi.org/10.1021/ac2021008.
Emmons, E., et al. "Waveguide-Enhanced Raman Spectroscopy for Field Detection of Threat Materials." DEVCOM CBC @ DTRA CBD S&T Conference, 2022.
Khristoforova, Y., et al. "Raman-Based Techniques in Medical Applications for Diagnostic Tasks: A Review." International Journal of Molecular Sciences, vol. 24, 2023, pp. 15605, https://doi.org/10.3390/ijms242115605.
Cherukulappurath, S. "Surface-Enhanced Raman Spectroscopy for Biomedical Applications: A Review." Sensors & Transducers, vol. 197, 2016, pp. 1-13.
Buhas, B.A., et al. "Label-Free SERS of Urine Components: A Powerful Tool for Discriminating Renal Cell Carcinoma through Multivariate Analysis and Machine Learning Techniques." International Journal of Molecular Sciences, vol. 25, 2024, pp. 3891, https://doi.org/10.3390/ijms25073891.
Almasoud, N., et al. "Rapid detection and quantification of paracetamol and its major metabolites using surface enhanced Raman scattering." Analyst, vol. 148, 2023, pp. 1805-1814, https://doi.org/10.1039/D3AN00249G.
Fu, Q., et al. "Rapid identification of the resistance of urinary tract pathogenic bacteria using deep learning-based spectroscopic analysis." Analytical and Bioanalytical Chemistry, vol. 413, 2021, pp. 7401-7410, https://doi.org/10.1007/s00216-021-03691-z.
Aitekenov, S., et al. "Surface-enhanced Raman spectroscopy (SERS) for protein determination in human urine." Sensing and Bio-Sensing Research, vol. 38, 2022, pp. 100535, https://doi.org/10.1016/j.sbsr.2022.100535.
Gala De Pablo, J., et al. "High-Throughput Raman Flow Cytometry and Beyond." Accounts of Chemical Research, vol. 54, 2021, pp. 2132-2143, https://doi.org/10.1021/acs.accounts.1c00001.
Vyas, B., et al. "Raman hyperspectroscopy of saliva and machine learning for Sjögren's disease diagnostics." Scientific Reports, vol. 14, 2024, pp. 11135, https://doi.org/10.1038/s41598-024-59850-6.
Begin, S., et al. "Coherent anti-Stokes Raman scattering hyperspectral tissue imaging with a wavelength-swept system." Biomedical Optics Express, vol. 2, 2011, pp. 1296-1306, https://doi.org/10.1364/BOE.2.001296.
Eravuchira, P. J., et al. "Hollow core photonic crystal fiber-assisted Raman spectroscopy as a tool for the detection of Alzheimer's

(56) References Cited

OTHER PUBLICATIONS disease biomarkers." Journal of Biomedical Optics, vol. 25, 2020, pp. 077001, https://doi.org/10.1117/1.JBO.25.7.077001.
Qi, D., et al. "Chemical concentration measurement in blood serum and urine samples using liquid-core optical fiber Raman spectroscopy." Applied Optics, vol. 46, 2007, pp. 1726-1734, https://doi.org/10.1364/AO.46.001726.
Aitekenov, S., et al. "Raman, Infrared and Brillouin Spectroscopies of Biofluids for Medical Diagnostics and for Detection of Biomarkers." Critical Reviews in Analytical Chemistry, vol. 53, 2022, pp. 1561-1590, https://doi.org/10.1080/10408347.2022.2036941.
Staritzbichler, R., et al. "Raman spectroscopy on blood serum samples of patients with end-stage liver disease." PLOS ONE, vol. 16, 2021, pp. e0256045, https://doi.org/10.1371/journal.pone.0256045.
Chu, Q., et al. "Volumetric enhancement of Raman scattering for fast detection based on a silver-lined hollow-core fiber." Optics Express, vol. 27, 2019, pp. 10370-10382, https://doi.org/10.1364/OE.27.010370.
Nagli, L., et al. "Absolute Raman cross-sections of some explosives: Trend to UV." Optical Materials, vol. 30, 2008, pp. 1747-1754, https://doi.org/10.1016/j.optmat.2007.11.019.
Gao, X., et al. "Absolute Stimulated Raman Cross Sections of Molecules." The Journal of Physical Chemistry Letters, vol. 14, 2023, pp. 5701-5708, https://doi.org/10.1021/acs.jpclett.3c01064.
Mcanally, M.O., et al. "Quantitative Determination of the Differential Raman Scattering Cross Sections of Glucose by Femtosecond Stimulated Raman Scattering." Analytical Chemistry, vol. 89, 2017, pp. 6931-6935, https://doi.org/10.1021/acs.analchem.7b01335.
Wilcox, P.G., et al. "Raman Spectra and Cross Sections of Chemical Warfare Agents, Agent Simulants, and Explosives Using 213 NM Deep-Ultraviolet Laser Excitation." Defense Technical Information Center, 2018.
Colles, M.J., et al. "Relative and Absolute Raman Scattering Cross Sections in Liquids." The Journal of Chemical Physics, vol. 56, 1972, pp. 3384-3391, https://doi.org/10.1063/1.1677709.
De Gelder, J., et al. "Reference database of Raman spectra of biological molecules." Journal of Raman Spectroscopy, vol. 38, 2007, pp. 1133-1147, https://doi.org/10.1002/jrs.1734.
Lee, W., et al. "Spread spectrum SERS allows label-free detection of attomolar neurotransmitters." Nature Communications, vol. 12, 2021, pp. 159, https://doi.org/10.1038/s41467-020-20413-8.
Suchita, et al. "Stimulated Raman Scattering in Toluene for Efficient New Wavelength Generation." 12th International Conference on Fiber Optics and Photonics, 2014, pp. S5A.34, https://doi.org/10.1364/PHOTONICS.2014.S5A.34.
Miao, R., et al. "Hollow-core anti-resonant optical fibers for chemical and biomedical sensing." Sensing and Bio-Sensing Research, vol. 46, 2024, pp. 100701, https://doi.org/10.1016/j.sbsr.2024.100701.
Cundiff, S.T., et al. "Optical multidimensional coherent spectroscopy." Physics Today, vol. 66, 2013, pp. 44-49, https://doi.org/10.1063/PT.3.2047.
Coherent, Inc. "Simplified One-Beam 2D Electronic Spectroscopy using a Millijoule Amplifier and HCF." Coherent White Paper, 2019.
International Search Report and Written Opinion issued for International Application No. PCT/US2025/016826, mailed May 15, 2025, 10 pages.
Lin, Y., et al. "Multi-cancer early detection based on serum surface-enhanced Raman spectroscopy with deep learning: a large-scale case-control study." BMC Medicine, vol. 23, Article No. 97, 2025, https://doi.org/10.1186/s12916-025-03887-5.
Chen, X., et al. "Applications of Data Characteristic AI-Assisted Raman Spectroscopy in Pathological Classification." Analytical Chemistry, vol. 96, No. 16, Apr. 23, 2024, pp. 6158-6169, https://doi.org/10.1021/acs.analchem.3c04930.
Zhang, Y., et al. "From Genotype to Phenotype: Raman Spectroscopy and Machine Learning for Label-Free Single-Cell Analysis." ACS Nano, vol. 18, No. 28, Jul. 16, 2024, pp. 18101-18117, https://doi.org/10.1021/acsnano.4c04282.
Belmerabet, R., et al. "Multilayered assembly of graphene oxide and silver nanoprisms on pyramidal arrays as highly efficient SERS-assisted biosensing platform." Chinese Journal of Physics, vol. 97, Oct. 2025, pp. 839-849, https://doi.org/10.1016/j.cjph.2025.07.031.
Nesbitt, D., et al. "Vibrational Energy Flow in Highly Excited Molecules: Role of Intramolecular Vibrational Redistribution." The Journal of Physical Chemistry, vol. 100, 1996, pp. 12735-12756.
Toppings, N., et al. "A rapid near-patient detection system for SARS-CoV-2 using saliva." Scientific Reports, vol. 11, Article No. 13378, 2021, https://doi.org/10.1038/s41598-021-92677-z.
Carlomagno, C., et al. "Identification of the Raman Salivary Fingerprint of Parkinson's Disease Through the Spectroscopic-Computational Combinatory Approach." Frontiers in Neuroscience, vol. 15, Oct. 26, 2021, Article 704963, https://doi.org/10.3389/fnins.2021.704963.
Ryzhikova, E., et al. "Raman spectroscopy of blood serum for Alzheimer's disease diagnostics: specificity relative to other types of dementia." Journal of Biophotonics, vol. 8, No. 7, Jul. 2015, pp. 584-596, doi:10.1002/jbio.201400060.
Chen, C., et al. "Applications of Raman spectroscopy in the diagnosis and monitoring of neurodegenerative diseases." Frontiers in Neuroscience, vol. 18, Jan. 17, 2024, Article 1301107, https://doi.org/10.3389/fnins.2024.1301107.
Polykretis, P., et al. "Raman Spectroscopy Techniques for the Investigation and Diagnosis of Alzheimer's Disease." Frontiers in Bioscience (Scholar Edition), vol. 14, No. 3, Aug. 1, 2022, Article 22, https://doi.org/10.31083/j.fbs1403022.
Coles et al. "Molecular Insights into α-Synuclein Fibrillation: A Raman Spectroscopy and Machine Learning Approach." ACS Chemical Neuroscience, vol. 16, No. 4, Feb. 19, 2025, pp. 687-698, https://doi.org/10.1021/acschemneuro.4c00726.
Pruccoli, A., et al. "High Sensitivity Stimulated Raman Scattering Microscopy with Electronic Resonance Enhancement." ChemPhysChem, vol. 25, No. 19, Oct. 2024, https://doi.org/10.1002/cphc.202400309.
Jain et al. "Scientific Advances in Cancer Detection Using Raman Spectroscopy." Asian Pacific Journal of Cancer Prevention, vol. 25, No. 11, Nov. 1, 2024, pp. 3977-3986, https://doi.org/10.31557/APJCP.2024.25.11.3977.
Dzelve et al. "Utility of Raman Spectroscopy in Pulmonary Medicine." Advances in Respiratory Medicine, vol. 92, No. 5, 2024, pp. 421-428, https://doi.org/10.3390/arm92050038.
Khristoforova et al. "Raman spectroscopy in chronic heart failure diagnosis based on human skin analysis." Journal of Biophotonics, vol. 16, No. 7, Jul. 2023, https://doi.org/10.1002/jbio.202300016.
Thomas et al. "Raman spectroscopy assisted tear analysis: A label free, optical approach for noninvasive disease diagnostics." Experimental Eye Research, vol. 243, 2024, 109913, https://doi.org/10.1016/j.exer.2024.109913.
Hu et al. "Stimulated Raman scattering imaging by continuous-wave laser excitation." Optics Letters, vol. 38, No. 9, 2013, pp. 1479-1481, https://doi.org/10.1364/OL.38.001479.
Office Action issued for U.S. Appl. No. 18/762,415, mailed Jan. 16, 2026, 22 pages.
Nakae, et al., "Terahertz Coherent Raman Spectroscopy of Dimethyl Sulfoxide and Water Mixtures Using Frequency Chirped Pulses," IEEE, Dec 1, 2016, 2 pages.
Office Action issued for U.S. Appl. No. 18/762,240, mailed Jan. 16, 2026, 23 pages.
Office Action issued for U.S. Appl. No. 18/774,723, mailed Jan. 9, 2026, 9 pages.
Notice of Allowance issued for U.S. Appl. No. 18/762,415, mailed Aug. 18, 2026, 8 pages.
Office Action issued for U.S. Appl. No. 18/762,420, mailed Aug. 18, 2026, 11 pages.
Notice of Allowance issued for U.S. Appl. No. 18/774,723, mailed Aug. 25, 2026, 9 pages.
Office Action issued for U.S. Appl. No. 18/892,075, mailed Aug. 25, 2026, 20 pages.

(56) References Cited

OTHER PUBLICATIONS

Office Action issued for U.S. Appl. No. 19/187,630, mailed Aug. 31, 2026, 20 pages.
Notice of Allowance issued for U.S. Appl. No. 19/069,522, mailed Jun. 17, 2026, 17 pages.
Office Action issued for U.S. Appl. No. 19/069,507, mailed Jun. 17, 2026, 27 pages.
Office Action issued for U.S. Appl. No. 19/069,513, mailed Jun. 17, 2026, 21 pages.
Notice of Allowance issued for U.S. Appl. No. 18/821,845, mailed Feb. 18, 2026, 12 pages.
Office Action issued for U.S. Appl. No. 18/930,095, mailed Mar. 30, 2026, 10 pages.
Office Action issued for U.S. Appl. No. 18/892,075, mailed Apr. 2, 2026, 35 pages.
Notice of Allowance issued for U.S. Appl. No. 18/762,415, mailed May 7, 2026, 8 pages.
Office Action issued for U.S. Appl. No. 18/762,420, mailed May 5, 2026, 23 pages.
Notice of Allowance issued for U.S. Appl. No. 18/774,723, mailed May 11, 2026, 9 pages.
Notice of Allowance issued for U.S. Appl. No. 19/020,938, mailed Jun. 3, 2026, 10 pages.
Notice of Allowance issued for U.S. Appl. No. 19/069,535, mailed Jul. 2, 2026, 11 pages.
Notice of Allowance issued for U.S. Appl. No. 18/930,095, mailed Jul. 20, 2026, 7 pages.

* cited by examiner

RAMAN SPECTROSCOPY SYSTEM FOR MEASUREMENT OF INTRAMOLECULAR VIBRATIONAL COUPLING SIGNAL

CROSS-REFERENCE TO RELATED APPLICATIONS

This application claims the benefit, under 35 U.S.C. § 119(e), of U.S. Provisional Patent Application No. 63/854,331, filed 30 Jul. 2025, which is incorporated by reference herein.

TECHNICAL FIELD

This disclosure generally relates to Raman spectroscopy systems and methods that use or relate to Raman scattering.

BACKGROUND

Raman spectroscopy is an optical measurement technique that can be applied to the study of molecular dynamics (e.g., to investigate vibrational and rotational states of molecules). Molecules typically exhibit molecular vibrations with frequencies ranging from less than 10 terahertz (THz) to approximately 100 THz, which corresponds to wavenumbers of approximately 300 $cm^{-1}$ to 3000 $cm^{-1}$ and wavelengths of approximately 30 to 3 micrometers (μm). Raman spectroscopy is based on the inelastic scattering of photons (referred to as Raman scattering) that occurs when light interacts with molecular vibrations or phonons in a sample. Raman scattering causes the energy (or equivalently, the frequency) of inelastically scattered light to be shifted, and this shift in energy can provide information about the vibrational modes of molecules in the sample.

Raman spectroscopy can be used in various chemical sensing applications to identify molecular components in a sample. Since many molecules exhibit a unique Raman scattering spectrum, the spectrum of Raman-scattered light produced when light interacts with a sample can serve as a fingerprint to sense or identify various molecular species within the sample. A sample illuminated with light may produce Raman scattered light at different wavelengths from the illumination light, and measurement of the spectrum of the Raman scattered light is typically performed in the optical domain. For example, the spectrum of Raman scattered light can be measured using an optical spectrometer which separates the Raman scattered light into its optical frequency components using a diffractive element, such as a diffraction grating.

DETAILED DESCRIPTION

Figure 1:
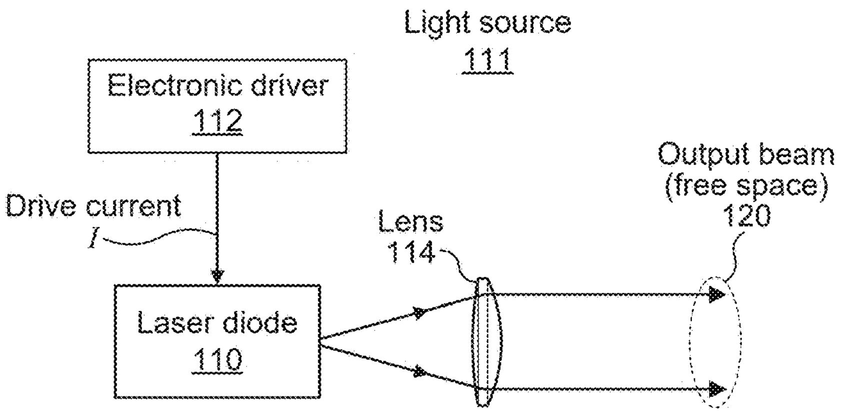
FIGS. 1-3 each illustrate an example light source that includes a laser diode.
Figure 2:
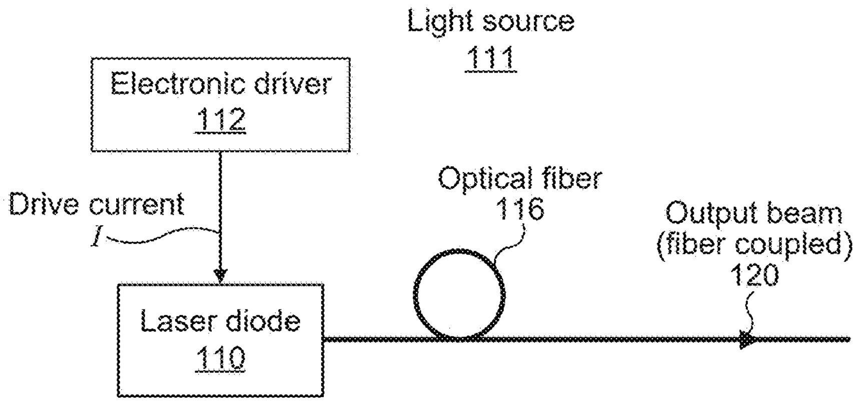
Figure 3:
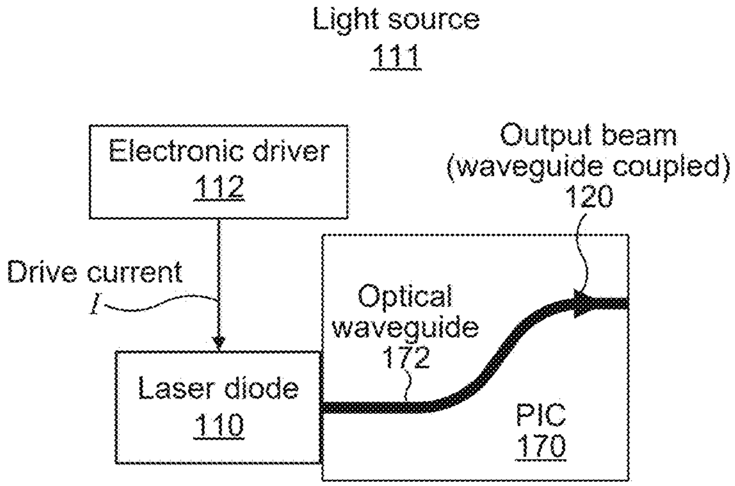

FIGS. 1-3 each illustrate an example light source 111 that includes a laser diode 110. In each of FIGS. 1-3, an electronic driver 112 supplies laser-diode drive current I to a laser diode 110, and the laser diode 110 produces an output beam of light 120. An output beam of light 120 may be referred to as an output beam, a beam of light, a beam, an optical beam of light, or an optical beam. Depending on the configuration of the light source 111, an output beam 120 may be a free-space output beam (FIG. 1), a fiber-coupled output beam (FIG. 2), or a waveguide-coupled output beam (FIG. 3). The drive current I supplied to the laser diode 110 may be a substantially constant DC current resulting in an output beam of light 120 having a substantially constant optical power. Additionally or alternatively, the drive current I may include pulses of current or a current modulation (e.g., a square-wave or sinusoidal current modulation) resulting in an output beam 120 that includes corresponding pulses of light or a corresponding amplitude modulation.

A light source 111 in any of FIGS. 1-3 may be part of a Raman spectroscopy system 100 (e.g., as illustrated in FIG. 15, 19, 23, 27, or 37). For example, the light source in any of FIGS. 1-3 may be a pump light source 111*pu*, a Stokes light source 111S, or a probe light source 111*pr*, and the output beam 120 may be a pump beam of light 120_pu_, a Stokes beam of light 120S, or a probe beam of light 120_pr_. A pump light source 111_pu_ may be referred to as a pump laser, and a pump beam of light 120_pu_ may be referred to as a pump output beam of light, pump output beam, pump beam, pump signal, or pump light. Similarly, a Stokes light source 111S may be referred to as a Stokes laser, and a Stokes beam of light 120S may be referred to as a Stokes output beam of light, Stokes output beam, Stokes beam, Stokes signal, or Stokes light. Additionally, a probe light source 111_pr_ may be referred to as a probe laser, and a probe beam of light 120_pr_ may be referred to as a probe output beam of light, probe output beam, probe beam, probe signal, or probe light.

A light source 111 of a Raman spectroscopy system 100 may include one or more laser diodes 110, and each of the laser diodes may be a fixed-wavelength laser diode or a wavelength-tunable laser diode. Each of the laser diodes 110 in FIGS. 1-3 may be a fixed-wavelength laser diode or a wavelength-tunable laser diode. A fixed-wavelength laser diode 110 may operate at a single wavelength or within a relatively narrow wavelength range (e.g., within 0.1 nm of a particular wavelength). For example, a fixed-wavelength laser diode 110 may produce an output beam 120 having any suitable substantially fixed wavelength between approximately 600 nanometers (nm) and approximately 2000 nm. A fixed-wavelength laser diode may include a distributed feedback (DFB) laser diode, a distributed Bragg reflector (DBR) laser diode, a fiber-Bragg-grating (FBG) stabilized laser diode, a temperature-stabilized laser diode, or any other suitable fixed-wavelength laser diode.

A wavelength-tunable laser diode 110 refers to a laser diode that produces light at multiple different wavelengths within a range of wavelengths (or equivalently, at multiple different frequencies within a range of frequencies). A wavelength-tunable laser diode may include an external-cavity laser diode, a thermally tuned laser diode, a sampled-grating distributed Bragg reflector (SG-DBR) laser, a thermally-tuned resonator external-cavity laser (ECL), or any other suitable type of tunable laser diode. The output beam 120 produced by a wavelength-tunable laser diode 110 may be adjustable over at least a portion of one of the following example wavelength ranges: 740-890 nm; 900-1100 nm; 1220-1450 nm; 1490-1590 nm; 1600-1690 nm. For example, a wavelength-tunable SG-DBR laser may have a 40-nm wavelength-tuning range that extends from 1530 nm to 1570 nm, and the SG-DBR laser may be adjustable to operate at any wavelength within the 40-nm wavelength range. At any given time, a wavelength-tunable laser diode 110 may operate at any one of the different wavelengths within its wavelength-tuning range. For example, during a first period of time, a laser diode with an 830-870 nm wavelength-tuning range may produce an output beam 120 with an 830-nm wavelength, and during a subsequent second period of time, the operating wavelength of the laser diode may be changed to produce an 840-nm output beam. A wavelength-tunable laser diode may be referred to as a frequency-tunable laser diode or a tunable laser diode. For example, a tunable laser diode with a 40-nm wavelength-tuning range that extends from 1530 nm to 1570 nm may also be referred to as a frequency-tunable laser diode with a 5.0-THz frequency-tuning range that extends from approximately 191 THz to approximately 196 THz.

A pump light source 111_pu_, a Stokes light source 111S, or a probe light source 111_pr_ of a Raman spectroscopy system 100 may be a wavelength-tunable light source, where the pump, Stokes, or probe frequency is adjustable by changing a wavelength of light produced by the wavelength-tunable light source. A wavelength-tunable light source 111 refers to a light source that can produce an output beam of light 120 at multiple different wavelengths within a range of wavelengths (or equivalently, at multiple different frequencies within a range of frequencies). A wavelength-tunable light source 111 may be referred to as a frequency-tunable light source or a tunable light source and may include one or more wavelength-tunable lasers. A wavelength-tunable laser may include a wavelength-tunable laser diode 110, a wavelength-tunable fiber laser, a wavelength-tunable solid-state laser (e.g., a titanium-doped sapphire laser), or any other suitable wavelength-tunable laser configured to produce an output beam of light 120 that can be adjusted to multiple different wavelengths within a range of wavelengths. For example, a wavelength-tunable light source 111 may include a wavelength-tunable laser diode 110 that produces an output beam 120 that is adjustable over a 60-nm wavelength range from 830 nm to 890 nm (which corresponds to a 24.4 THz frequency range extending from approximately 361.2 THz to approximately 336.9 THz). At any given time, a wavelength-tunable light source 111 may operate at any one of the different wavelengths within its wavelength-tuning range. For example, during a first period of time, a light source 111 with an 830-890 nm wavelength-tuning range may produce an output beam 120 at 835 nm, and during a subsequent second period of time, the light source may be tuned to operate at 870 nm. A wavelength-tuning range from 830-890 nm may be referred to as having a 60-nm width or a 60-nm span.

A wavelength-tunable light source 111 may be adjustable over a frequency range that corresponds to a wavelength range having a width between approximately 10 nm and approximately 100 nm. For example, the width of the wavelength-tuning range of a wavelength-tunable light source 111 may be approximately 10 nm, 20 nm, 30 nm, 40 nm, 50 nm, 60 nm, 80 nm, or 100 nm. Around 1550 nm, a 10-nm wavelength-tuning range corresponds to a frequency-tuning range of approximately 1.25 THz (or equivalently, 41.6 $cm^{-1}$), and a 100-nm wavelength-tuning range corresponds to a frequency-tuning range of approximately 12.5 THz (or equivalently, 416 $cm^{-1}$). Around 1050 nm, a 10-nm wavelength-tuning range corresponds to a frequency-tuning range of approximately 2.72 THz (or equivalently, 90.7 $cm^{-1}$), and a 100-nm wavelength-tuning range corresponds to a frequency-tuning range of approximately 27.3 THz (or equivalently, 909 $cm^{-1}$). Around 850 nm, a 10-nm wavelength-tuning range corresponds to a frequency-tuning range of approximately 4.15 THz (or equivalently, 138.4 $cm^{-1}$), and a 100-nm wavelength-tuning range corresponds to a frequency-tuning range of approximately 41.6 THz (or equivalently, 1389 $cm^{-1}$).

An output beam of light 120 produced by a laser diode 110 may have a spectral linewidth ($\Delta\nu$) of less than approximately 200 MHz, 100 MHz, 50 MHz, 10 MHz, 1 MHz, 100 kHz, or 10 KHz. A spectral linewidth of a beam of light 120 (which may be referred to as a linewidth, optical linewidth, or optical bandwidth) refers to the width of an optical spectrum (e.g., as measured at the half-power points of the spectrum). A spectral linewidth may be specified over a particular time period, such as for example, a time interval of approximately 1 ms, 100 ms, 1 s, 10 s, 100 s, 1 hour, or any other suitable period of time. For example, a fixed-wavelength laser diode 110 may be a DFB laser diode that produces an output beam 120 having a substantially fixed wavelength of 740 nm and a spectral linewidth of less than 1 MHz when measured over a 100-ms time interval. As another example, a wavelength-tunable laser diode 110 may produce an output beam 120 that is adjustable from 830 nm to 870 nm, and when operating at a particular wavelength within that wavelength range, the output beam may have a spectral linewidth of less than 10 MHz when measured over a 100-ms time interval.

A laser diode 110 may be made from materials that include any suitable combination of aluminum (Al), indium (In), gallium (Ga), arsenic (As), phosphorous (P), or any other suitable material. For example, a laser diode 110 may include gallium arsenide (GaAs) and may produce an output beam of light 120 having a wavelength between approximately 850 and 900 nm. As another example, a laser diode 110 may include aluminum gallium arsenide (AlGaAs) and may produce an output beam of light 120 having a wavelength between approximately 750 nm and 870 nm. As another example, a laser diode 110 may include indium gallium arsenide (InGaAs) and may produce an output beam of light 120 having a wavelength between approximately 900 nm and 1100 nm. As another example, a laser diode 110 may include indium phosphide (InP) or indium gallium arsenide phosphide (InGaAsP) and may produce an output beam of light 120 having a wavelength between approximately 1100 nm and 1650 nm.

The light source 111 in FIG. 1 is a free-space light source in which a laser diode 110 produces a free-space output beam of light 120. A free-space beam of light 120 refers to an optical beam that propagates through a medium (e.g., air, gas, liquid, or a dielectric material) without being optically confined within a physical waveguiding structure like an optical fiber or optical waveguide. A free-space optical beam 120 may include a diverging beam of light, a collimated beam of light, or a focused beam of light. In FIG. 1, the light emitted by the laser diode 110 is collected and collimated by a lens 114 to produce a collimated free-space beam 120. In other embodiments, a lens 114 may produce a focused free-space beam (e.g., the focused beam may be directed to a sample 150 or coupled into an optical fiber or waveguide).

The light source 111 in FIG. 2 is a fiber-coupled light source in which light produced by a laser diode 110 is coupled into an optical fiber 116 to produce a fiber-coupled output beam 120. An end face of the optical fiber 116 may be located at or near a facet of the laser diode 110 so that the light is directly coupled from the laser diode into the optical fiber. Alternatively, the light from the laser diode 110 may be coupled into the optical fiber 116 using one or more lenses that receive the light from the laser diode and focus the light into the optical fiber. The optical fiber 116 may be a single-mode (SM) fiber, polarization-maintaining (PM) fiber, multi-mode fiber, hollow-core fiber, photonic crystal fiber, or any other suitable type of optical fiber.

The light source 111 in FIG. 3 is a waveguide-based light source in which light produced by a laser diode 110 is coupled into an optical waveguide 172 of a photonic integrated circuit (PIC) 170 to produce a waveguide-coupled output beam 120. An optical waveguide 172 that is part of a PIC 170 may be referred to as a waveguide or a PIC waveguide and may be a passive optical waveguide that conveys light from one optical element to another with relatively low optical loss. A PIC 170 (which may be referred to as a planar lightwave circuit (PLC), a waveguide-based device, an integrated-optic device, or an integrated optoelectronic device) may be fabricated from a material that includes silicon, silicon dioxide (which may be referred to as silica), glass, indium phosphide (InP), silicon nitride (SiN), a polymer, graphene, or an electro-optic material (e.g., lithium niobate ($LiNbO_3$) or lithium tantalate ($LiTaO_3$)). An optical waveguide 172 of a PIC 170 may be fabricated into the PIC material and may confine and guide light based on the higher refractive index of the waveguide with respect to surrounding material (e.g., surrounding cladding material of the PIC or air).

Light from the laser diode 110 in FIG. 3 may be coupled into the PIC waveguide 172 using one or more lenses, or the laser diode 110 may be butt-coupled to an input face of the waveguide so that the light from the laser diode is directly coupled into the waveguide. The laser diode 110 may be mechanically attached or connected to the PIC 170 or to a substrate to which the PIC is also attached. For example, the laser diode 110 may be attached using epoxy, adhesive, or solder. In other embodiments, a laser diode 110 may be located apart from a PIC 170, and the laser diode may send a beam of light 120 to the PIC 170 via optical fiber. An end face of an optical fiber may be attached or connected to the PIC 170 so that the light is coupled from the optical fiber into the PIC waveguide 172. Alternatively, a laser diode 110 and a PIC 170 may be fabricated together so that the laser diode is directly integrated into the PIC during the fabrication process. For example, the PIC 170 and laser diode 110 in FIG. 3 may both be InP-based devices that are fabricated together on an indium phosphide wafer.

Figure 4:
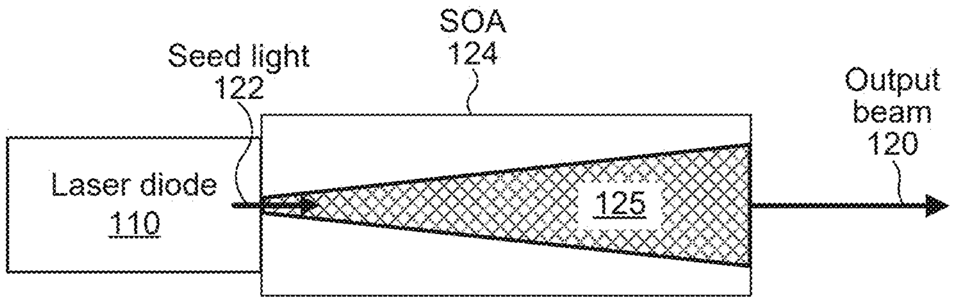
FIGS. 4-5 each illustrate an example light source that includes a laser diode and an optical amplifier.
Figure 5:
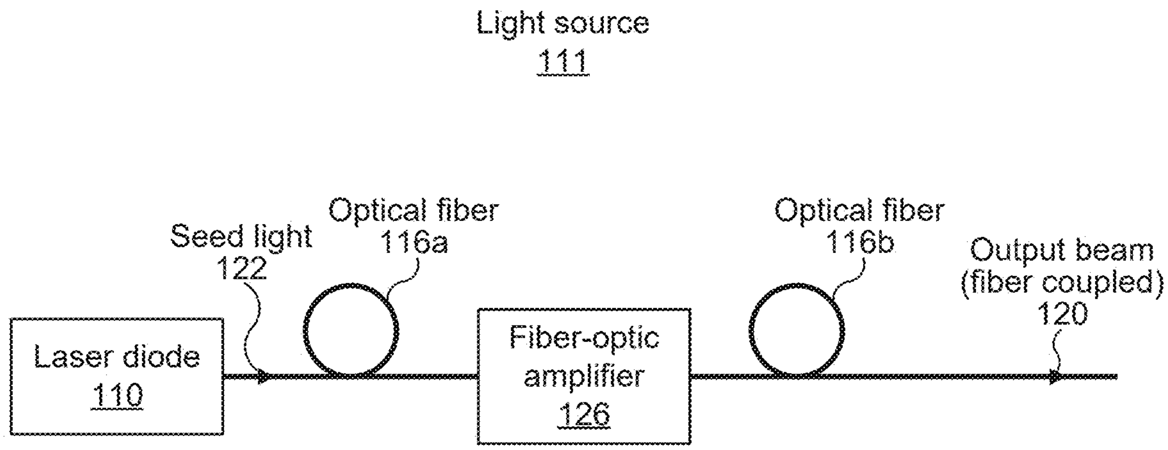

FIGS. 4-5 each illustrate an example light source 111 that includes a laser diode 110 and an optical amplifier. A light source 111 of a Raman spectroscopy system 100 may include a seed laser that produces seed light 122 and an optical amplifier that amplifies the seed light to produce an amplified output beam of light 120. Instead of directly emitting an output beam 120 produced by a laser diode 110 (e.g., as illustrated in FIGS. 1-3), a light source 111 may include an optical amplifier that amplifies seed light 122 from a laser diode 110 to produce an amplified output beam 120. An optical amplifier may include a semiconductor optical amplifier (SOA) 124 (as illustrated in FIG. 4) or a fiber-optic amplifier 126 (as illustrated in FIG. 5). In some embodiments, an optical amplifier may include a SOA 124 followed by a fiber-optic amplifier 126. For example, a seed laser diode 110 may produce seed light 122 that is first amplified by a SOA 124 and then further amplified by a fiber-optic amplifier 126.

In FIG. 4, a laser diode 110 produces seed light 122 that is amplified by a semiconductor optical amplifier (SOA) 124. The laser diode 110 in FIG. 4 acts as a seed laser that produces seed light 122 that is coupled into the input end of the waveguide 125 of the SOA 124. The SOA waveguide 125 in FIG. 4 is indicated by the cross-hatched region within the SOA 124. The SOA 124 amplifies the seed light 122 as it propagates along the waveguide 125 from the input end to the output end, and the output beam of light 120 is emitted from the output end of the SOA. The output beam 120 in FIG. 4 may be emitted from the SOA 124 as a free-space optical beam (e.g., a lens may be used to produce a collimated or focused free-space optical beam), similar to that illustrated in FIG. 1. Alternatively, the output beam 120 may be coupled into an optical fiber 116 to produce a fiber-coupled output beam (e.g., similar to that illustrated in FIG. 2), or the output beam 120 may be coupled into a waveguide 172 of a PIC 170 to produce a waveguide-coupled output beam (e.g., similar to that illustrated in FIG. 3). The optical gain provided by the SOA 124 may be produced by electrical current that is supplied to the SOA by an electronic driver (not illustrated in FIG. 4). For example, an electronic driver may supply substantially constant DC electrical current to the laser diode 110 and to the SOA 124, and the resulting output beam 120 may have substantially constant optical power. Additionally or alternatively, an electronic driver 112 may supply pulses of current or a current modulation to the laser diode 110 or to the SOA 124, and the output beam 120 may include corresponding pulses of light or amplitude modulation. A semiconductor optical amplifier 124 may be referred to as a booster optical amplifier (BOA).

The laser diode 110 and the SOA 124 in FIG. 4 may be fabricated or integrated together on the same chip so that seed light 122 from the laser diode is directly coupled into the waveguide 125 of the SOA. The waveguide 125 of the SOA 124 may be a tapered optical waveguide (as illustrated in FIG. 4) with a width that increases along a lateral direction from the input end that receives the seed light 122 to the output end that emits the output beam 120. A light source that includes a seed laser diode 110 that supplies seed light 122 that is amplified by a SOA 124 (as illustrated in FIG. 4) may be referred to as a master-oscillator power-amplifier laser (MOPA laser). The seed laser diode 110 may be referred to as a master oscillator, and the SOA 124 may be referred to as a power amplifier. The laser diode 110 and SOA 124 in FIG. 4 may be part of a pump light source 111*pu*, a Stokes light source 111S, or a probe light source 111*pr*, and the output beam 120 in FIG. 4 may be a pump beam 120*pu*, a Stokes beam 120S, or a probe beam 120*pr*. Additionally, the laser diode 110 in FIG. 4 may be a fixed-wavelength laser diode or a wavelength-tunable laser diode.

In FIG. 5, a laser diode 110 produces seed light 122 that is amplified by a fiber-optic amplifier 126. The laser diode 110 in FIG. 5 acts as a seed laser that produces seed light 122 that is coupled into an optical fiber 116*a*. The laser diode 110 and optical fiber 116*a* in FIG. 5 are similar to the fiber-coupled laser diode in FIG. 2. In FIG. 5, the optical fiber 116*a* directs the seed light 122 to a fiber-optic amplifier 126, and the fiber-optic amplifier amplifies the seed light as it propagates through an optical gain fiber of the fiber-optic amplifier. The optical gain fiber may be doped with rare-earth ions (e.g., neodymium, erbium, or ytterbium) or bismuth that provide the optical gain to the seed light. One or more pump lasers may optically pump the optical-gain material (e.g., rare-earth ions or bismuth ions) in the optical gain fiber, which in turn provide optical amplification to the seed light 122 propagating through the gain fiber. The amplified light produced by the fiber-optic amplifier 126 propagates in an optical fiber 116*b* as a fiber-coupled output beam 120. The optical fiber 116*b* may direct the output beam 120 to an optical element (e.g., an optical combiner 130) or to a sample 150. In some embodiments, the output beam 120 may be coupled out of the optical fiber 116*b* to produce a free-space optical beam, or the output beam may be coupled from the optical fiber 116*b* into a waveguide 172 of a PIC 170. The laser diode 110 and fiber-optic amplifier 126 in FIG. 5 may be part of a pump light source 111*pu*, a Stokes light source 111S, or a probe light source 111*pr*, and the output beam 120 in FIG. 5 may be a pump beam 120*pu*, a Stokes beam 120S, or a probe beam 120*pr*. Additionally, the laser diode 110 in FIG. 5 may be a fixed-wavelength laser diode or a wavelength-tunable laser diode.

Any of the light sources 111 in FIGS. 1-3 may include a laser diode 110 followed by an optical amplifier. For example, the laser diode 110 in FIG. 1 may produce seed light that is directed to a SOA 124 or a fiber-optic amplifier 126 before being emitted as a free-space output beam 120. As another example, the laser diode 110 in FIG. 2 may be configured as a MOPA laser (e.g., similar to that in FIG. 4), and the output beam 120 produced by the MOPA laser may be coupled into an optical fiber 116. As another example, the laser diode 110 in FIG. 3 may be configured as a MOPA laser (e.g., similar to that in FIG. 4), and the output beam 120 produced by the MOPA laser may be directly coupled into the optical waveguide 172 of the PIC 170 in FIG. 3. As another example, the laser diode in FIG. 3 may produce seed light that is directed to a fiber-optic amplifier 126 and then coupled from an optical fiber into the PIC waveguide 172.

Figure 6:
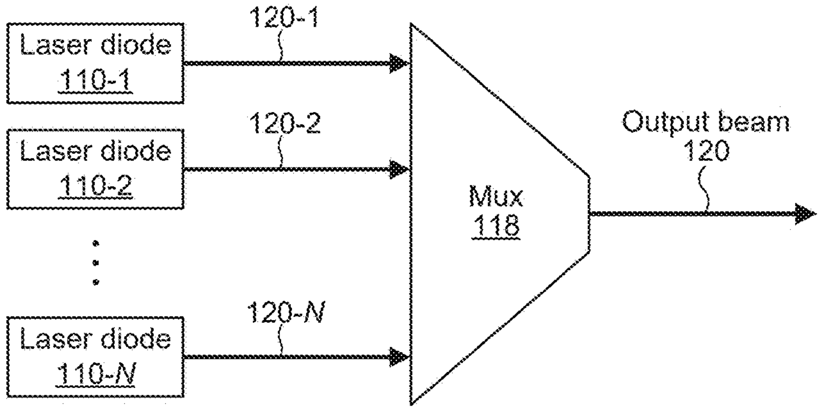
FIG. 6 illustrates an example light source that includes multiple laser diodes and an optical multiplexer.

FIG. 6 illustrates an example light source 111 that includes multiple laser diodes 110 and an optical multiplexer 118. Each of the laser diodes 110-1, 110-2, . . . 110-N produces a respective output beam 120-1, 120-2, . . . 120-N, and the optical multiplexer 118 combines the output beams produced by the laser diodes into a single output beam of light 120. The optical multiplexer 118 may be a free-space device, a fiber-optic device, a waveguide-based device fabricated in a PIC, or a metamaterial-based device. Each of the laser diodes 110 may operate at a different wavelength or range of wavelengths, and the multiplexer 118 may combine N different wavelengths of light from the N laser diodes into a single output beam 120. The optical multiplexer 118 may include one or more of the following: a free-space diffraction grating; an arrayed waveguide grating (AWG); a metamaterial that acts as a diffractive optical element; one or more optical filters; one or more optical combiners; one or more optical switches (e.g., thermo-optic switches, liquid crystal switches, electro-optic switches, mechanical optical switches, or microelectromechanical systems (MEMS) switches); a series of two or more fiber Bragg gratings with optical circulators.

The light source 111 in FIG. 6 may be a pump light source 111*pu*, a Stokes light source 111S, or a probe light source 111*pr*, and the output beam 120 in FIG. 6 may be a pump beam 120*pu*, a Stokes beam 120S, or a probe beam 120*pr*. The light source 111 may switch between operating the N laser diodes 110 one at a time so that, at any given time, only one laser diode produces light, and the output beam 120 includes just the light produced by that one laser diode. For example, each of the laser diodes 110 may operate at a particular wavelength or over a particular range of wavelengths, and one of the laser diodes may be selected for operation based on the wavelength that is needed to perform a particular measurement. Alternatively, the light source 111 may operate two or more of the N laser diodes 110 at the same time. For example, the light source 111 may be a Stokes light source 111S that operates two of the laser diodes 110 at the same time to produce the two Stokes beams 120S-a and 120S-b in FIG. 22. The two Stokes beams may be combined by the multiplexer 118 in FIG. 6 to produce an output beam 120 that includes the two Stokes beams of light. As another example, the light source 111 may be a pump light source 111*pu* that operates two of the laser diodes 110 at the same time to produce the two pump beams 120*pu-a* and 120*pu-b* in FIG. 26.

The output beam 120 in FIG. 6 may be a free-space optical beam, a fiber-coupled optical beam, or a waveguide-coupled optical beam, and the output beam may be directed to an optical element (e.g., an optical combiner 130) or to a sample 150. For example, each of the laser diodes 110-1, 110-2, . . . 110-N may produce a free-space output beam (e.g., similar to that illustrated in FIG. 1), and the optical multiplexer 118 may include free-space optical elements that combine the N free-space beams into a single free-space output beam 120. As another example, each of the laser diodes 110-1, 110-2, . . . 110-N may produce a fiber-coupled beam (e.g., similar to that illustrated in FIG. 2), and the optical multiplexer 118 may be a fiber-optic device that combines the N fiber-coupled beams into a single fiber-coupled output beam 120. As another example, the optical multiplexer 118 may be a waveguide-based device fabricated in a PIC 170. Each of the laser diodes 110-1, 110-2, . . . 110-N may produce a waveguide-coupled beam (e.g., similar to that illustrated in FIG. 3), and the optical multiplexer 118 may combine the N waveguide-coupled beams into an output beam 120 that propagates in one waveguide 172 of the PIC 170. The laser diodes 110 may be fabricated separately and then attached or connected to the PIC 170 or a PIC substrate, or one or more of the laser diodes may be fabricated together with the PIC.

In some embodiments, a light source 111 that includes multiple laser diodes 110 and an optical multiplexer 118 may additionally include one or more optical amplifiers. For example, the light source 111 in FIG. 6 may include a SOA 124 or fiber-optic amplifier 126 located between a laser diode 110 and the multiplexer 118. Additionally or alternatively, the light source 111 may include an optical amplifier located after the optical multiplexer 118, and the optical amplifier may provide optical amplification to the output beam 120.

The light source 111 in FIG. 6 includes N laser diodes 110-1, 110-2, . . . 110-N, where Nis an integer greater than or equal to 2 (e.g., N may equal 2, 3, 4, 5, 10, or 20). Each of the N laser diodes 110 in FIG. 6 may be a wavelength-tunable laser diode or a fixed-wavelength laser diode. For example, the light source in FIG. 6 may include (i) N wavelength-tunable laser diodes, (ii) N fixed-wavelength laser diodes, or (iii) one or more wavelength-tunable laser diodes and one or more fixed-wavelength laser diodes. The light source 111 in FIG. 6 may be referred to as a wavelength-tunable light source, a frequency-tunable light source, or a tunable light source. A wavelength-tunable light source that includes a multiplexer 118 may include: two or more wavelength-tunable laser diodes; two or more fixed-wavelength laser diodes, each laser diode operating at a different wavelength; or any suitable combination of one or more wavelength-tunable laser diodes and one or more fixed-wavelength laser diodes. For example, the light source 111 in FIG. 6 may include two or more laser diodes, where each laser diode is a fixed-wavelength laser diode or a wavelength-tunable laser diode.

Figure 24:
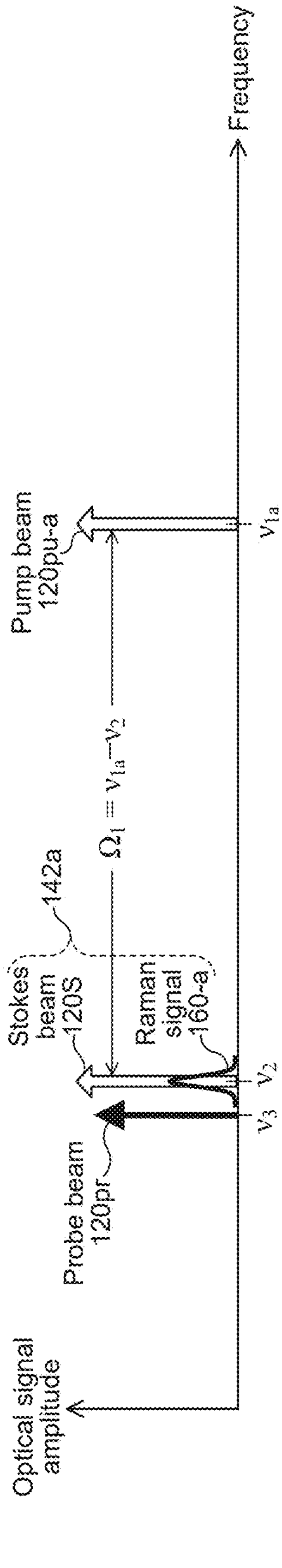
FIGS. 24-26 each illustrate example optical signals produced in the Raman spectroscopy system of FIG. 23.
Figure 25:
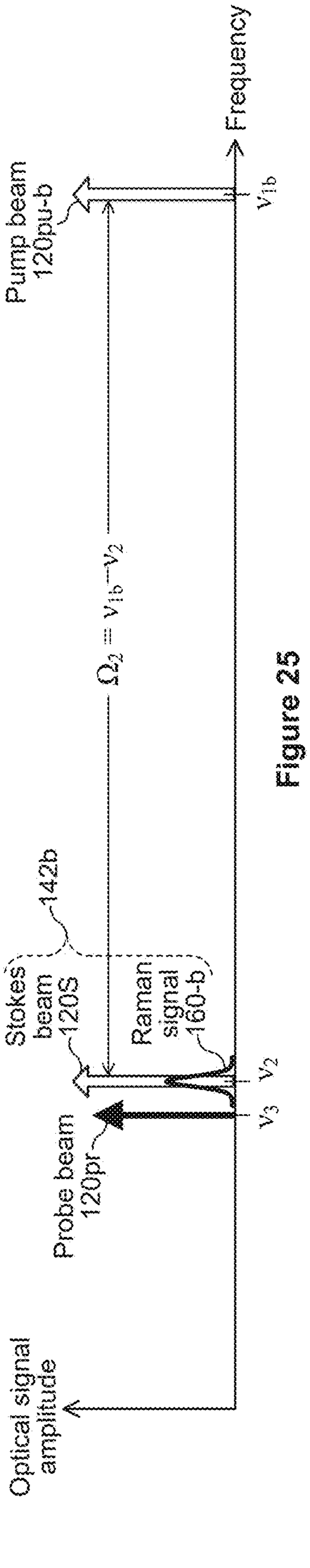
Figure 26:
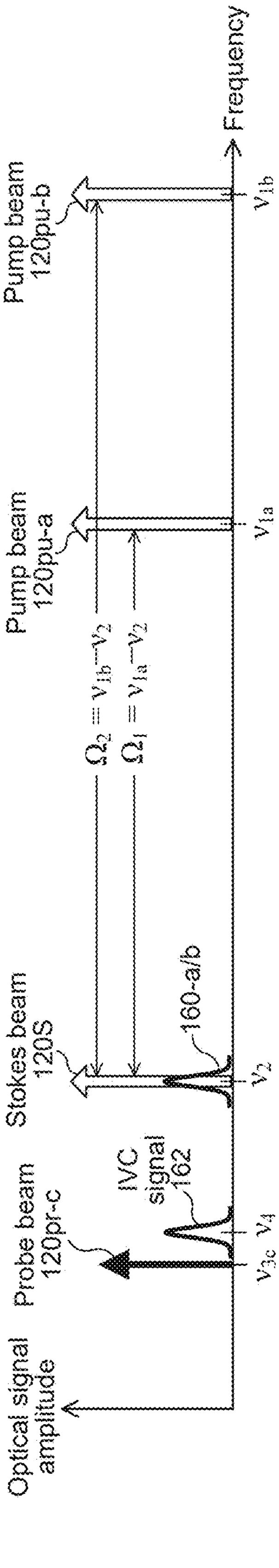

The light source 111 in FIG. 6 may include N fixed-wavelength laser diodes 110, each laser diode having a different operating wavelength. The wavelength of the output beam 120 produced by the wavelength-tunable light source 111 in FIG. 6 may be adjustable to any wavelength of N different wavelengths by selecting one of the N fixed-wavelength laser diodes for operation. The light source 111 may be a pump light source 111*pu* or a Stokes light source 111S, and a particular frequency offset Ω between a pump beam 120*pu* and a Stokes beam 120S may be obtained by selecting one of the fixed-wavelength laser diodes for operation. For example, the pump beams 120*pu-a* and 120*pu-b* in FIGS. 24-26 may be produced by the light source 111 in FIG. 6. Laser diode 110-1 may be a fixed-wavelength laser diode operating at frequency $\nu_{1a}$, and laser diode 110-2 may be a fixed-wavelength laser diode operating at frequency $\nu_{1b}$. During a first measurement period (e.g., as illustrated in FIG. 24), laser diode 110-1 may be operated to produce output beam 120-1 at the frequency $\nu_{1a}$, and the other laser diodes 110-2 to 110-N may be turned off or otherwise configured to not produce light. The multiplexer 118 receives the output beam 120-1 from the laser diode 110-1 and directs the beam to the output of the multiplexer to produce the pump beam 120*pu-a* having a frequency $\nu_{1a}$. During a second measurement period (e.g., as illustrated in FIG. 25), laser diode 110-2 may be operated to produce output beam 120-2 at the frequency $\nu_{1b}$. The other laser diodes (i.e., laser diodes 110-1 to 110-N, excluding laser diode 110-2) may be turned off or otherwise configured to not produce light. The multiplexer 118 receives the output beam 120-2 from the laser diode 110-2 and directs the beam to the output of the multiplexer to produce pump beam 120*pu-b* having a frequency $\nu_{1b}$. During a third measurement period (e.g., as illustrated in FIG. 26), both laser diodes 110-1 and 110-2 may be operated to produce an output beam that includes pump beam 120*pu-a* at frequency $\nu_{1a}$ and pump beam 120*pu-b* at frequency $\nu_{1b}$. As another example, the Stokes beams 120S-a and 120S-b in FIGS. 20-22 may be produced by the light source 111 in FIG. 6. Laser diode 110-1 may be a fixed-wavelength laser diode operating at frequency $\nu_{2a}$, and laser diode 110-2 may be a fixed-wavelength laser diode operating at frequency $\nu_{2b}$. Selecting laser diode 110-1 for operation produces the frequency offset $\Omega_1$ in FIG. 20, and selecting laser diode 110-2 for operation produces the frequency offset $\Omega_2$ in FIG. 21. Selecting both laser diodes for operating at the same time produces the two frequency offsets $\Omega_1$ and $\Omega_2$ in FIG. 22.

The light source 111 in FIG. 6 may include N wavelength-tunable laser diodes 110. The wavelength of the output beam 120 produced by the light source 111 may be adjustable to any wavelength within the tuning ranges of the N laser diodes. For example, the light source 111 may be a Stokes or probe light source that includes three wavelength-tunable laser diodes having respective wavelength-tuning ranges of 800-840 nm, 830-870 nm, and 860-900 nm. Each of the tunable laser diodes has a 40-nm tuning range with a 10-nm overlap between adjacent tuning ranges, which results in the light source 111 in FIG. 6 having a 100-nm wavelength-tuning range extending from 800 nm to 900 nm. The light source 111 may produce an output beam 120 having any wavelength from 800 nm to 900 nm by selecting one of the three tunable laser diodes for operation and tuning the laser diode to the desired wavelength.

Figure 7:
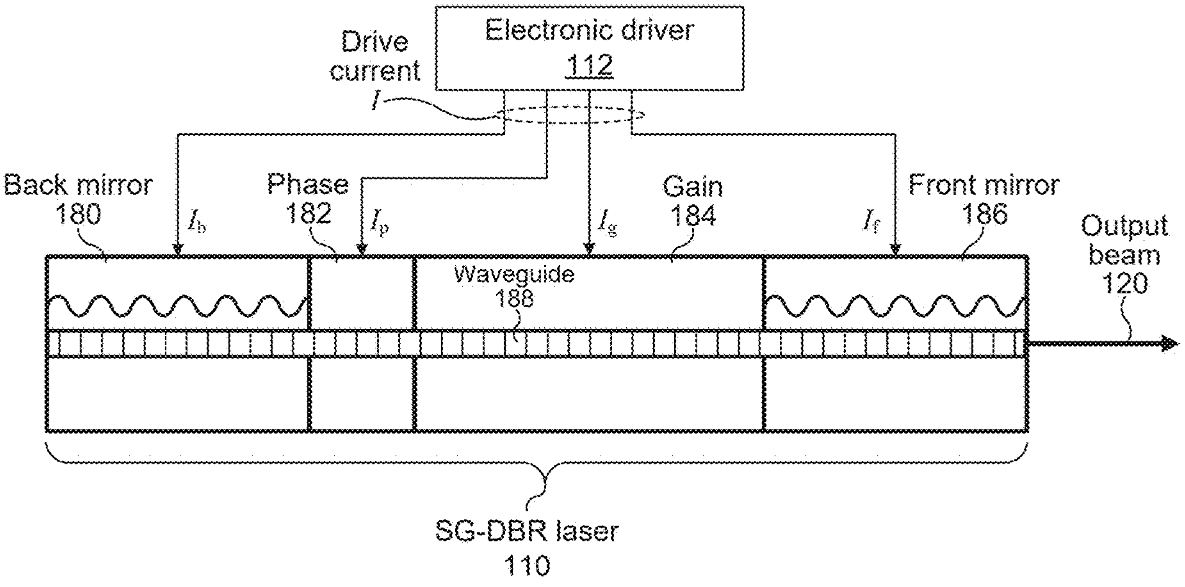
FIG. 7 illustrates an example sampled-grating distributed Bragg reflector (SG-DBR) laser.

FIG. 7 illustrates an example sampled-grating distributed Bragg reflector (SG-DBR) laser 110. An SG-DBR laser 110 is a wavelength-tunable laser diode that produces an output beam 120 with a wavelength that can be electronically tuned. The wavelength-tuning range may have a width between 20 nm and 50 nm. For example, an SG-DBR laser 110 may have a 40-nm wavelength-tuning range extending from approximately 1530 nm to approximately 1570 nm or from approximately 1560 nm to approximately 1600 nm. The SG-DBR laser 110 in FIG. 7 may be part of a pump light source 111*pu*, a Stokes light source 111S, or a probe light source 111*pr*, and the output beam 120 in FIG. 7 may be a pump beam 120*pu*, a Stokes beam 120S, or a probe beam 120*pr*.

An SG-DBR laser 110 may produce a free-space output beam, a fiber-coupled output beam, or a waveguide-coupled output beam. For example, the laser diode 110 in FIG. 1, 2, or 3 may be an SG-DBR laser that produces a respective free-space, fiber-coupled, or waveguide-coupled output beam 120. An SG-DBR laser 110 may be combined with an optical amplifier. For example, the laser diode 110 in FIG. 4 may be an SG-DBR laser that is integrated with the SOA 124. As another example, the laser diode 110 in FIG. 5 may be an SG-DBR laser that produces seed light 122 that is amplified by the fiber-optic amplifier 126.

The SG-DBR laser 110 in FIG. 7 includes a back mirror 180, a phase section 182, a gain section 184, and a front mirror 186, where the phase and gain sections are located between the front and back mirrors. The laser diode drive current I supplied to the SG-DBR laser 110 includes the following: current $I_b$ supplied to the back mirror 180, current $I_p$ supplied to the phase section 182, current $I_g$ supplied to the gain section 184, and current $I_f$ supplied to the front mirror 186. The gain current $I_g$ provides optical gain to the active optical waveguide 188 of the SG-DBR laser 110, and the other currents may be used to set the wavelength of the output beam 120 produced by the SG-DBR laser. The electronic driver 112 may supply particular combinations of electrical currents to the back mirror 180, phase section 182, gain section 184, and front mirror 186, where each particular combination of electrical currents causes the SG-DBR laser 110 to produce an output beam 120 at a particular wavelength. For example, an SG-DBR laser 110 may be part of a wavelength-tunable probe light source 111*pr* that produces the probe beams 120*pr-a*, 120*pr-b*, and 120*pr-c* in FIGS. 20-22. The electronic driver 112 in FIG. 7 may supply particular different combinations of the electrical currents $I_b$, $I_p$, $I_g$, and $I_f$ to produce the different probe frequencies $\nu_{3a}$, $\nu_{3b}$, and $\nu_{3c}$ in FIGS. 20-22.

In some embodiments, a wavelength-tunable light source 111 of a Raman spectroscopy system 100 may include a thermally-tuned resonator external-cavity laser (ECL) that uses one or more thermally-tuned resonators to stabilize and change the wavelength of the output beam produced by the laser. For example, a thermally-tuned resonator ECL may include a semiconductor optical amplifier that provides optical gain and an external-cavity resonator that provides wavelength stabilization and tuning. The external cavity may include two coupled ring resonators with slightly different free spectral ranges, and the operating wavelength of the laser may be thermally tuned by adjusting the temperature of the resonators (e.g., with a heater or a thermoelectric cooler). The resonator temperatures may be adjusted over a 2π phase shift that allows the laser to operate at any wavelength within the gain bandwidth of the semiconductor optical amplifier. Additionally, the external cavity may include a third resonator that provides for control of the phase of the output beam produced by the laser. A thermally-tuned resonator ECL may operate over a wavelength-tuning range of between 10 nm and 100 nm located between approximately 670 nm and 1700 nm. For example, a thermally-tuned resonator ECL may be part of a wavelength-tunable probe light source 111*pr* that produces the probe beams 120*pr-a*, 120*pr-b*, and 120*pr-c* at the respective frequencies $\nu_{3a}$, $\nu_{3b}$, and $\nu_{3c}$ in FIGS. 20-22.

Figure 8:
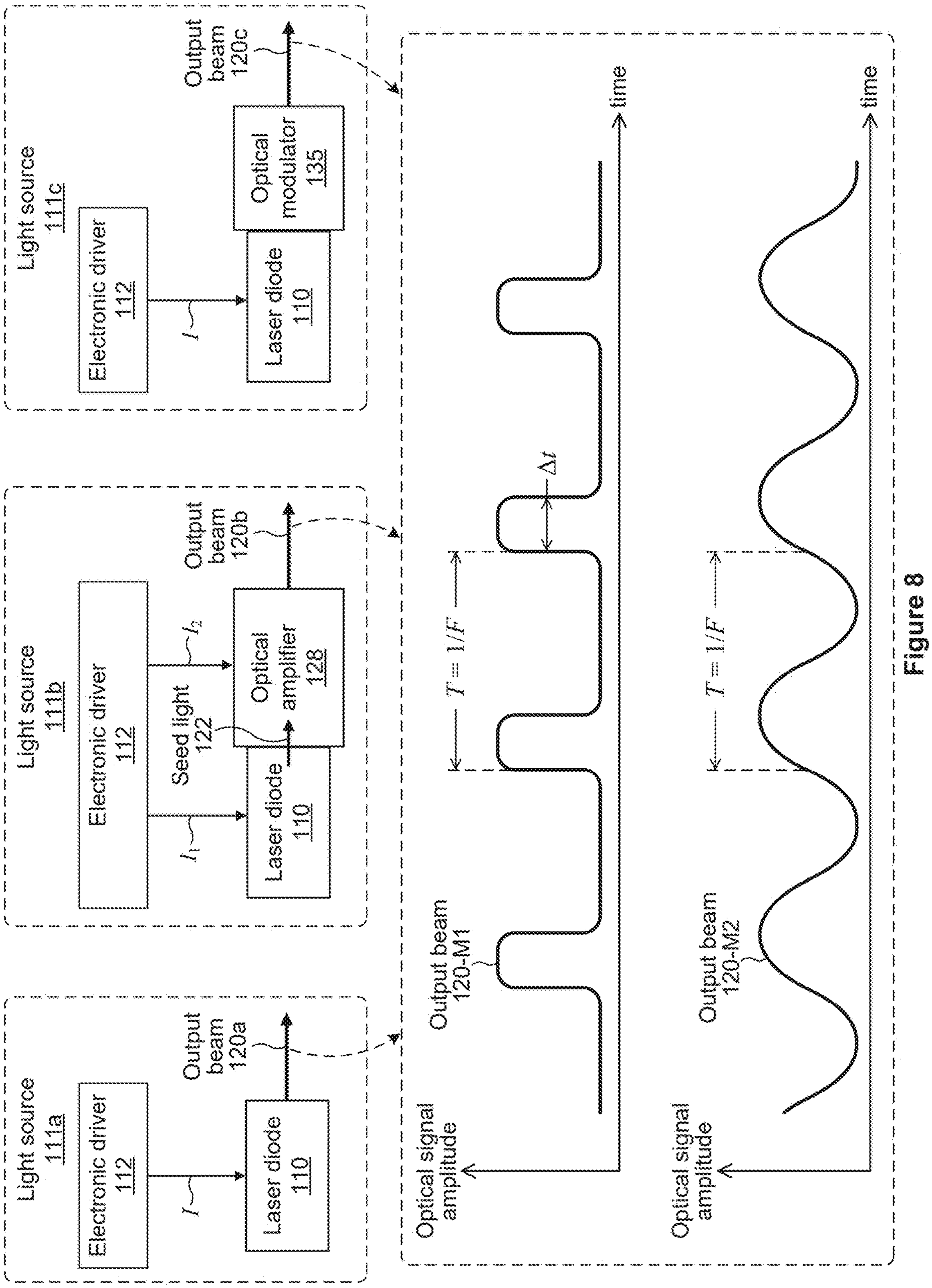
FIG. 8 illustrates three example light sources that each produce a modulated output beam of light.

FIG. 8 illustrates three example light sources that each produce a modulated output beam of light. A light source 111 of a Raman spectroscopy system 100 may include a modulator that applies a modulation to the light source or to an output beam 120 so that the output beam includes an amplitude modulation at a particular modulation frequency F. The modulation frequency F of an amplitude-modulated output beam 120 may have any suitable value, such as for example, 10 kHz, 100 kHz, 1 MHz, 10 MHz, or 100 MHz (which corresponds to a respective period T of 100 μs, 10 μs, 1 μs, 100 ns, or 10 ns). An amplitude-modulated output beam 120 may include pulses of light or a waveform modulation (e.g., a sinusoidal, square-wave, triangle-wave, or sawtooth-wave amplitude modulation). The lower portion of FIG. 8 illustrates two example amplitude-modulated output beams 120. Output beam 120-M1 includes pulses of light with a pulse width Δt and a modulation frequency F. The pulse width Δt of the pulses of light may have any suitable value, such as for example, 1 picosecond (ps), 10 ps, 100 ps, 1 nanosecond (ns), 10 ns, 100 ns, 1 microsecond (μs), 10 μs, 100 μs, 1 millisecond (ms), 10 ms, or 100 ms. Output beam 120-M2 includes a waveform having a sinusoidal modulation with a modulation frequency F. Any of the light sources 111 in FIG. 8 may be a pump light source 111*pu*, a Stokes light source 111S, or a probe light source 111*pr*, and the output beam 120 may be an amplitude-modulated pump beam of light 120*pu*, Stokes beam of light 120S, or probe beam of light 120*pr*.

A modulator may include (i) an electronic driver 112 that applies an electrical voltage or current modulation to a laser diode or optical amplifier or (ii) an optical modulator that applies an optical modulation to an output beam 120. For example, the electronic driver 112 of light source 111*a* may supply a modulated drive current I to the laser diode 110, which results in a corresponding amplitude-modulated output beam 120*a*. The drive current I may include pulses of current that produce an output beam 120*a* with pulses of light or a waveform-modulated current (e.g., a sinusoidal, square-wave, triangle-wave, or sawtooth-wave current) that produces an output beam with a corresponding waveform modulation. As another example, the electronic driver 112 of light source 111*b* may supply a modulated drive current $I_1$ to the laser diode 110 to produce amplitude-modulated seed light 112 that is amplified by the optical amplifier 128 (which may include a SOA 124 or a fiber-optic amplifier 126). Alternatively, the electronic driver 112 of light source 111*b* may supply a substantially constant current $I_1$ to the laser diode 110 and a modulated drive current $I_2$ to the optical amplifier 128. The optical amplifier 128 may include a SOA 124, and the modulated drive current I 2 supplied to the SOA may provide time-dependent optical gain to the seed light 122, resulting in an output beam 120*b* with a corresponding amplitude modulation. As another example, the light source 111*c* includes an optical modulator 135 that applies an optical modulation to the output beam 120*c*. The optical modulator 135 may include an acousto-optic modulator, an electro-optic modulator, or an optical switch that applies a modulation to the output beam 120*c* so that the output beam includes an amplitude modulation.

Figure 9:
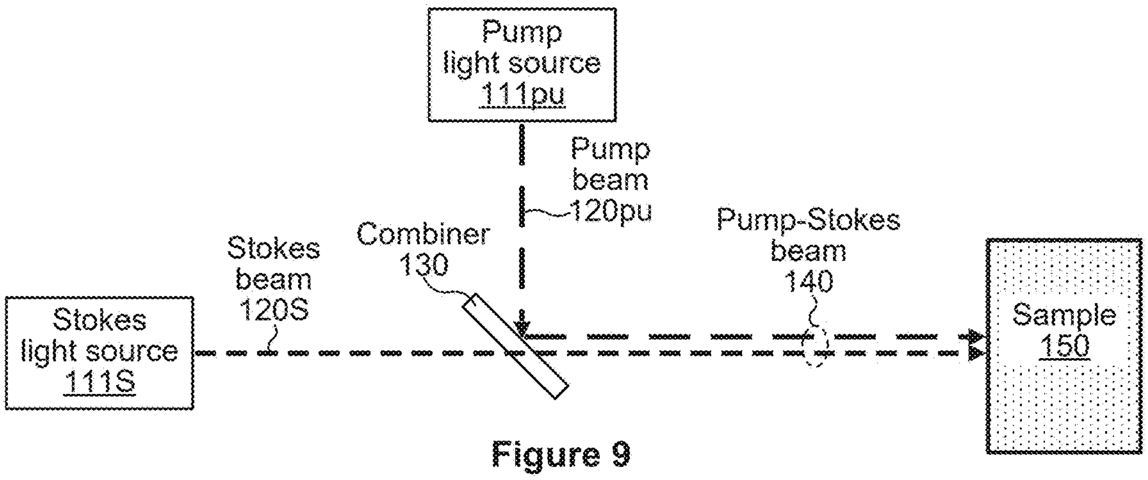
FIGS. 9-11 each illustrate an example optical combiner that combines a pump beam of light and a Stokes beam of light to produce a combined pump-Stokes beam of light.
Figure 10:
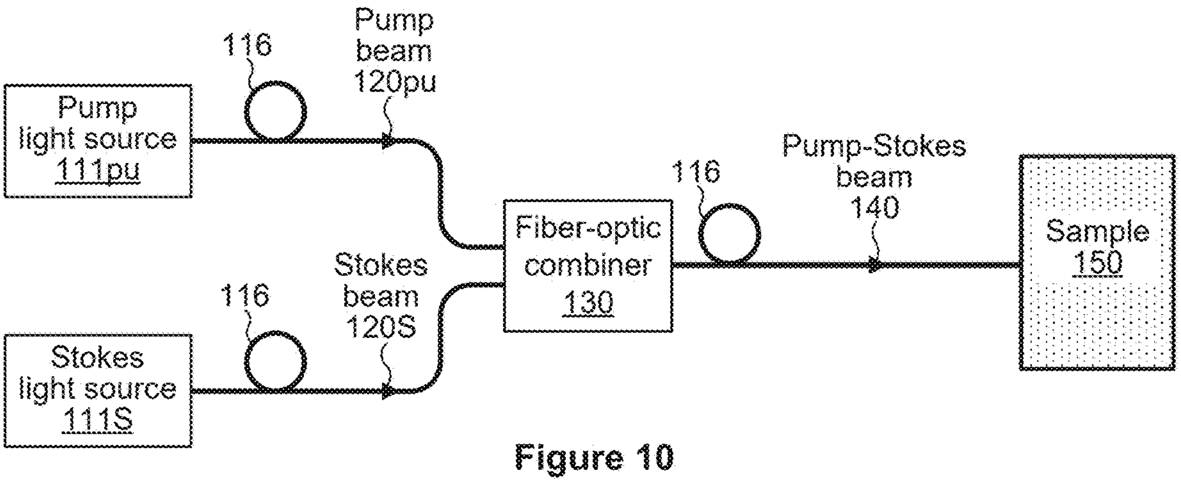
Figure 11:
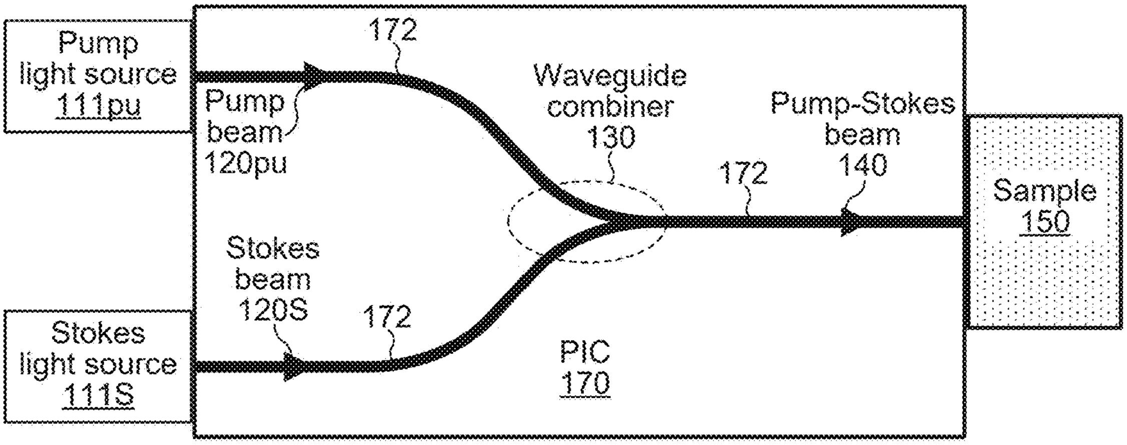

FIGS. 9-11 each illustrate an example optical combiner 130 that produces a combined pump-Stokes beam of light 140. A Raman spectroscopy system 100 may include one or more optical elements that direct pump and Stokes beams to a sample 150. The optical elements may include an optical combiner 130 that combines a pump beam 120*pu* and a Stokes beam 120S to produce a combined pump-Stokes beam 140 that is directed to a sample 150. An optical combiner 130 may include a free-space optical component (e.g., as illustrated in FIG. 9), a fiber-optic component (e.g., as illustrated in FIG. 10), a waveguide-based component (e.g., as illustrated in FIG. 11), or any suitable combination thereof. Each of the optical combiners 130 in FIGS. 9-11 receives a pump beam 120*pu* and Stokes beam 120S and produces a combined pump-Stokes beam 140 that is directed to a sample 150. A combined pump-Stokes beam 140 may be referred to as a pump-Stokes beam.

The pump light source 111*pu* and Stokes light source 111S in FIGS. 9-11 may each include any suitable type of light source. For example, one or more of the light sources 111 in FIGS. 9-11 may include a free-space light source (e.g., similar to that illustrated in FIG. 1), a fiber-coupled light source (e.g., similar to that illustrated in FIG. 2), or a waveguide-based light source (e.g., similar to that illustrated in FIG. 3). As another example, one or more of the light sources 111 in FIGS. 9-11 may include a laser diode 110 and an optical amplifier (e.g., similar to that illustrated in FIGS. 4-5). As another example, one or more of the light sources 111 in FIGS. 9-11 may include multiple laser diodes 110 and an optical multiplexer 118 (e.g., similar to that illustrated in FIG. 6).

The pump and Stokes beams in FIGS. 9-11 may each have any suitable polarization. For example, the pump beam 120*pu* and the Stokes beam 120S may each be linearly, circularly, or elliptically polarized. As another example, the Stokes beam 120S in FIG. 9 may be horizontally or vertically polarized, and the pump beam 120*pu* may be (i) linearly polarized along the same direction as the Stokes beam, (ii) linearly polarized at 45 degrees with respect to the Stokes beam, (iii) linearly polarized at 90 degrees with respect to the Stokes beam, or (iv) circularly or elliptically polarized. As another example, the pump beam 120*pu* in FIG. 9 may be horizontally or vertically polarized, and the Stokes beam 120S may be (i) linearly polarized at 45 degrees with respect to the pump beam, (ii) linearly polarized at 90 degrees with respect to the pump beam, or (iii) circularly or elliptically polarized.

The optical combiner 130 in FIG. 9 is a free-space optical combiner. The pump and Stokes light sources (which may be similar to the light source in FIG. 1) each produce a free-space beam that is directed to the combiner 130. The optical combiner 130 may be a free-space dichroic beamsplitter that reflects light at the pump-beam wavelength and transmits light at the Stokes-beam wavelength. The pump beam 120*pu* may be substantially reflected by the combiner 130 and the Stokes beam 120S may be substantially transmitted through the combiner 130. In other embodiments, an optical combiner 130 may be a dichroic beamsplitter that reflects light at the Stokes-beam wavelength and transmits light at the pump-beam wavelength (e.g., as illustrated by combiner 130*d* in FIG. 15). In FIG. 9, the reflected pump beam 120*pu* and the transmitted Stokes beam 120S are combined by the optical combiner 130 to produce a combined pump-Stokes beam 140 that is directed to the sample 150 as a free-space optical beam. As an example, the pump beam 120*pu* may have a wavelength of approximately 780 nm, and the Stokes beam 120S may have a wavelength of approximately 830 nm. The optical combiner 130 may be a long-pass dichroic beamsplitter that transmits light at wavelengths greater than approximately 800 nm and reflects light at wavelengths less than approximately 800 nm. The optical combiner 130 may reflect the 780-nm pump beam and transmit the 830-nm Stokes beam to produce the combined pump-Stokes beam 140.

The combined pump-Stokes beam 140 in FIG. 9 includes a pump beam 120*pu* and a Stokes beam 120S that are spatially overlapped and co-propagate together along substantially the same optical path. The pump and Stokes beams that make up the combined pump-Stokes beam 140 in FIG. 9 are illustrated as being offset laterally for clarity to allow each beam to be visualized. In other figures described herein, combined optical beams that include two or more spatially overlapped beams may be illustrated with lateral offsets between the beams for clarity to allow the beams to be visualized. For example, the pump-Stokes beam 140 in FIG. 15 includes a spatially overlapped pump beam 120*pu* and Stokes beam 120S that are illustrated as being offset laterally for clarity. As another example, the Raman-Stokes-probe signal 144 in FIG. 15 includes a spatially overlapped Raman signal 160, Stokes beam 120S, and probe beam 120*pr* that are illustrated as being offset laterally for clarity. As another example, the pump-Stokes beam 140 in FIG. 19 includes three spatially overlapped beams (Stokes beam 120S-a, Stokes beam 120S-b, and pump beam 120*pu*) that are illustrated as being offset laterally for clarity. Similarly, the pump-Stokes beam 140 in FIG. 23 includes three spatially overlapped beams (Stokes beam 120S and pump beams 120*pu-a* and 120*pu-b*), and the pump-Stokes beam 140 in FIG. 27 includes four spatially overlapped beams (Stokes beams 120S-a and 120S-b and pump beams 120*pu-a* and 120*pu-b*).

The optical combiner 130 in FIG. 10 is a fiber-optic combiner. The pump and Stokes light sources (which may be similar to the light source in FIG. 2) each produce a fiber-coupled beam that is directed to the combiner 130 by an optical fiber 116, and the combined pump-Stokes beam 140 is directed from the combiner to the sample 150 by another optical fiber. The fiber-optic combiner 130 may include a fiber-optic wavelength division multiplexer (WDM) that includes a dichroic beamsplitter or a fused fiber coupler. For example, the pump beam 120*pu* may have a wavelength between 700 nm and 800 nm, and the Stokes beam 120S may have a wavelength greater than 800 nm. The fiber-optic combiner 130 may be a WDM component that combines the pump beam 120*pu* and the Stokes beam 120S with relatively low optical loss to produce a combined pump-Stokes beam 140. Each of the optical fibers 116 may be a single-mode (SM) fiber, polarization-maintaining (PM) fiber, multi-mode fiber, hollow-core fiber, photonic crystal fiber, or any other suitable type of optical fiber.

The optical combiner 130 in FIG. 11 is a waveguide-based optical combiner that is part of a PIC 170. The pump and Stokes light sources each produce a waveguide-coupled beam that is directed to the optical combiner 130 by an optical waveguide 172. The pump and Stokes light sources in FIG. 11 may each be similar to the light source in FIG. 3. For example, the pump light source 111*pu* or the Stokes light source 111S may include a laser diode 110 that is mechanically attached or connected to the PIC 170 or to a substrate to which the PIC is also attached. Alternatively, the pump light source 111*pu* or Stokes light source 111S may include a fiber-coupled laser diode 110 that is coupled to the PIC 170 via an optical fiber 116. In FIG. 11, the waveguide combiner 130 receives the pump beam 120*pu* and the Stokes beam 120S via two optical waveguides 172 and combines the two beams into a combined pump-Stokes beam 140 that is directed to the sample 150 via another optical waveguide 172.

Figure 12:
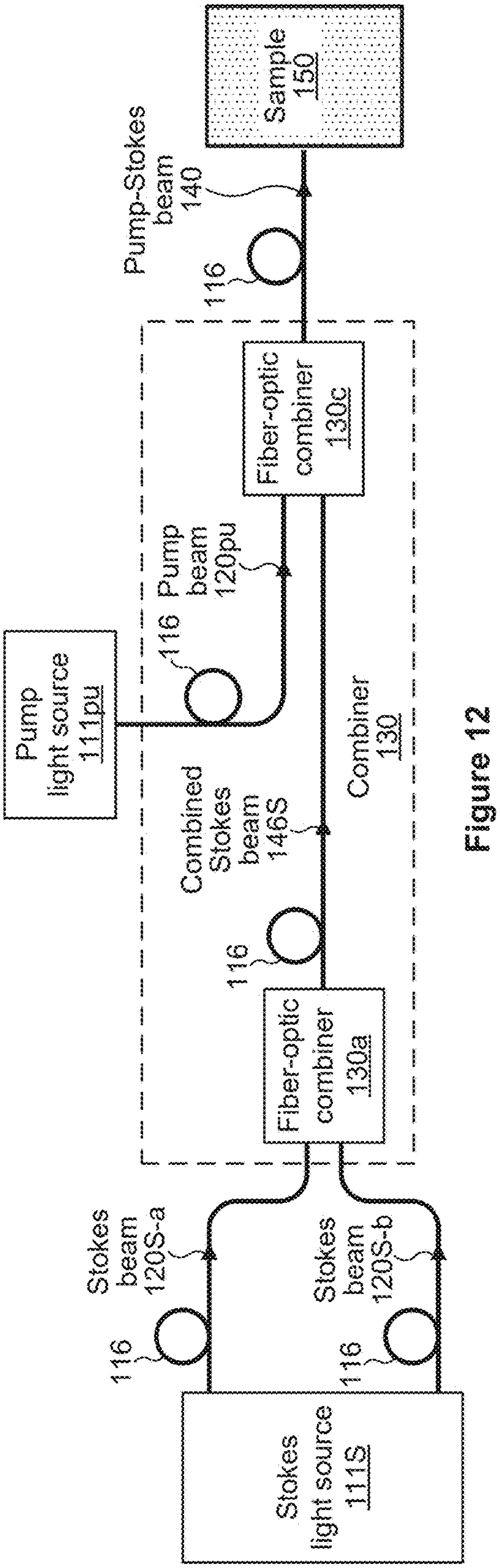
FIGS. 12-14 each illustrate an example optical combiner that combines multiple pump and Stokes beams of light to produce a combined pump-Stokes beam of light.
Figure 13:
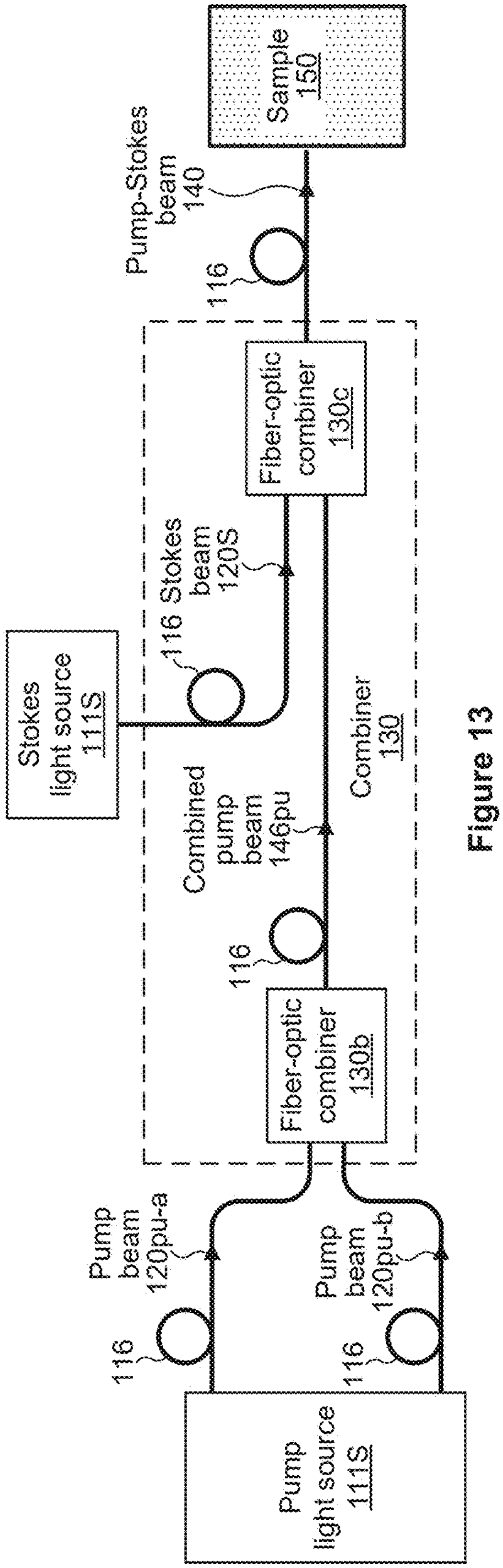
Figure 14:
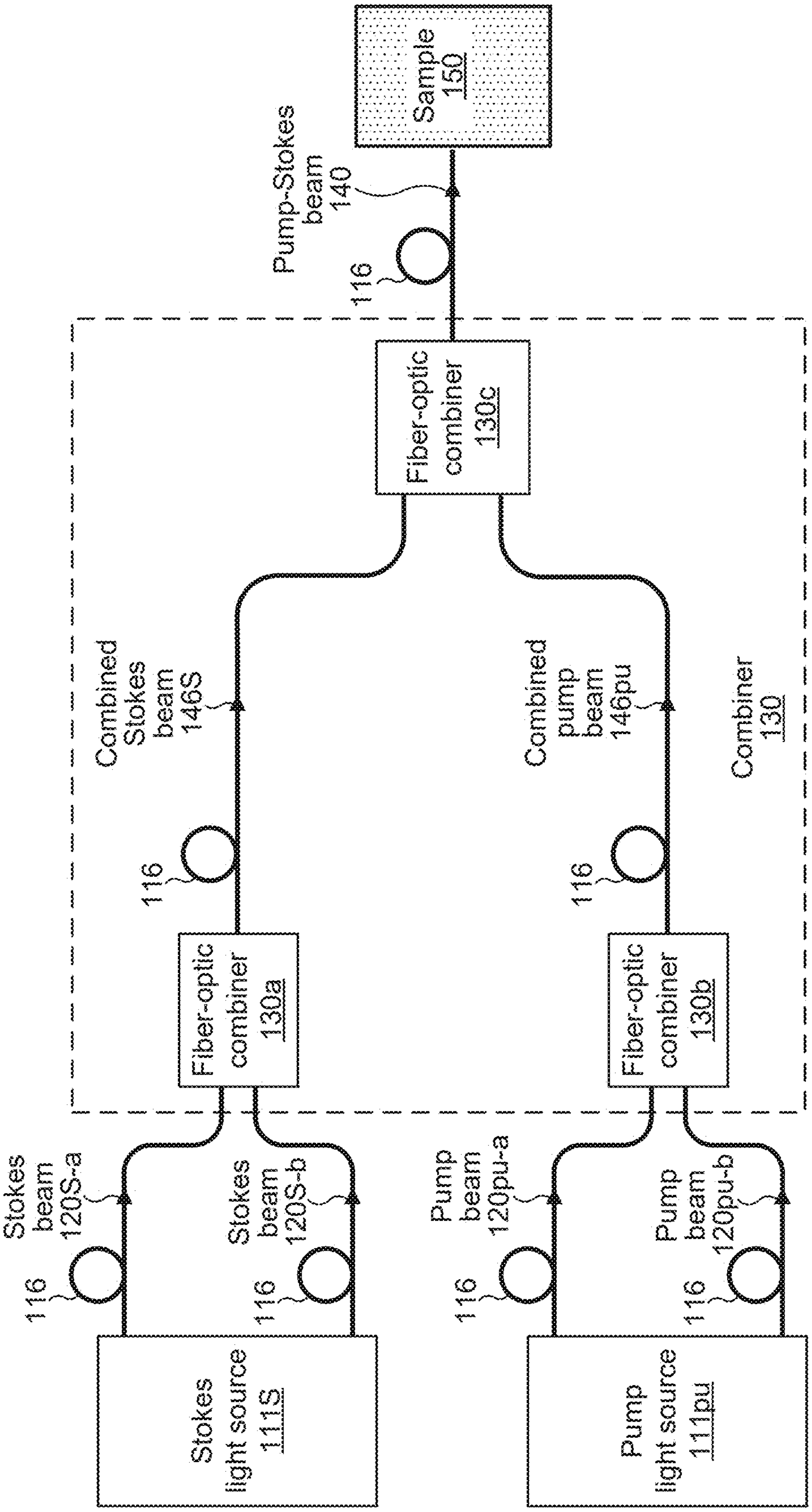

FIGS. 12-14 each illustrate an example optical combiner 130 that combines multiple pump and Stokes beams of light to produce a combined pump-Stokes beam of light 140. A Raman spectroscopy system 100 may include a pump light source 111*pu* and a Stokes light source 111S that together produce three or more beams of light. For example, the three or more beams of light may include: two pump beams and one Stokes beam, one pump beam and two Stokes beams, two pump beams and two Stokes beams, three pump beams and one Stokes beam, one pump beam and three Stokes beams, or any other suitable combination of three or more beams of light that includes at least one pump beam and at least one Stokes beam. A Raman spectroscopy system 100 may include one or more optical elements that direct the three or more beams of light to a sample 150. The optical elements may include an optical combiner 130 that combines the three or more beams of light to produce a combined pump-Stokes beams of light 140 that is directed to the sample 150. The combined pump-Stokes beam of light 140 may include the three or more pump and Stokes beams of light as spatially overlapped beams that propagate to the sample 150 together along substantially the same optical path. In FIGS. 12-14, each of the combined pump-Stokes beams 140 is directed to the sample via an optical fiber 116.

Alternatively, a pump-Stokes beam 140 may be directed to a sample via an optical waveguide or as a free-space optical beam. The example combiners illustrated in FIGS. 12-14 are implemented in optical fiber. Alternatively, all or part of the optical combiners in FIGS. 12-14 may be implemented using a free-space optical combiner (e.g., similar to that illustrated in FIG. 9) or a waveguide-based optical combiner (e.g., similar to that illustrated in FIG. 11).

The optical combiner 130 in FIG. 12 produces a combined pump-Stokes beam 140 that includes three beams of light: a pump beam 120*pu* and two Stokes beams 120S-a and 120S-b. The optical combiner 130 in FIG. 12 includes two fiber-optic combiners 130*a* and 130*c*. Fiber-optic combiner 130*a* receives the two Stokes beams 120S-a and 120S-b via two optical fibers 116 and produces a combined Stokes beam 146S that is directed to fiber-optic combiner 130*c* via another optical fiber 116. Fiber-optic combiner 130*a* may include a 50/50 non-dichroic combiner so that the combined Stokes beam 146S includes approximately 50% of the optical power of the received Stokes beam 120S-a and approximately 50% of the optical power of the received Stokes beam 120S-b. Fiber-optic combiner 130*c* receives the pump beam 120*pu* and the combined Stokes beam 146S via two optical fibers 116 and produces the combined pump-Stokes beam 140 that is directed to the sample 150 via another optical fiber 116. Fiber-optic combiner 130*c* may include a WDM that combines the pump beam 120*pu* and the two Stokes beams 120S-a and 120S-b with relatively low optical loss to produce the pump-Stokes beam 140 in FIG. 12. The optical combiner 130 that is part of the Raman spectroscopy system 100 in FIG. 19 may be similar to the optical combiner 130 in FIG. 12.

The optical combiner 130 in FIG. 13 produces a combined pump-Stokes beam 140 that includes three beams of light: two pump beams 120*pu-a* and 120*pu-b* and a Stokes beam 120S. The optical combiner 130 in FIG. 13 includes two fiber-optic combiners 130*b* and 130*c*. Fiber-optic combiner 130*b* receives the two pump beams 120*pu-a* and 120*pu-b* via two optical fibers 116 and produces a combined pump beam 146*pu* that is directed to fiber-optic combiner 130*c* via another optical fiber 116. Fiber-optic combiner 130*b* may include a 50/50 non-dichroic combiner so that the combined pump beam 146*pu* includes approximately 50% of the optical power of the received pump beam 120*pu-a* and approximately 50% of the optical power of the received pump beam 120*pu-b*. Fiber-optic combiner 130*c* receives the Stokes beam 120S and the combined pump beam 146*pu* via two optical fibers 116 and produces the combined pump-Stokes beam 140 that is directed to the sample 150 via another optical fiber 116. Fiber-optic combiner 130*c* may include a WDM that combines the Stokes beam 120S and the two pump beams 120*pu-a* and 120*pu-b* with relatively low optical loss to produce the pump-Stokes beam 140 in FIG. 13. The optical combiner 130 that is part of the Raman spectroscopy system 100 in FIG. 23 may be similar to the optical combiner 130 in FIG. 13.

The optical combiner 130 in FIG. 14 produces a combined pump-Stokes beam 140 that includes four beams of light: two pump beams 120*pu-a* and 120*pu-b* and two Stokes beams 120S-a and 120S-b. The optical combiner 130 in FIG. 14 includes three fiber-optic combiners 130*a*, 130*b*, and 130*c*. Fiber-optic combiner 130*a* (which is similar to combiner 130*a* in FIG. 12) receives the two Stokes beams 120S-a and 120S-b via two optical fibers 116 and produces a combined Stokes beam 146S that is directed to fiber-optic combiner 130*c* via another optical fiber 116. Fiber-optic combiner 130*b* (which is similar to combiner 130*b* in FIG. 13) receives the two pump beams 120*pu-a* and 120*pu-b* via two optical fibers 116 and produces a combined pump beam 146*pu* that is directed to fiber-optic combiner 130*c* via another optical fiber 116. Fiber-optic combiner 130*c* receives the combined Stokes beam 146S and the combined pump beam 146*pu* via two optical fibers 116 and produces the combined pump-Stokes beam 140 that is directed to the sample 150 via another optical fiber 116. Fiber-optic combiner 130*c* (which is similar to combiner 130*c* in FIGS. 12 and 13) may include a WDM that combines the two Stokes beams 120S-a and 120S-b and the two pump beams 120*pu-a* and 120*pu-b* with relatively low optical loss to produce the pump-Stokes beam 140 in FIG. 14. The optical combiner 130 that is part of the Raman spectroscopy system 100 in FIG. 27 may be similar to the optical combiner 130 in FIG. 14.

Figure 15:
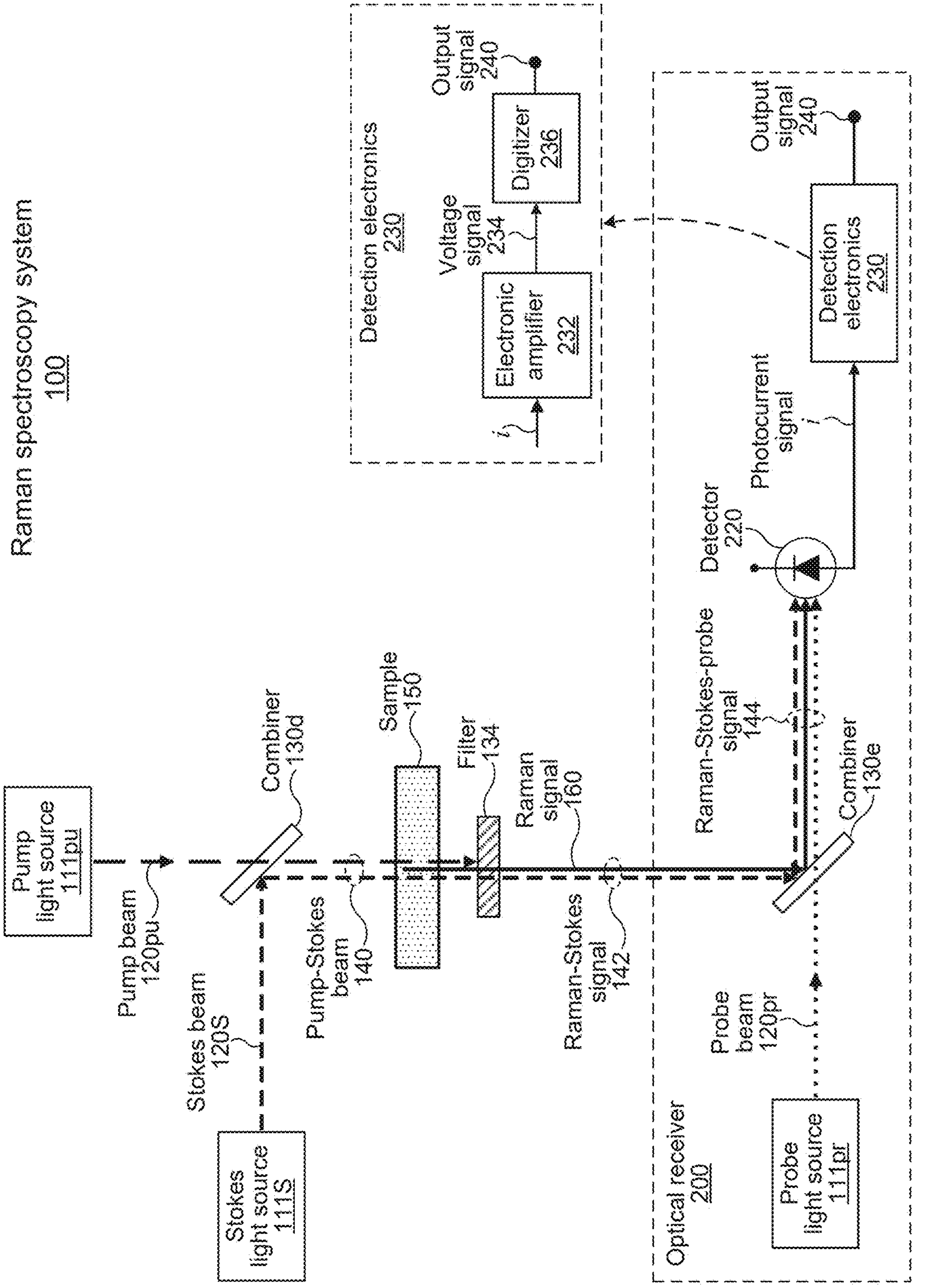
FIG. 15 illustrates an example Raman spectroscopy system configured to measure a Raman signal.

FIG. 15 illustrates an example Raman spectroscopy system 100 configured to measure a Raman signal 160. The pump beam 120*pu* and the Stokes beam 120S in FIG. 15 are combined at the optical combiner 130*d* to produce a combined pump-Stokes beam 140 that is directed to a sample 150. The pump and Stokes beams interact with the sample 150, and a Raman signal 160 is produced by coherent Raman scattering of the pump and Stokes beam of light at the sample. After interacting with the sample, a Raman-Stokes signal 142 is collected and directed to an optical receiver 200 for measurement. The Raman-Stokes signal includes (i) the Raman signal 160 produced at the sample 150 and (ii) the Stokes beam of light 120S after the Stokes beam has interacted with the sample. Measurement of the Raman-Stokes signal 142 includes coherent mixing of the Raman-Stokes signal with a probe beam of light 120*pr* at an optical detector 220 to produce a photocurrent signal i. Herein, measurement of a Raman-Stokes signal 142 may also be referred to as measurement of the corresponding Raman signal 160 that is part of the Raman-Stokes signal. The Raman spectroscopy system 100 in FIG. 15 may be referred to as a Raman spectroscopy system with coherent detection or a Raman spectroscopy system with heterodyne detection.

The Raman spectroscopy system in FIG. 15 includes a pump light source 111*pu*, a Stokes light source 111S, and a probe light source 111*pr*. The pump light source 111*pu* produces a pump beam of light 120*pu* at a pump frequency, which may be referred to as a first frequency and may be represented by $\nu_1$, $\nu_{pu}$, $\omega_1$, or $\omega_{pu}$. The Stokes light source 111S produces a Stokes beam of light 120S at a Stokes frequency, which may be referred to as a second frequency and may be represented by $\nu_2$, $\nu_S$, $\omega_2$, or $\omega_S$. The probe light source 111*pr* produces a probe beam of light 120*pr* at a probe frequency, which may be referred to as a third frequency and may be represented by $\nu_3$, $\nu_{pr}$, $\omega_3$, or $\omega_{pr}$. The pump and Stokes frequencies may be offset by a frequency offset Ω, where Ω equals $\nu_1-\nu_2$. Generally, the pump frequency $\nu_1$ is greater than the Stokes frequency $\nu_2$, and the frequency offset Ω is a positive value. The pump light source 111*pu* or Stokes light source 111S may be a wavelength-tunable light source that includes a wavelength-tunable laser, and the frequency offset Ω between the pump and Stokes beams of light may be adjustable by changing the wavelength of light produced by the wavelength-tunable laser. Changing the frequency offset Ω allows the Raman spectroscopy system 100 to perform measurements of multiple Raman-Stokes signals 142 at multiple different values of Ω. By performing measurements at multiple different values of Ω, the Raman spectroscopy system 100 may determine a Raman spectrum associated with the sample 150.

Each of the light sources 111 in FIG. 15 may be similar to or may include a light source, laser diode, or laser as illustrated in any of FIGS. 1-7 or described herein. For example, each of the light sources 111 in FIG. 15 may be a free-space light source, a fiber-coupled light source, or a waveguide-based light source. Additionally, each of the light sources 111 in FIG. 15 may be a fixed-wavelength light source or a wavelength-tunable light source. For example, the pump light source 111*pu*, Stokes light source 111S, or probe light source 111*pr* may be a wavelength-tunable light source that includes a wavelength-tunable laser. The optical frequency ν of an output beam 120 produced by the wavelength-tunable laser may be adjusted by changing the wavelength of light produced by the wavelength-tunable laser. Herein, the optical frequency ν and the wavelength λ of an output beam 120 may be used or referred to in a similar manner and may be related by the expression $\lambda \times \nu = c$, where c is the speed of light. For example, an output beam of light 120 with a wavelength of 835 nm may be referred to as having a frequency of approximately 359 terahertz (THz). As another example, an output beam of light 120 with a wavelength that is changed by 10 nm from 1050 nm to 1060 nm may be referred to as having a frequency that is changed by 2.69 THz from 285.5 THz to 282.8 THz.

A Raman spectroscopy system 100 may include one or more optical elements that direct a pump beam 120*pu* and a Stokes beam 120S to a sample 150. For example, the optical elements may include an optical combiner 130 that combines the pump and Stokes beams into a single beam that is directed to the sample 150. Additionally, a Raman spectroscopy system 100 may include one or more optical elements that collect a Raman-Stokes signal 142 and direct the Raman-Stokes signal to an optical receiver 200. The optical elements (which may be referred to as optical components) of a Raman spectroscopy system 100 may include free-space optics (which may be referred to as bulk optics), fiber-optic components, waveguide-based optics, metamaterials, or any suitable combination thereof. The optical elements may include one or more of the following: mirror, lens, optical combiner (e.g., dichroic or non-dichroic beamsplitter), waveplate, polarizer, optical filter, optical fiber, photonic integrated circuit, optical waveguide, metamaterial-based optic. For example, the optical elements may include a lens (not illustrated in FIG. 15) that (i) focuses the combined pump-Stokes beam 140 into or onto the sample 150 or (ii) collects the Raman-Stokes signal 142 from the sample. A collection lens may receive the Raman-Stokes signal 142 and produce a collimated or focused beam that is directed to the optical receiver 200.

The optical elements of the Raman spectroscopy system 100 in FIG. 15 include an optical combiner 130*d* that combines the pump beam 120*pu* and Stokes beam 120S to produce a combined pump-Stokes beam 140 that is directed to the sample 150. The combined pump-Stokes beam 140 includes the pump and Stokes beams as spatially overlapped beams that propagate to the sample 150 together along substantially the same optical path. The optical elements of the Raman spectroscopy system in FIG. 15 also include an optical combiner 130*e* that combines the probe beam 120*pr* and the Raman-Stokes signal 142 to produce a combined Raman-Stokes-probe signal 144 that is directed to the optical detector 220. The combined Raman-Stokes-probe signal 144 includes the Raman signal 160, Stokes beam 120S, and probe beam 120*pr* as spatially overlapped beams that propagate together along substantially the same optical path. Each of the optical combiners 130*d* and 130*e* in FIG. 15 may be similar to the optical combiner 130 in any of FIGS. 9-11. For example, each of the optical combiners 130*d* and 130*e* may be a free-space optical combiner (e.g., as illustrated in FIG. 9), a fiber-optic combiner (e.g., as illustrated in FIG. 10), or a waveguide-based combiner (e.g., as illustrated in FIG. 11). The optical combiner 130*d* in FIG. 15 may be a dichroic beamsplitter that reflects light at the Stokes-beam wavelength and transmits light at the pump-beam wavelength. The optical combiner 130*e* in FIG. 15 may be an R/T non-dichroic beamsplitter that reflects R % of an incident beam and transmits T % of the beam (where R+T is approximately 100). For example, the optical combiner may be an 80/20 free-space non-dichroic beamsplitter that reflects approximately 80% of the incident Raman-Stokes signal 142 and transmits approximately 20% of the probe beam 120*pr*. As another example, the optical combiner may be a 50/50 free-space non-dichroic beamsplitter that reflects approximately 50% of the incident Raman-Stokes signal 142 and transmits approximately 50% of the probe beam 120*pr*.

The optical elements of a Raman spectroscopy system 100 may include one or more optical filters 134. An optical filter may be configured to transmit one or more particular wavelengths of light and block or reflect light at one or more other wavelengths. For example, an optical filter 134 may transmit light at one or more wavelengths associated with a Raman signal 160 and Stokes beam 120S and block or reflect light at one or more wavelengths associated with a pump beam 120*pu*. Alternatively, an optical filter 134 may reflect light at one or more wavelengths associated with a Raman signal 160 and Stokes beam 120S and block or transmit light at one or more wavelengths associated with a pump beam 120*pu*. The Raman spectroscopy system 100 in FIG. 15 includes an optical filter 134 located between the sample 150 and the optical receiver 200. The optical filter 134 transmits the Raman signal 160 and the Stokes beam 120S, which then propagates to the optical receiver 200 as the Raman-Stokes signal 142. Additionally, the optical filter 134 blocks the pump beam 120*pu*, which prevents the pump light from propagating to the detector 220. For example, the optical filter 134 may transmit greater than 90% of the Raman signal 160 and Stokes beam 120S and block greater than 90% of the pump beam 120*pu*.

In some embodiments, an optical filter 134 may be a dichroic beamsplitter that transmits a Raman signal 160 and Stokes beam 120S and reflects a pump beam 120*pu*. A Raman spectroscopy system 100 may include a second optical receiver (not illustrated in FIG. 15), and the reflected pump beam 120*pu* may be directed to the second optical receiver for measurement. Alternatively, an optical filter 134 may be a dichroic beamsplitter that reflects a Raman signal 160 and Stokes beam 120S and transmits a pump beam 120*pu*. The reflected Raman-Stokes signal may be directed to a first optical receiver for measurement, and the transmitted pump beam may be directed to a second optical receiver for measurement.

The Raman spectroscopy system 100 in FIG. 15 includes an optical receiver 200 that measures a Raman-Stokes signal 142 produced by the pump and Stokes beams at the sample 150. The optical receiver 200 (which may be referred to as a heterodyne optical receiver or an optical receiver with coherent detection) measures the Raman-Stokes signal 142 using an optical heterodyne technique in which the Raman-Stokes signal 142 is coherently mixed with a probe beam of light 120*pr*. The optical receiver 200 includes a detector 220 and detection electronics 230. The optical combiner 130*d*

(which may be a free-space, fiber-optic, or waveguide-based optical combiner) combines the Raman-Stokes signal 142 and the probe beam 120*pr* to produce a Raman-Stokes-probe signal 144 that is directed to the detector 220. The Raman-Stokes-probe signal 144 includes the Raman signal 160, the Stokes beam 120S after interacting with the sample 150, and the probe beam 120*pr*. The Raman-Stokes-probe signal 144 may be directed to the detector 220 as a free-space optical beam, as a fiber-coupled optical beam, or as a waveguide-coupled optical beam. The Raman-Stokes signal 142 and the probe beam 120*pr* are coherently mixed at the detector 220, and this optical-heterodyne mixing process produces an analog photocurrent signal i (which may be referred to as a photocurrent, a photocurrent signal, or a current signal). The detection electronics 230 receives the photocurrent signal i and produces an electronic output signal 240 that corresponds to the photocurrent signal. The detection electronics 230 may include or may be referred to as an electronic circuit.

The output signal 240 in FIG. 15 may be a digital signal that is sent to a processor, and the processor may determine a characteristic of the photocurrent signal i based on the digital output signal 240. A processor of a Raman spectroscopy system 100 may include or may be referred to as a computer system, a controller, a computing device, a computing system, a computer, or a data-processing apparatus. A processor may be similar to the computer system 1000 illustrated in FIG. 42 and described herein. In some embodiments, a processor or a portion of a processor may be located in the optical receiver 200. For example, a processor located in the receiver 200 may receive a digital output signal 240 and perform some preprocessing of the digital signal before sending data to another processor located within or external to the Raman spectroscopy system 100.

A Raman spectroscopy system 100 may include one or more optical detectors 220. An optical detector 220 (which may be referred to as a detector, photodetector, or photodiode) may include a PN photodiode, PIN photodiode, avalanche photodiode (APD), single-photon avalanche diode (SPAD), silicon photomultiplier (SiPM), or photomultiplier tube (PMT). A PN photodiode refers to a photodiode structure formed by a p-doped semiconductor and an n-doped semiconductor, where the PN acronym refers to the structure having p-doped and n-doped regions. A PIN photodiode refers to a photodiode structure formed by an undoped intrinsic semiconductor region located between p-doped and n-doped regions, where the PIN acronym refers to the structure having p-doped, intrinsic, and n-doped regions.

A PN photodiode, PIN photodiode, APD, or SPAD may include any suitable semiconductor material, such as for example: silicon, germanium, gallium arsenide (GaAs), indium phosphide (InP), indium arsenide (InAs), aluminum arsenide (AlAs), indium antimonide (InSb), aluminum antimonide (AlSb), gallium antimonide (GaSb), aluminum gallium arsenide (AlGaAs), indium gallium arsenide (InGaAs), indium aluminum arsenide (InAlAs), indium arsenide antimonide (InAsSb), aluminum arsenide antimonide (AlAsSb), aluminum gallium antimonide (AlGaSb), gallium arsenide antimonide (GaAsSb), aluminum indium arsenide antimonide (AlInAsSb), indium gallium arsenide antimonide (InGaAsSb), indium gallium aluminum arsenide (InGaAlAs), aluminum gallium arsenide antimonide (AlGaAsSb), or silicon germanium (SiGe). For example, the Raman-Stokes signal 142 in FIG. 15 may have a wavelength in the 400-1100 nm range, and the detector 220 may include a silicon PIN photodiode or a silicon APD. As another example, the Raman-Stokes signal 142 may have a wavelength in the 1000-1700 nm range, and the detector 220 may include an InGaAs PIN photodiode. As another example, a detector 220 may include an APD that includes a semiconductor material with antimonide (e.g., InSb, AlSb, GaSb, InAsSb, AlAsSb, AlGaSb, GaAsSb, AlInAsSb, InGaAsSb, or AlGaAsSb).

The detection electronics 230 of an optical receiver 200 may include an electronic amplifier 232 and a digitizer 236. The electronic amplifier 232 may include a transimpedance amplifier that amplifies the photocurrent signal i to produce an analog voltage signal 234 that corresponds to the photocurrent signal i. For example, the photocurrent signal i and the voltage signal 234 may have similar temporal shapes or may include similar electronic frequency components. The electronic amplifier 232 may include an additional gain stage that further amplifies an intermediate voltage signal produced by the transimpedance amplifier to produce the voltage signal 234. Additionally, the electronic amplifier 232 may include an electronic filter (e.g., a low-pass, high-pass, or band-pass filter) that filters the photocurrent signal or voltage signal. For example, the electronic amplifier 232 may include (i) a high-pass filter that removes a DC offset and low-frequency components (e.g., frequency components below 10 MHz) from the photocurrent signal or (ii) a band-pass filter that removes the DC and low-frequency components as well as high-frequency components (e.g., frequency components above 2 GHZ). As another example, the electronic amplifier 232 may include a band-pass filter having a pass-band that includes the frequency $|\nu_2-\nu_3|$, which corresponds to the frequency offset ΔF between the Stokes beam 120S and the probe beam 120*pr*.

The digitizer 236 in FIG. 15 receives the voltage signal 234 and produces an electronic output signal 240 that corresponds to the voltage signal 234. The output signal 240 may be referred to as corresponding to or representing the photocurrent signal, since the output signal corresponds to the voltage signal 234 which in turn corresponds to the photocurrent signal i. The output signal 240 may be a digital signal that includes a digital representation of the voltage signal 234 or may include a digital value corresponding to the voltage signal. For example, the digitizer 236 may include an analog-to-digital converter (ADC) that produces a digital version of the voltage signal 234, and the output signal 240 may include a time-domain digital representation of the voltage signal 234. Additionally or alternatively, the output signal 240 may include a frequency-domain representation of the voltage signal, or the time-domain digital representation of the voltage signal 234 may be sent to a processor that determines a frequency-domain representation. As another example, the digitizer 236 may include a lock-in amplifier or a boxcar averager, and the output signal 240 may include a digital value that corresponds to the size of an amplitude modulation of the voltage signal 234, which in turn corresponds to the size of an amplitude modulation of the photocurrent signal i. As another example, the digitizer 236 may include a sample-and-hold circuit, and the output signal may include a digital value that corresponds to the size of an amplitude modulation of the voltage signal 234.

The electronic bandwidth of an optical receiver 200 refers to a range of electronic frequencies over which an optical receiver may detect an optical signal. For example, if an optical signal includes an amplitude-modulation signal at a frequency within the electronic bandwidth of an optical receiver 200, then the optical receiver may detect the amplitude-modulation signal. As another example, if coherent mixing of a Raman-Stokes signal 142 and a probe beam 120*pr* produces a photocurrent signal i having an amplitude modulation at one or more frequencies within the electronic bandwidth of an optical receiver 200, then the optical receiver may detect the amplitude-modulated photocurrent signal. Detection of an optical signal refers to (i) a detector 220 producing a photocurrent signal i that corresponds to the optical signal and (ii) an electronic amplifier 232 producing a voltage signal 234 that corresponds to the photocurrent signal. The electronic bandwidth of an optical receiver 200 is determined by the bandwidth of the detector 220 in combination with the bandwidth of the electronic amplifier 232 that amplifies the photocurrent signal i produced by the detector. The electronic-amplifier bandwidth may include the bandwidth of an electronic amplifier in combination with any electronic filters coupled to the amplifier. For example, an optical receiver 200 with a detector 220 having a bandwidth of DC-1 GHz and an electronic amplifier 232 having a bandwidth of 100 MHz to 500 MHz may be referred to as having a 400-MHz electronic bandwidth that extends from 100 MHz to 500 MHz.

An optical receiver 200 of a Raman spectroscopy system 100 may have an electronic bandwidth between approximately 10 MHz and approximately 10 GHz. For example, the optical receiver 200 in FIG. 15 may have an electronic bandwidth that extends from a lower cutoff frequency to an upper cutoff frequency. The lower cutoff frequency may be approximately DC (i.e., zero hertz), 1 MHz, 10 MHz, 50 MHz, 100 MHz, or any other suitable lower-frequency value, and the upper cutoff frequency may be approximately 10 MHz, 100 MHz, 1 GHZ, 2 GHZ, 5 GHz, 10 GHz, or any other suitable upper-frequency value. An optical receiver 200 with an electronic bandwidth that extends from 100 MHz to 500 MHz may be referred to as having a 400-MHz electronic bandwidth that extends from a lower cutoff frequency of 100 MHz to an upper cutoff frequency of 500 MHz, and the optical receiver may detect an amplitude-modulated signal with one or more frequencies between the lower and upper cutoff frequencies.

A Raman-Stokes signal 142 and a probe beam 120*pr* may have a frequency offset of ΔF, where $\Delta F=|\nu_2-\nu_3|$. Coherent mixing of the Raman-Stokes signal 142 and the probe beam 120*pr* may produce a photocurrent signal i with an amplitude modulation at the frequency ΔF, and an optical receiver 200 may have an electronic bandwidth that includes the frequency ΔF. For example, the frequencies of the Stokes and probe beams may be selected so that the Stokes-probe frequency offset ΔF is less than an upper cutoff frequency of the optical receiver 200 and greater than a lower cutoff frequency of the optical receiver. As another example, the frequency offset ΔF between a Raman-Stokes signal 142 and a probe beam 120*pr* may be 500 MHz, and coherent mixing of the Raman-Stokes signal and probe beam at a detector 220 may produce a photocurrent signal i that includes an amplitude modulation at 500 MHz. The optical receiver 200 may have a 100-MHz electronic bandwidth that extends from a lower cutoff at 450 MHz to an upper cutoff at 550 MHz to allow the optical receiver to amplify and measure the 500-MHz amplitude-modulated photocurrent signal.

In FIG. 15, the combined pump-Stokes beam 140 is directed to a sample 150, and a Raman signal 160 is produced by coherent Raman scattering of the pump and Stokes beams at the sample. The sample 150 may be a solid, liquid, or gas, or any combination thereof. The sample 150 may include a biological material, an organic material, an inorganic material, a crystalline material, an amorphous solid material, or any other suitable material or combination of suitable materials. For example, the sample 150 may include a drug, mineral, food, contaminant, or explosive material that produces a Raman signal 160 in response to excitation by the pump and Stokes beams. As another example, the sample 150 may be a biological material (e.g., blood, urine, saliva, sweat, or cerebrospinal fluid) and a component or molecule (e.g., glucose or cortisol) that is part of the biological material may produce a Raman signal 160 in response to the pump-Stokes beam 140. As another example, the sample 150 may be water or wastewater, and a component of the sample (e.g., a contaminant, virus, bacteria, or an indicator of an infectious disease) may include a molecule that produces a Raman signal 160 in response to the pump-Stokes beam 140.

The Raman signal 160 in FIG. 15 may be produced by coherent Raman scattering of the pump and Stokes beams at the sample 150. For example, the pump and Stokes beams may interact with a material (e.g., a molecule having a particular composition) that is part of the sample 150 via a coherent Raman scattering process to produce a Raman signal 160. A coherent Raman scattering (CRS) process may include stimulated Raman scattering (SRS), coherent anti-Stokes Raman scattering (CARS), or Raman-induced Kerr effect (RIKE). For example, if the frequency offset Ω between the pump and Stokes beams corresponds to a Raman peak of a particular molecule in the sample 150, then the pump and Stokes beams may interact with those molecules to produce a Raman signal 160 through SRS. The stimulated Raman scattering process may cause the pump beam 120*pu* to lose photons through stimulated Raman loss and the Stokes beam 120S to gain photons through stimulated Raman gain. Photons that are added to the Stokes beam 120S through SRS may be referred to as the Raman signal 160, and these Raman-signal photons may have approximately the same frequency as the Stokes beam.

In a coherent Raman scattering process, the frequency offset Ω between the pump and Stokes beams may be approximately equal to a vibrational frequency or an electronic-transition frequency of a material that is part of the sample 150. The vibrational frequency of the particular material may correspond to a molecular vibration of a molecule, or in the case of a crystalline material, the vibrational frequency may correspond to a lattice vibration of a crystal. For example, the sample 150 may be a sample of blood that includes glucose, and the frequency offset Ω may be approximately equal to a frequency of a molecular vibration of glucose. The pump and Stokes beams may interact with glucose molecules through stimulated Raman scattering to produce a Raman signal 160. The resulting Raman signal 160 may be relatively large (e.g., as compared to a Raman signal produced by spontaneous Raman scattering) since the pump-Stokes frequency offset Ω matches the resonant vibrational frequency of the glucose. If the pump or Stokes frequency is changed so that the frequency offset Ω does not match a vibrational frequency of glucose, then the resulting Raman signal 160 produced by this non-resonant Raman interaction of the pump and Stokes beams with the glucose may be relatively small. For example, the size of a Raman signal 160 produced by the pump and Stokes beams in a non-resonant interaction with glucose may be comparable to a Raman signal produced by spontaneous Raman scattering.

A Raman spectroscopy system 100 may perform measurements of multiple Raman-Stokes signals 142 produced using multiple different values of the pump-Stokes frequency offset Ω. By measuring a Raman-Stokes signal 142 as a function of the frequency offset Ω, a Raman spectroscopy system 100 may determine a Raman spectrum associated with a sample 150. For example, a first frequency offset Ω that results in a relatively large Raman signal 160 may correspond to a peak of the Raman spectrum, and a second frequency offset that results in a relatively small Raman signal may correspond to a non-resonant region of the Raman spectrum having little or no peak. Additionally, based on the determined Raman spectrum, the system may determine (i) whether a particular material (e.g., a molecule such as glucose) is present in the sample 150 or (ii) the amount or concentration of the particular material in the sample. For example, the concentration of glucose in the sample 150 may be proportional to the amplitude of a photocurrent signal i produced by coherent mixing of the Raman-Stokes signal 142 and the probe beam 120*pr*. Based on the size of the photocurrent signal i, a processor may determine the amount or concentration of glucose molecules in the sample 150.

Figure 16:
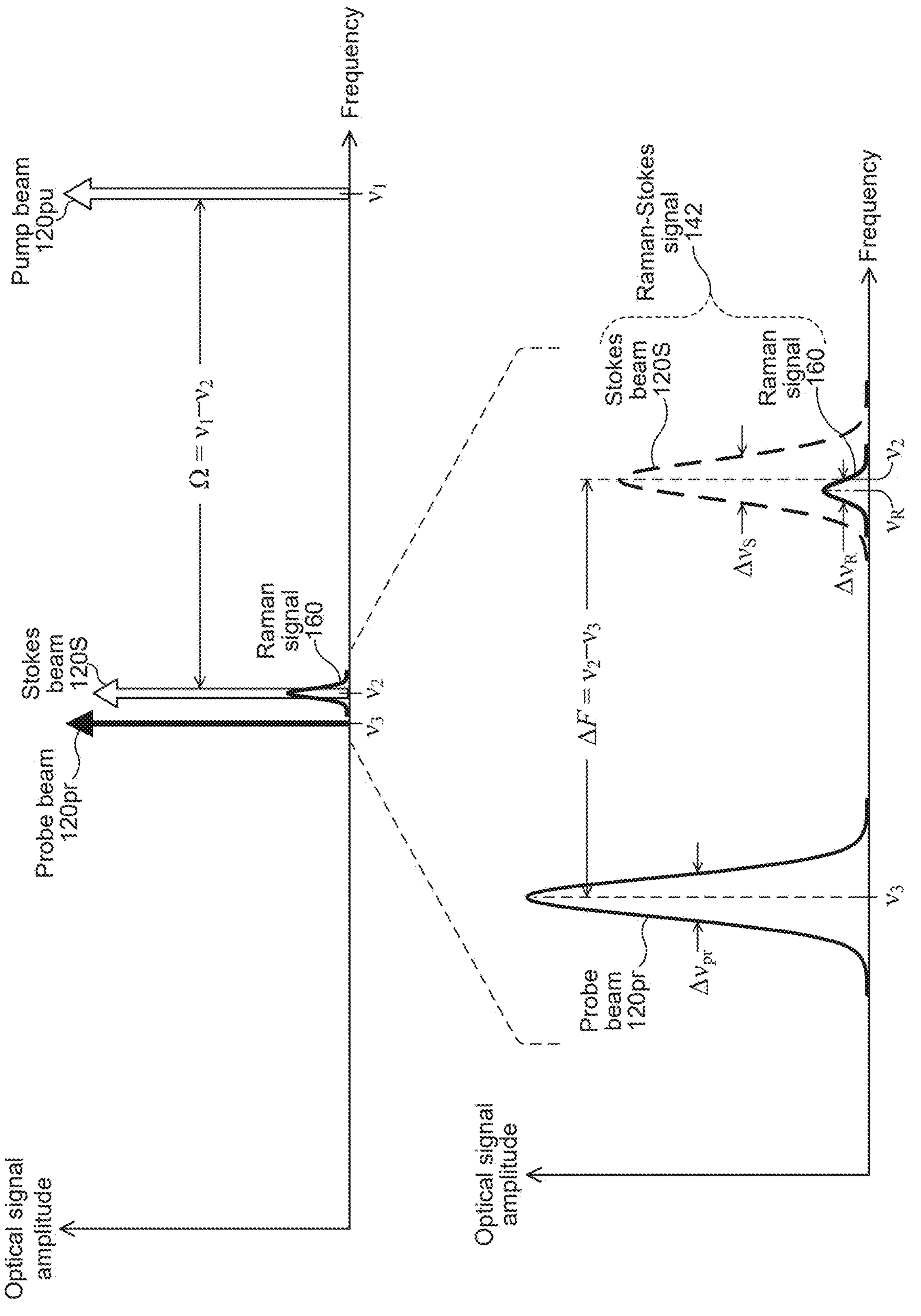
FIGS. 16-17 illustrate example optical signals produced in the Raman spectroscopy system of FIG. 15.
Figure 17:
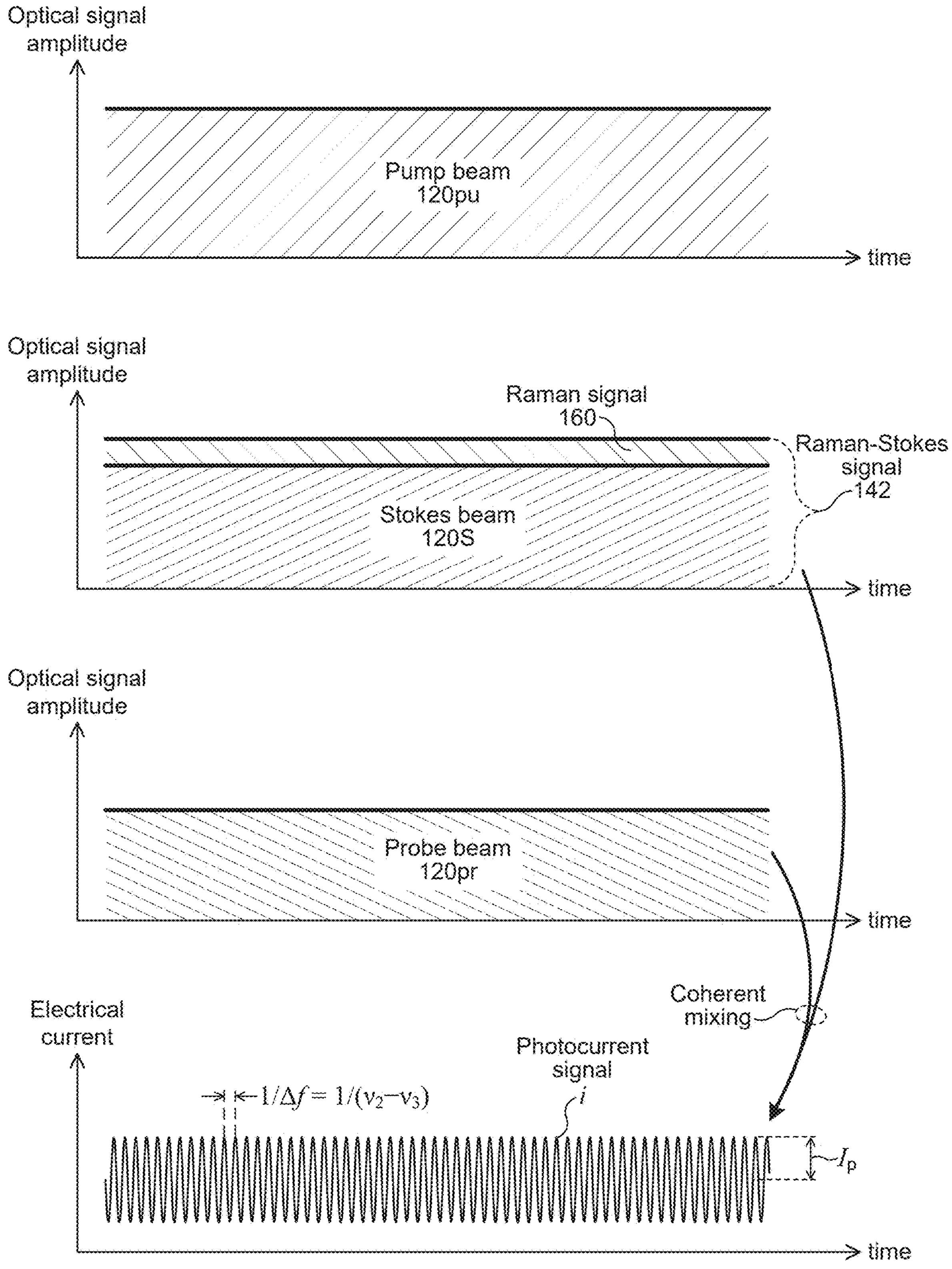

FIGS. 16-17 illustrate example optical signals produced in the Raman spectroscopy system of FIG. 15. FIG. 16 includes frequency-domain plots of the pump beam 120*pu*, Stokes beam 120S, probe beam 120*pr*, and Raman signal 160, and FIG. 17 includes time-domain plots of the same signals. Additionally, FIG. 17 includes a time-domain plot of the photocurrent signal i produced by coherent mixing of the Raman-Stokes signal 142 and the probe beam 120*pr* at the detector 220. The Raman signal 160 may be produced by stimulated Raman scattering of the pump beam 120*pu* and Stokes beam 120S at the sample 150, and the probe beam 120*pr* may be used to measure the Raman signal using a coherent-detection technique.

A Raman spectroscopy system 100 may use coherent detection to measure a Raman-Stokes signal 142 and then, based on the measurement, may determine one or more characteristics (e.g., a size) of the Raman signal 160 that is part of the Raman-Stokes signal. The size of the Raman signal 160 may depend on the pump-Stokes frequency offset Ω and the composition of the sample 150. For example, if the pump-Stokes frequency offset Ω is approximately equal to a resonant vibrational frequency of a molecule that is part of the sample 150, then the amplitude or optical power of the resulting Raman signal 160 may be relatively large. Alternatively, if the pump-Stokes frequency offset Ω does not match a vibrational frequency of a molecule in the sample 150 or if the sample contains little or none of the molecule of interest, then the resulting Raman signal 160 may be relatively small.

As illustrated in FIG. 16, the frequency of the pump beam 120*pu* is $\nu_1$, the frequency of the Stokes beam is $\nu_2$, and the frequency of the probe beam 120*pr* is $\nu_3$. The pump and Stokes frequencies are offset by a frequency offset Ω, where Ω equals $\nu_1-\nu_2$. The frequencies of the pump and Stokes beams may be set so that the frequency offset Ω is approximately equal to a vibrational frequency or an electronic-transition frequency of a particular material. In FIG. 16, the Stokes frequency $\nu_2$ is greater than the probe frequency $\nu_3$, and the frequency offset ΔF between the Stokes and probe beams is $\nu_2-\nu_3$. In general, the Stokes frequency may be greater than or less than the probe frequency, and the Stokes-probe frequency offset may be expressed as $\Delta F=|\nu_2-\nu_3|$. As illustrated in FIG. 17, the pump beam 120*pu*, Stokes beam 120S, and probe beam 120*pr* are each optical signals with a substantially constant optical power. For example, the optical power of each of the pump, Stokes, and probe beams may vary by less than 1% over a time interval of approximately 10 ms. Since the pump and Stokes beams each have substantially constant optical power, the resulting Raman signal 160 produced by coherent Raman scattering of the pump and Stokes beams at the sample 150 also has a substantially constant optical power. In other embodiments, an amplitude modulation may be applied to the pump beam 120*pu*, and the resulting Raman signal 160 may include a corresponding amplitude modulation.

In a Raman spectroscopy system 100, the pump frequency $\nu_1$, Stokes frequency 12, and probe frequency $\nu_3$ may each have any suitable value between approximately 60 THz and approximately 1,000 THz (which corresponds to a wavelength between approximately 5,000 nm and approximately 300 nm). For example, the pump frequency $\nu_1$ in FIG. 16 may be 404 THz (which corresponds to a wavelength of approximately 742 nm), and the Stokes frequency $\nu_2$ may be 359 THz (which corresponds to a wavelength of approximately 835 nm). The probe frequency in FIG. 16 may be within approximately 10 GHz of the Stokes frequency (e.g., $\nu_3$ may be between 358.99 THz and 359.01 THz). As another example, the pump beam 120*pu* may have a wavelength between approximately 700 nm and approximately 850 nm, which corresponds to a pump-beam frequency $\nu_1$ between approximately 428 THz and approximately 353 THz.

The frequency offset Ω between the pump and Stokes beams in a Raman spectroscopy system 100 may be any suitable fixed or adjustable value between approximately 5 terahertz (THz) and approximately 100 THz. Expressed in wavenumbers, this corresponds to the frequency offset (being between approximately 167 $cm^{-1}$ and approximately 3336 $cm^{-1}$. For example, the pump beam 120*pu* may have a wavelength between approximately 740 nm and approximately 800 nm (which corresponds to a pump-beam frequency $\nu_1$ between approximately 405 THz and approximately 375 THz), and the Stokes beam 120S may have a wavelength between approximately 811 nm and approximately 900 nm (which corresponds to a Stokes-beam frequency $\nu_2$ between approximately 370 THz and approximately 333 THz). This system may produce pump and Stokes beams having a frequency offset Ω between approximately 5.1 THz and approximately 72.0 THz (or, in wavenumbers, between approximately 170 $cm^{-1}$ and approximately 2402 $cm^{-1}$). For example, if the pump beam 120*pu* has a wavelength of approximately 785 nm (or equivalently, a frequency $\nu_1$ of 381.9 THz) and the Stokes beam 120S has a wavelength of approximately 840 nm (or equivalently, a frequency $\nu_2$ of 356.9 THz), then the frequency offset Ω between the pump and Stokes beams is approximately 25 THz (or, in wavenumbers, 834 $cm^{-1}$).

The spectral linewidth $\Delta\nu_{pr}$ of the probe beam 120*pr* and the spectral linewidth $\Delta\nu_S$ of the Stokes beam 120S in FIG. 16 may each be less than 200 MHz. For example, each of the spectral linewidths $\Delta\nu_{pr}$ and $\Delta\nu_S$ may be less than 200 MHz, 100 MHz, 50 MHz, 10 MHz, 10 MHz, 1 MHz, 100 kHz, or 10 KHz when measured over a time interval of approximately 1 ms, 100 ms, 1 s, 10 s, 100 s, or 1 hour. The Raman signal 160 in FIG. 16 has a frequency of $\nu_R$ and a spectral linewidth of $\Delta\nu_R$. The Raman-signal frequency $\nu_R$ may be referred to as a center frequency and may represent a peak frequency or an average frequency of the Raman signal 160. The Raman signal 160 and the optical spectrum of the Stokes beam 120S are overlapped, and the center frequency $\nu_R$ of the Raman signal may be located at or near the Stokes-beam frequency $\nu_2$. For example, the center frequency $\nu_R$ of the Raman signal 160 may be between $\nu_2-\Delta\nu_S$ and $\nu_2+\Delta\nu_S$, and the Raman-signal spectral linewidth $\Delta\nu_R$ may be less than the Stokes-beam spectral linewidth $\Delta\nu_S$. As another example, the Raman-signal frequency $\nu_R$ may be equal to the Stokes-beam frequency $\nu_2$, or the Raman-signal frequency $\nu_R$ may be within approximately 10 MHz of the Stokes-beam frequency $\nu_2$. Herein, the Raman signal 160 may be considered to have approximately the same frequency as the Stokes beam 120S so that $\nu_R$ is approximately equal to $\nu_2$. Additionally, the Raman-Stokes signal 142 (which includes the Raman signal 160 and the Stokes beam 120S after interacting with the sample 150) may be considered to have a frequency approximately equal to the Stokes-beam frequency $\nu_2$, and the frequency offset between the Raman-Stokes signal 142 and the probe beam 120*pr* may be expressed as $\Delta F=|\nu_2-\nu_3|$.

Figure 18:
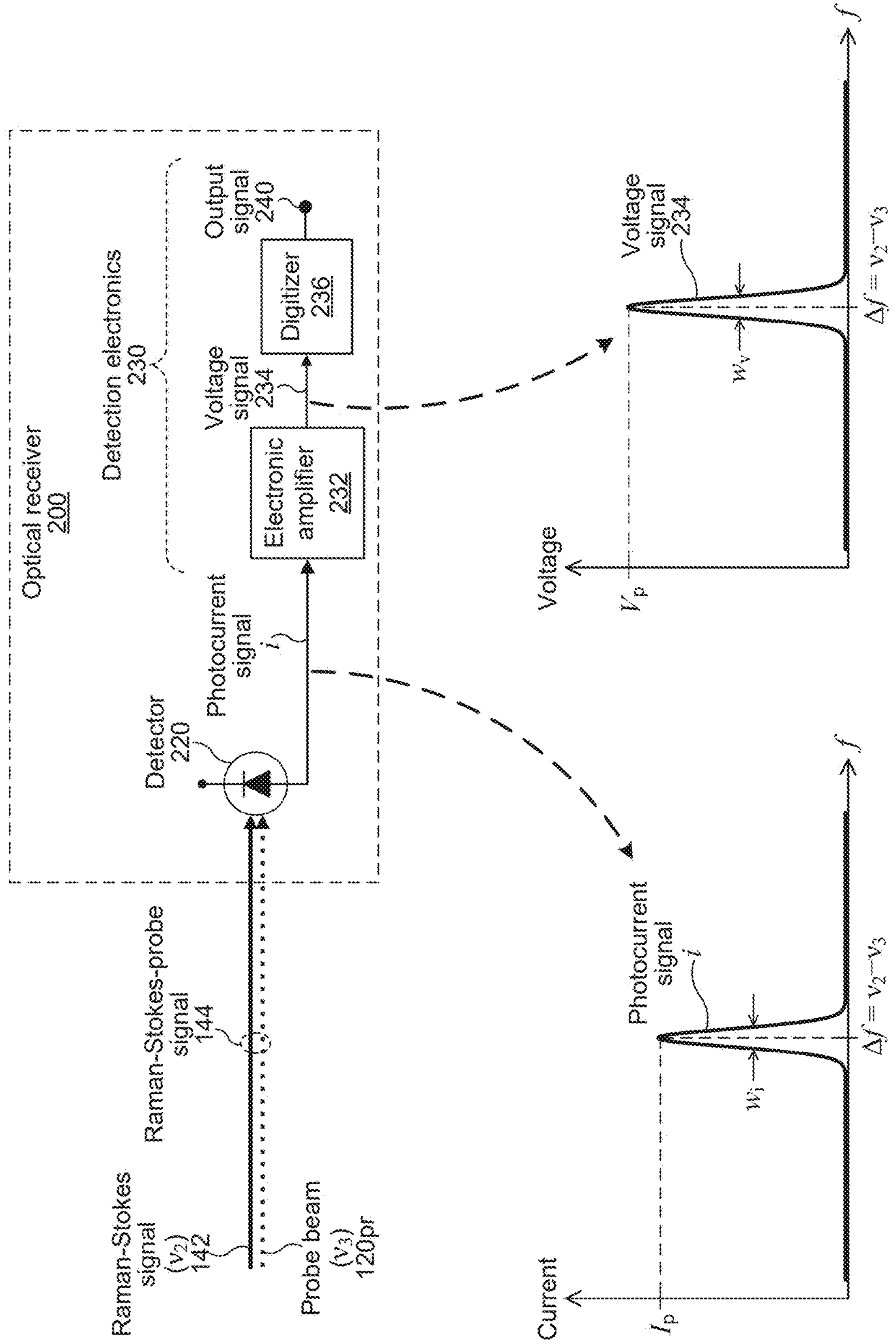
FIG. 18 illustrates an example optical receiver that measures the Raman-Stokes signal of FIGS. 16-17.

FIG. 18 illustrates an example optical receiver 200 that measures the Raman-Stokes signal 142 of FIGS. 16-17. In FIG. 15, an optical combiner 130*e* combines the probe beam 120*pr* and the Raman-Stokes signal 142 to produce a combined Raman-Stokes-probe signal 144 that is directed to an optical detector 220. The Raman-Stokes signal 142 and the probe beam 120*pr* are coherently mixed at the detector 220, and the detector produces a photocurrent signal i in response to the Raman-Stokes signal and the probe beam. The electronic amplifier 232 amplifies the photocurrent signal i to produce a corresponding voltage signal 234. The plot at the bottom of FIG. 17 is a time-domain plot of the photocurrent signal i, and the two plots in FIG. 18 are frequency-domain plots of the photocurrent signal i and the corresponding voltage signal 234. A time-domain plot of the voltage signal 234 may be similar to the time-domain plot of the photocurrent signal i in FIG. 17 (e.g., time-domain plots of the voltage signal and the photocurrent may both include an amplitude modulation at frequency ΔF). The frequency-domain plots of the photocurrent signal i and voltage signal 234 in FIG. 18 are similar and both include a peak at frequency ΔF.

In a Raman spectroscopy system with coherent detection in which the Raman-Stokes frequency $\nu_2$ and the probe frequency $\nu_3$ are offset by a frequency offset ΔF (where $\Delta F=|\nu_2-\nu_3|$), at least a portion of the photocurrent signal i that results from coherent mixing of the Raman-Stokes signal 142 and the probe beam 120*pr* may include a sinusoidal amplitude modulation with a frequency ΔF. The frequencies of the Stokes and probe beams may be selected so that the frequency offset ΔF is (i) within the electronic bandwidth of the optical receiver 200 and (ii) between approximately 10 MHz and approximately 2 GHz. For example, the optical receiver 200 in FIG. 18 may have a 200-MHz electronic bandwidth that extends from 900 MHz to 1.1 GHZ, and the Stokes-probe frequency offset ΔF may be selected to be approximately 1 GHz. As illustrated by the time-domain and frequency-domain plots of the photocurrent signal i in FIGS. 17 and 18, the photocurrent signal includes a sinusoidal amplitude modulation with a frequency ΔF (where $\Delta F=\nu_2-\nu_3$) and a peak current amplitude $I_p$. The frequency-domain plot of the corresponding voltage signal 234 in FIG. 18 indicates that the voltage signal includes a sinusoidal amplitude modulation at the same frequency ΔF and a peak voltage amplitude of $V_p$. In FIG. 18, the photocurrent signal i has an electronic linewidth of $w_i$, and the voltage signal 234 has an electronic linewidth of $w_v$. The electronic linewidths $w_i$ and $w_v$ may be related to one or more of the spectral linewidths $\Delta\nu_S$, $\Delta\nu_R$, and $\Delta\nu_{pr}$.

Coherent mixing of a probe beam 120*pr* and a Raman-Stokes signal 142, which may be referred to as heterodyne mixing or heterodyne detection, occurs when the two optical signals are optically combined and then detected by a detector 220. Optically combining the probe beam 120*pr* and the Raman-Stokes signal 142 may refer to combining the optical signals so that their electric fields are summed together. For example, the probe beam and Raman-Stokes signal may be combined (e.g., with an optical combiner 130) so that the signals are spatially overlapped and co-propagate together in the same direction and along approximately the same optical path. Additionally, the probe beam and the Raman-Stokes signal may be combined so that at least a portion of their polarizations have the same orientation to allow at least a portion of their electric fields to be summed together. Once the probe beam 120*pr* and Raman-Stokes signal 142 are optically combined to produce a combined Raman-Stokes-probe signal 144, the probe beam and the Raman-Stokes signal may be coherently mixed at a detector 220. The detector 220 may produce a photocurrent signal i corresponding to the coherent mixing of the probe beam 120*pr* and Raman-Stokes signal 142. The photocurrent signal i produced by the detector 220 in response to the coherent mixing of the Raman-Stokes signal 142 and the probe beam 120*pr* may include one or more electronic frequency components, where each electronic frequency component corresponds to a frequency difference between the Raman-Stokes signal 142 and the probe beam 120*pr*. Accordingly, the frequency offset ΔF between the Raman-Stokes signal 142 and the probe beam 120*pr* in FIG. 16 results in an amplitude-modulated photocurrent signal i (and a corresponding amplitude-modulated voltage signal 234) with a frequency of ΔF, as illustrated in FIGS. 17-18.

Herein, an optical frequency or an optical frequency component refers to a signal in the optical domain having a frequency between approximately 60 THz and approximately 1,000 THz, and an electronic frequency or an electronic frequency component refers to a signal in the electronic domain having a frequency between 0 Hz and approximately 50 GHz. The pump beam 120*pu*, Stokes beam 120S, probe beam 120*pr*, Raman signal 160, and IVC signal 162 are each optical signals having frequencies in the optical domain between approximately 60 THz and approximately 1,000 THz. The photocurrent signal i and the voltage signal 234 are each electronic signals having frequencies in the electronic domain between 0 Hz and approximately 50 GHz.

The photocurrent signal i produced by a detector 220 in response to coherent mixing of a Raman-Stokes signal 142 and a probe beam 120*pr* may be proportional to the square of the summed electric fields of the Raman-Stokes signal and the probe beam. This type of detector 220 that produces a photocurrent signal i that is proportional to the square of a received electric field may be referred to as a square-law detector. The photocurrent signal i may be expressed as $$i(t)=k|\varepsilon_{RS}(t)+\varepsilon_{pr}(t)|^2,$$

where k is a constant (e.g., k may account for the responsivity of the detector 220 as well as other constant parameters or conversion factors). For clarity, the constant k or other constants (e.g., conversion constants or factors of 2 or 4) may be excluded from expressions herein related to the photocurrent i or the voltage signal 234. In the above expression for i(t), $\varepsilon_{RS}(t)$ is the electric field of the Raman-Stokes signal 142, and $\varepsilon_{pr}(t)$ is the electric field of the probe beam 120*pr*. The electric field of the Raman-Stokes signal 142 may be expressed as $E_{RS}\cos[2\pi\nu_2 t]$, where $E_{RS}$ is the amplitude of the electric field of the Raman-Stokes signal. The electric field of the probe beam 120*pr* may be expressed as $E_{pr}\cos[2\pi\nu_3 t]$, where $E_{pr}$ is the amplitude of the electric field of the probe beam.

The photocurrent signal i that results from coherent mixing of a Raman-Stokes signal 142 and a probe beam 120*pr* may include a coherent-mixing term that is proportional to a product of $E_{RS}$ and $E_{pr}$. The above expression for the photocurrent signal i may be expanded and written as $$i(t) = E_{RS}^2 + E_{pr}^2 + 2E_{RS}E_{pr}\cos[2\pi(\nu_2 - \nu_3)t],$$

where, for clarity and as discussed above, the constant k is not included. In this expanded expression for the photocurrent signal i(t), the first term $$E_{RS}^2$$

corresponds to the optical power ($P_{RS}$) of the Raman-Stokes signal 142, and the second term $$E_{pr}^2$$

corresponds to the optical power ($P_{pr}$) of the probe beam 120*pr*. The third term in the above expression is $2E_{RS}E_{pr}\cos[2\pi(\nu_2-\nu_3)t]$ and may be referred to as a coherent-mixing term that represents coherent mixing between the electric fields of the Raman-Stokes signal 142 and the probe beam 120*pr*. The coherent-mixing term is proportional to $E_{RS}\times E_{pr}$, which is the product of the electric-field amplitudes of the Raman-Stokes signal 142 and the probe beam 120*pr*. Additionally, the coherent-mixing term includes a cosine function that varies in time based on the Stokes-probe frequency offset ΔF, where $\Delta F=|\nu_2-\nu_3|$. The coherent-mixing term may also be expressed as $2E_{RS}E_{pr}\cos[2\pi(\Delta F)t]$ or as $2\sqrt{P_{RS}}\sqrt{P_{pr}}\cos[2\pi(\Delta F)t]$, where PRs is the optical power of the Raman-Stokes signal 142 and $P_{pr}$ is the optical power of the probe beam 120*pr*.

In the time-domain photocurrent plot in FIG. 17, the coherent-mixing term corresponds to the sinusoidal amplitude modulation of the photocurrent signal i at frequency ΔF. In the frequency-domain plots in FIG. 18, the coherent-mixing term corresponds to the peak at frequency ΔF in the photocurrent signal i and the voltage signal 234. The voltage signal 234 may be approximately proportional to the photocurrent signal i, and both the voltage and photocurrent signals may be proportional to $P_{RS}+P_{pr}+2\sqrt{P_{RS}}\sqrt{P_{pr}}\cos[2\pi(\Delta F)t]$. Over the time duration of a measurement, the optical powers of the Raman-Stokes signal 142 and the probe beam 120*pr* may be substantially constant, and so the contribution of $P_{RS}+P_{pr}$ in the above expression may correspond to a DC offset with little or no time variation. The detector 220 may be AC-coupled to the electronic amplifier 232, or the electronic amplifier may include a high-pass or band-pass filter that removes or attenuates the DC or low-frequency components. This results in a voltage signal 234 with little or no DC offset, where the voltage signal corresponds to the coherent-mixing term $2\sqrt{P_{RS}}\sqrt{P_{pr}}\cos[2\pi(\Delta F)t]$, and measurement of the Raman-Stokes signal 142 may include determining one or more characteristics of the voltage signal.

The detection electronics 230 in FIG. 18 includes a digitizer 236 that receives the voltage signal 234 and produces an electronic output signal 240 that corresponds to the voltage signal 234 (which in turn corresponds to the photocurrent signal i). The electronic output signal 240 may include a value that corresponds to the size of the amplitude modulation of the photocurrent signal i, where the size of the photocurrent-signal amplitude modulation is determined based on the voltage signal 234. For example, the electronic output signal 240 may include a value corresponding to the peak voltage amplitude $V_p$ of the voltage signal 234 at the frequency ΔF, where the value of $V_p$ may be proportional to the peak current amplitude b. The digitizer 236 may include a lock-in amplifier, a boxcar averager, or a sample-and-hold circuit, and the output signal 240 may include a digital value that corresponds to the size of the amplitude modulation of the voltage signal 234 at the frequency ΔF.

In some embodiments, the digitizer 236 may include an analog-to-digital converter (ADC) that produces a time-domain digital representation of the voltage signal 234. The time-domain digital representation of the voltage signal 234 may be similar to the time-domain plot of the photocurrent signal i in FIG. 17. The output signal 240 may include the digital representation of the voltage signal 234 produced by the ADC, and the output signal may be sent to a processor. Based on the time-domain digital representation of the voltage signal 234, the processor may determine a value that corresponds to the size of the photocurrent-signal amplitude modulation. For example, the processor may determine the amplitude $V_p$ of the amplitude-modulated portion of the voltage signal 234. As another example, the processor may determine a frequency-domain representation of the voltage signal 234 based on the time-domain representation of the voltage signal 234 received from the digitizer 236. The frequency-domain representation of the voltage signal 234 may be a digital signal that is similar to the voltage-signal frequency-domain plot in FIG. 18. Based on the frequency-domain representation of the voltage signal 234, the processor may determine one or more characteristics of the voltage signal. For example, the voltage-signal characteristics may include a peak value (e.g., the peak voltage amplitude $V_p$), an average value associated with the voltage-signal peak at frequency ΔF, an area of the voltage-signal peak (e.g., an integral or sum that corresponds to the area under the peak curve), the linewidth $w_v$ of the voltage-signal peak, or the center frequency of the voltage-signal peak (which may equal ΔF).

A processor may use any suitable algorithm to determine a frequency-domain representation of a voltage signal 234 based on a time-domain digital representation of the voltage signal. For example, a digital time-domain voltage signal may be analyzed using a frequency-domain analysis technique such as a discrete Fourier transform (DFT), fast Fourier transform (FFT), or Goertzel algorithm to determine frequency-domain characteristics. A DFT or FFT may be applied to the digital time-domain voltage signal to produce a frequency-domain representation of the voltage signal (e.g., similar to the voltage-signal plot in FIG. 18). Alternatively, a Goertzel algorithm may be applied to the digital time-domain voltage signal to determine frequency-domain characteristics of the voltage signal at one or more particular frequencies. For example, a Goertzel algorithm may be applied to a digital time-domain voltage signal to determine the amplitude of the voltage signal at the frequency ΔF.

In a Raman spectroscopy system with coherent detection, the Stokes frequency $\nu_2$ and the probe frequency $\nu_3$ are offset by a frequency offset ΔF (where $\Delta F=|\nu_2-\nu_3|$). The Stokes and probe frequencies may be selected so that the Stokes-probe frequency offset ΔF has a particular value (e.g., ΔF may be a particular frequency between approximately 10 MHz and approximately 2 GHZ). A Raman spectroscopy system 100 may include a processor that maintains the frequency offset ΔF at the particular target frequency. Maintaining the Stokes-probe frequency offset ΔF at a particular fixed value may allow the optical receiver 200 or the processor to accurately determine one or more characteristics of the photocurrent signal i at one or more particular frequencies of interest. For example, the optical receiver 200 or the processor may be configured to determine one or more characteristics of a photocurrent signal i at one or more particular frequencies of interest that are related to the frequency offset ΔF. If the Stokes-probe frequency offset ΔF drifts over time, then the particular frequencies of interest of the photocurrent signal i may also change, which may prevent the photocurrent-signal characteristics from being accurately determined. To maintain the Stokes-probe frequency offset ΔF at a particular target value, the processor may periodically measure the actual Stokes-probe frequency offset. For example, the processor may measure the frequency of the photocurrent-signal amplitude modulation (e.g., based on the location of the peak of the voltage signal 234 as illustrated in FIG. 18). If the measured Stokes-probe frequency offset differs from the target frequency offset, then the processor may send an instruction to adjust the Stokes frequency or the probe frequency so that the Stokes-probe frequency offset is approximately equal to the particular target frequency. For example, if the target Stokes-probe frequency offset ΔF is 500 MHz, and the actual Stokes-probe frequency offset in FIG. 16 is measured to be 480 MHz, then the processor may instruct the probe light source 111*pr* to decrease the probe frequency $\nu_3$ by 20 MHz.

Figure 19:
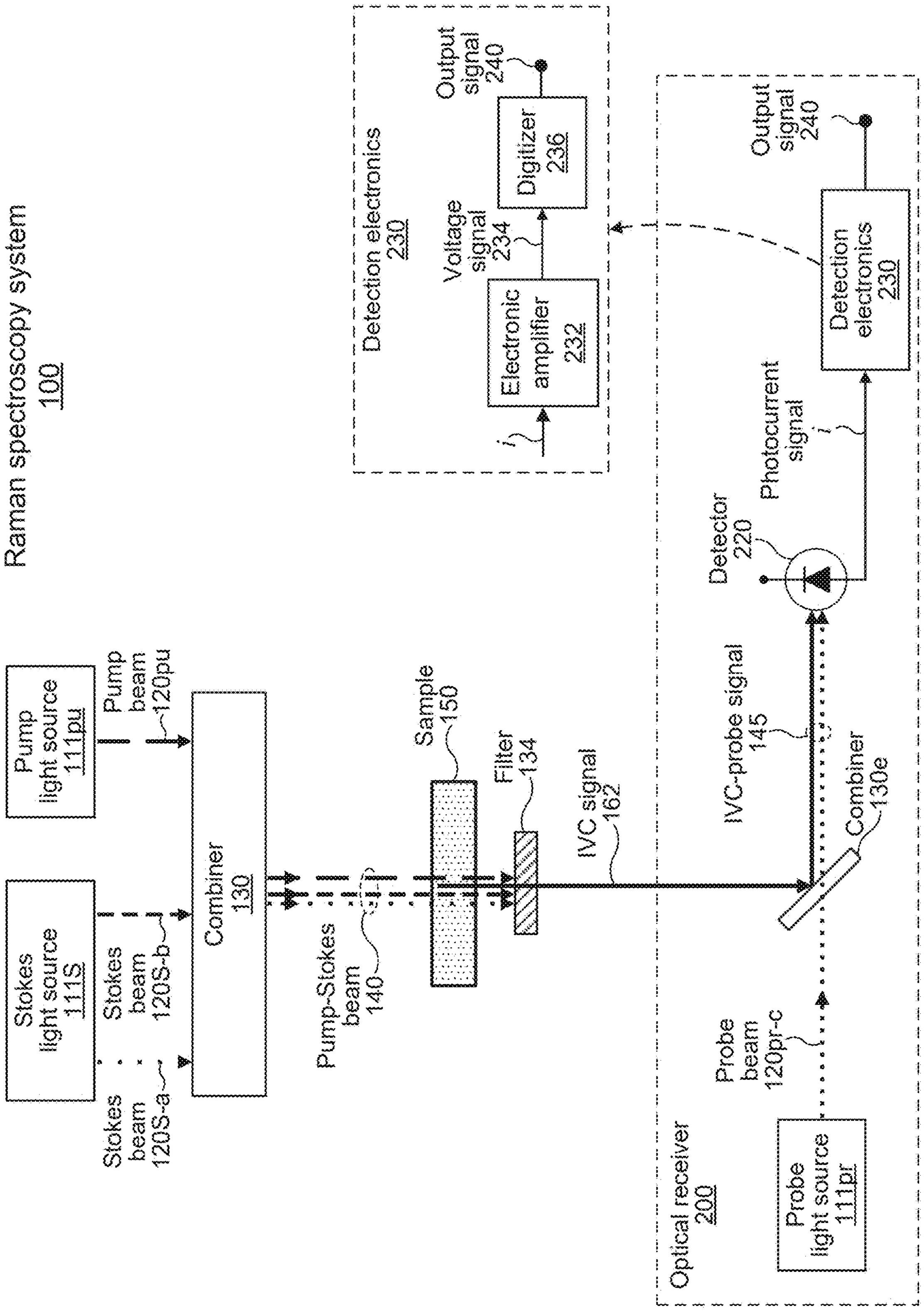
FIG. 19 illustrates an example Raman spectroscopy system configured to measure an intramolecular vibrational coupling (IVC) signal.

FIG. 19 illustrates an example Raman spectroscopy system 100 configured to measure an intramolecular vibrational coupling (IVC) signal 162. The Raman spectroscopy system includes a pump light source 111*pu* that produces a pump beam of light 120*pu* and a Stokes light source 111S that produces two Stokes beams of light 120S-a and 120S-b. The optical combiner 130 (which may be similar to the combiner 130 in FIG. 12) combines the three beams of light to produce a combined pump-Stokes beam of light 140. The combined pump-Stokes beam 140, which includes one pump beam 120*pu* and two Stokes beams 120S-a and 120S-b, is directed to a sample 150. The optical combiner 130 may include one or more fiber-optic, waveguide-based, or free-space optical combiners, and the pump-Stokes beam 140 may be directed to the sample 150 via optical fiber, via an optical waveguide, or as a free-space optical beam. The three pump and Stokes beams may interact with a particular material (e.g., a molecule having a particular composition) in the sample 150 via intramolecular vibrational coupling (IVC) to produce an IVC signal 162, which is directed to the optical receiver 200 for measurement.

Figure 20:
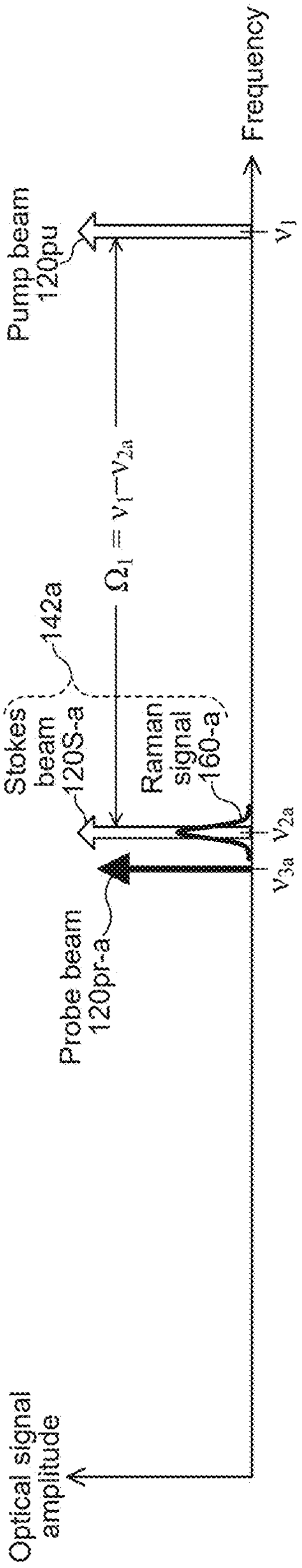
FIGS. 20-22 each illustrate example optical signals produced in the Raman spectroscopy system of FIG. 19.
Figure 21:
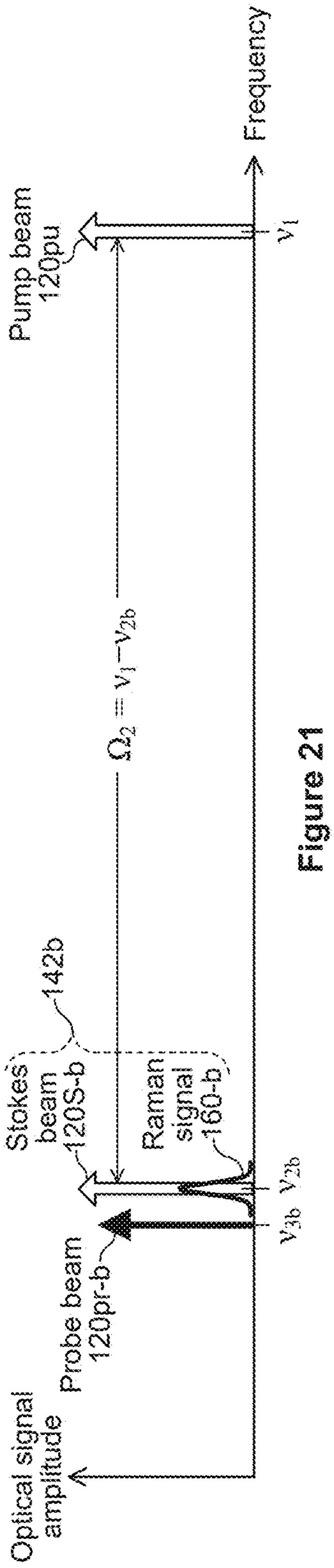
Figure 22:
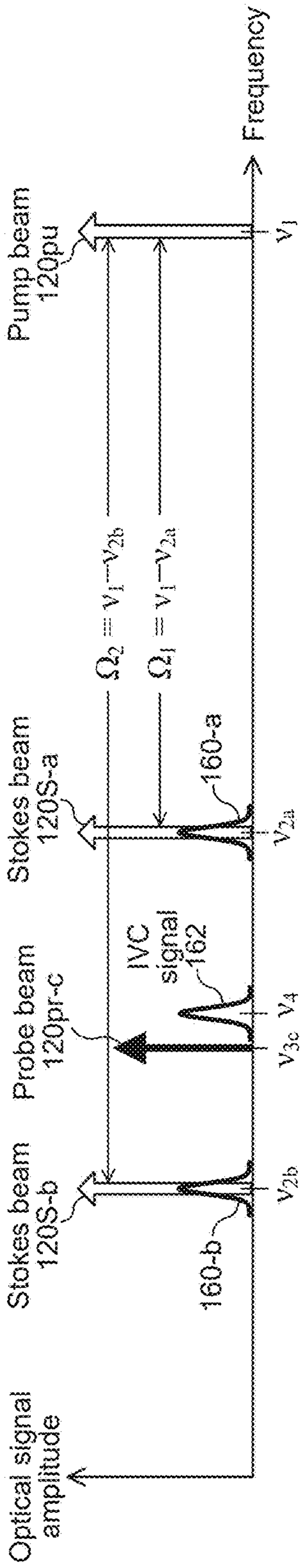

FIGS. 20-22 each illustrate example optical signals produced in the Raman spectroscopy system 100 of FIG. 19. FIG. 20 illustrates optical signals for measurement of a first Raman signal 160-*a* produced with a first pump-Stokes frequency offset of 221. In FIG. 20, the pump beam 120*pu* is at frequency $\nu_1$, the Stokes beam 120S-a is at frequency $\nu_{2a}$, and the probe beam 120*pr-a* is at frequency $\nu_{3a}$. FIG. 21 illustrates optical signals for measurement of a second Raman signal 160-*b* produced with a second pump-Stokes frequency offset of £22. In FIG. 21, the pump beam 120*pu* is at frequency $\nu_1$, the Stokes beam 120S-b is at frequency $\nu_{2b}$, and the probe beam 120*pr-b* is at frequency $\nu_{3b}$. In FIGS. 20-22, the first pump-Stokes frequency offset $\Omega_1$ may be approximately equal to a frequency of a first vibrational mode of a molecule that is part of the sample 150, and the second pump-Stokes frequency offset $\Omega_2$ may be approximately equal to a frequency of a second vibrational mode of the molecule. FIG. 22 illustrates optical signals for measurement of an IVC signal 162 produced when both vibrational modes of the molecule are excited by the three beams of light (pump beam 120*pu* and the two Stokes beams 120S-a and 120S-b). The pump light source 111*pu* produces the pump beam 120*pu* at the pump frequency $\nu_1$. The Stokes light source 111S produces (i) the first Stokes beam 120S-a at the first Stokes frequency $\nu_{2a}$ (where the pump and first Stokes frequencies are offset by the first pump-Stokes frequency offset $\Omega_1=\nu_1-\nu_{2a}$) and (ii) the second Stokes beam 120S-b at the second Stokes frequency $\nu_{2b}$ (where the pump and second Stokes frequencies are offset by the second pump-Stokes frequency offset $\Omega_2=\nu_1-\nu_{2b}$). In FIG. 22, in addition to producing the two Raman signals 160-*a* and 160-*b* (e.g., by coherent Raman scattering), an IVC signal 162 is also produced. The IVC signal 162 may result from vibrational coupling between the first and second vibrational modes of the molecule.

The measurements of the first and second Raman signals 160-*a* and 160-*b* illustrated in FIGS. 20 and 21 are performed by the Raman spectroscopy system 100 in FIG. 19 and may be performed in a manner similar to the measurement of the Raman signal 160 illustrated in FIG. 15 and described herein. For the measurement of the first Raman signal 160-*a* illustrated in FIG. 20, the Stokes light source 111S in FIG. 19 produces the first Stokes beam 120S-a (and may not produce a second Stokes beam 120S-b). The pump beam 120*pu* and the first Stokes beam 120S-a (with pump-Stokes frequency offset $\Omega_1=\nu_1-\nu_{2a}$) are directed to the sample 150. The pump and Stokes beams may interact with the sample 150 to produce the first Raman signal 160-*a* (e.g., by coherent Raman scattering of the pump and Stokes beams at the sample). The Raman-Stokes signal 142*a* (which includes the first Raman signal 160-*a* and the first Stokes beam 120S-a after interacting with the sample) is collected and directed to the optical receiver 200 for measurement. Measurement of the Raman-Stokes signal 142*a* may include coherent mixing of the Raman-Stokes signal with the probe beam 120*pr-a* at an optical detector 220 to produce a photocurrent signal i (e.g., similar to the measurement illustrated in FIG. 15 and described herein). The frequency offset between the Stokes beam 120S-a and the probe beam 120*pr-a* is $|\nu_{2a}-\nu_{3a}|$, and the probe-beam frequency $\nu_{3a}$ may be selected so that the frequency offset is (i) within the bandwidth of the optical receiver 200 and (ii) between approximately 10 MHz and approximately 2 GHz.

For the measurement of the second Raman signal 160-*b* illustrated in FIG. 21, the Stokes light source 111S in FIG. 19 produces the second Stokes beam 120S-b (and may not produce a first Stokes beam 120S-a). The pump beam 120*pu* and the second Stokes beam 120S-b (with pump-Stokes frequency offset $\Omega_2=\nu_1-\nu_{2b}$) are directed to the sample 150. The pump and Stokes beams may interact with the sample 150 to produce the second Raman signal 160-*b* (e.g., by coherent Raman scattering of the pump and Stokes beams at the sample). The Raman-Stokes signal 142*b* (which includes the second Raman signal 160-*b* and the second Stokes beam 120S-b after interacting with the sample) is collected and directed to the optical receiver 200 for measurement. Measurement of the Raman-Stokes signal 142*b* may include coherent mixing of the Raman-Stokes signal with the probe beam 120*pr-b* at an optical detector 220 to produce a photocurrent signal i. The frequency offset between the Stokes beam 120S-b and the probe beam 120*pr-b* is $|\nu_{2b}-\nu_{3b}|$, and the probe-beam frequency $\nu_{3b}$ may be selected so that the frequency offset is (i) within the bandwidth of the optical receiver 200 and (ii) between approximately 10 MHz and approximately 2 GHz.

In FIG. 22, the Stokes light source 111S in FIG. 19 produces both Stokes beams 120S-a and 120S-b, and the three beams of light (pump beam 120*pu* and the two Stokes beams) are directed to the sample 150. The pump beam 120*pu* and the two Stokes beams 120S-a and 120S-b have the two pump-Stokes frequency offsets $\Omega_1$ and $\Omega_2$, and the three beams of light may interact with a particular molecule in the sample via intramolecular vibrational coupling to produce an IVC signal 162. The IVC signal 162 in FIG. 19 is collected and directed to the optical receiver 200 for measurement. Measurement of the IVC signal 162 may include coherent mixing of the IVC signal with the probe beam 120*pr-c* at the optical detector 220 to produce a photocurrent signal i. The frequency of the IVC signal 162 is $\nu_4$, and the frequency offset between the IVC signal 162 and the probe beam 120*pr-c* is $|\nu_4-\nu_{3c}|$. The probe-beam frequency $\nu_{3c}$ may be selected so that the IVC-probe frequency offset $|\nu_4-\nu_{3c}|$ is within the bandwidth of the optical receiver 200 (e.g., the IVC-probe frequency may be less than the upper cutoff frequency of the optical receiver). Additionally, the probe-beam frequency $\nu_{3c}$ may be selected so that the IVC-probe frequency offset is between approximately 10 MHz and approximately 2 GHz.

Figure 23:
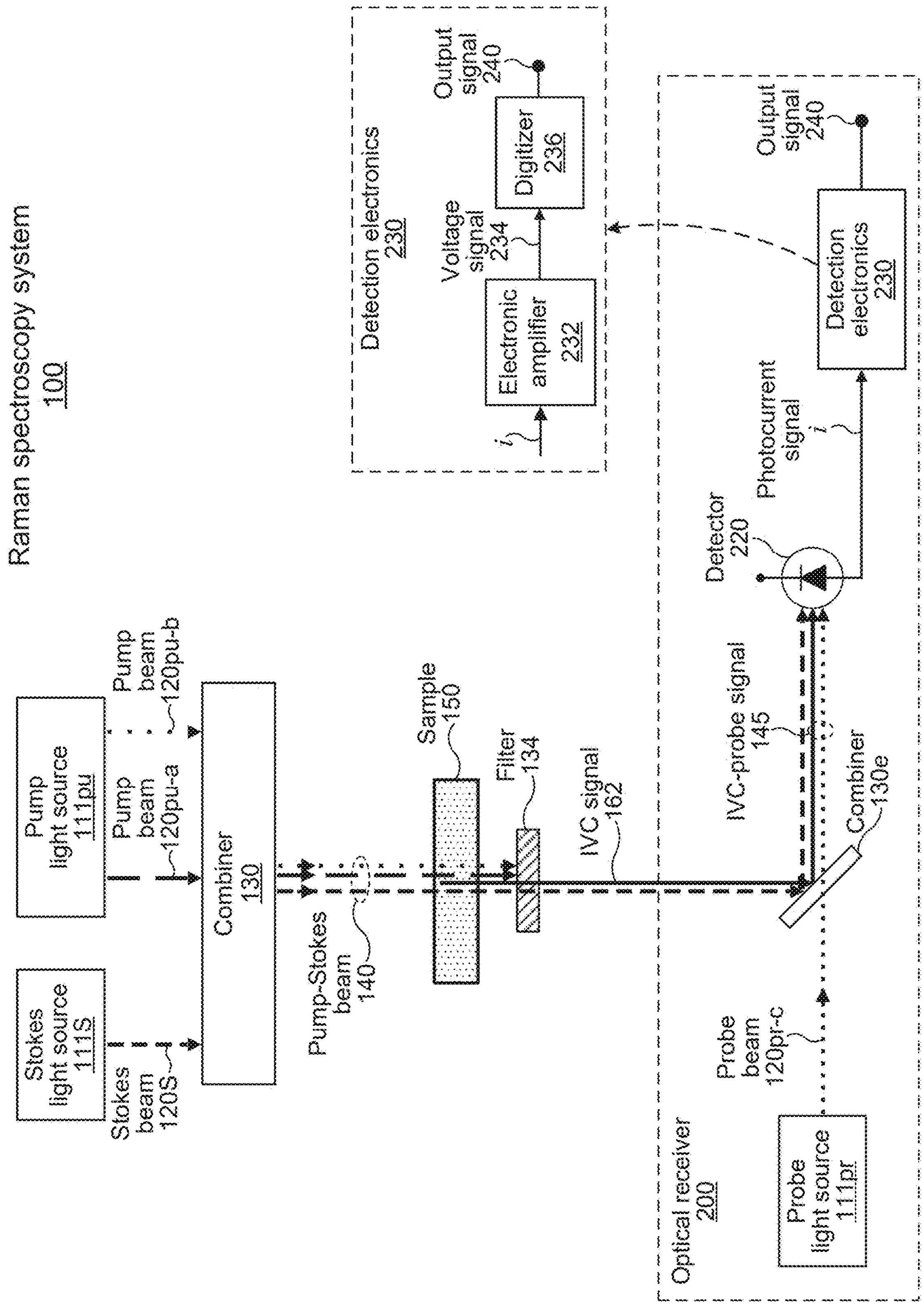
FIG. 23 illustrates an example Raman spectroscopy system configured to measure an IVC signal.

FIG. 23 illustrates an example Raman spectroscopy system 100 configured to measure an intramolecular vibrational coupling (IVC) signal 162. The Raman spectroscopy system includes a pump light source 111*pu* that produces two pump beams of light 120*pu-a* and 120*pu-b* and a Stokes light source 111S that produces a Stokes beam of light 120S. The optical combiner 130 (which may be similar to the combiner 130 in FIG. 13) combines the three beams of light to produce a combined pump-Stokes beam of light 140. The combined pump-Stokes beam 140, which includes two pump beams 120*pu-a* and 120*pu-b* and one Stokes beam 120S, is directed to a sample 150. The optical combiner 130 may include one or more fiber-optic, waveguide-based, or free-space optical combiners, and the pump-Stokes beam 140 may be directed to the sample 150 via optical fiber, via an optical waveguide, or as a free-space optical beam. The three pump and Stokes beams may interact with a particular material (e.g., a molecule having a particular composition) in the sample 150 via intramolecular vibrational coupling (IVC) to produce an IVC signal 162, which is directed to the optical receiver 200 for measurement.

FIGS. 24-26 each illustrate example optical signals produced in the Raman spectroscopy system 100 of FIG. 23. FIG. 24 illustrates optical signals for measurement of a first Raman signal 160-*a* produced with a first pump-Stokes frequency offset of $\Omega_1$. In FIG. 24, the pump beam 120*pu-a* is at frequency $\nu_{1a}$, the Stokes beam 120S is at frequency $\nu_2$, and the probe beam 120*pr* is at frequency $\nu_3$. FIG. 25 illustrates optical signals for measurement of a second Raman signal 160-*b* produced with a second pump-Stokes frequency offset of $\Omega_2$. In FIG. 25, the pump beam 120*pu-b* is at frequency $\nu_{1b}$, the Stokes beam 120S is at frequency $\nu_2$, and the probe beam 120*pr* is at frequency $\nu_3$. In FIGS. 24-26, the first pump-Stokes frequency offset $\Omega_1$ may be approximately equal to a frequency of a first vibrational mode of a molecule that is part of the sample 150, and the second pump-Stokes frequency offset $\Omega_2$ may be approximately equal to a frequency of a second vibrational mode of the molecule. FIG. 26 illustrates optical signals for measurement of an IVC signal 162 produced when both vibrational modes of the molecule are excited by the three beams of light (the two pump beams 120*pu-a* and 120*pu-b* and the Stokes beam 120S). The Stokes light source 111S produces the Stokes beam at the Stokes frequency $\nu_2$. The pump light source 111*pu* produces (i) the first pump beam 120*pu-a* at the first pump frequency $\nu_{1a}$ (where the first pump frequency and the Stokes frequency are offset by the first pump-Stokes frequency offset $\Omega_1=\nu_{1a}-\nu_2$) and (ii) the second pump beam 120*pu-b* at the second pump frequency $\nu_{1b}$ (where the second pump frequency and the Stokes frequency are offset by the second pump-Stokes frequency offset $\Omega_2=\nu_{1b}-\nu_2$). In FIG. 26, in addition to producing the two Raman signals 160-*a* and 160-*b* (which are overlapped and represented by Raman signal 160-*a/b*), an IVC signal 162 is also produced. The IVC signal 162 may result from vibrational coupling between the first and second vibrational modes of the molecule.

The measurements of the first and second Raman signals 160-*a* and 160-*b* illustrated in FIGS. 24 and 25 are performed by the Raman spectroscopy system 100 in FIG. 23 and may be performed in a manner similar to the measurement of the Raman signal 160 illustrated in FIG. 15 and described herein. For the measurement of the first Raman signal 160-*a* illustrated in FIG. 24, the pump light source 111*pu* in FIG. 23 produces the first pump beam 120*pu-a* (and may not produce a second pump beam 120*pu-b*). The first pump beam 120*pu-a* and the Stokes beam 120S (with pump-Stokes frequency offset $\Omega_1=\nu_{1a}-\nu_2$) are directed to the sample 150. The pump and Stokes beams may interact with the sample 150 to produce the first Raman signal 160-*a* (e.g., by coherent Raman scattering of the pump and Stokes beams at the sample). The Raman-Stokes signal 142*a* (which includes the first Raman signal 160-*a* and the Stokes beam 120S after interacting with the sample) is collected and directed to the optical receiver 200 for measurement. Measurement of the Raman-Stokes signal 142*a* may include coherent mixing of the Raman-Stokes signal with the probe beam 120*pr* at an optical detector 220 to produce a photocurrent signal i. The frequency offset between the Stokes beam 120S and the probe beam 120*pr* is $|\nu_2-\nu_3|$, and the probe-beam frequency $\nu_3$ may be selected so that the frequency offset is (i) within the bandwidth of the optical receiver 200 and (ii) between approximately 10 MHz and approximately 2 GHz.

For the measurement of the second Raman signal 160-*b* illustrated in FIG. 25, the pump light source 111*pu* in FIG. 23 produces the second pump beam 120*pu-b* (and may not produce a first pump beam 120*pu-a*). The second pump beam 120*pu-b* and the Stokes beam 120S (with pump-Stokes frequency offset $\Omega_2=\nu_{1b}-\nu_2$) are directed to the sample 150. The pump and Stokes beams may interact with the sample 150 to produce the second Raman signal 160-*b* (e.g., by coherent Raman scattering of the pump and Stokes beams at the sample). The Raman-Stokes signal 142*b* (which includes the second Raman signal 160-*b* and the Stokes beam 120S after interacting with the sample) is collected and directed to the optical receiver 200 for measurement. Measurement of the Raman-Stokes signal 142*b* may include coherent mixing of the Raman-Stokes signal with the probe beam 120*pr* at an optical detector 220 to produce a photocurrent signal i. In FIGS. 24 and 25, the two Raman signals 160-*a* and 160-*b* have approximately the same frequency $\nu_2$, and the probe beam 120*pr* may remain fixed at the frequency $\nu_3$.

In FIG. 26, the pump light source 111*pu* in FIG. 23 produces both pump beams 120*pu-a* and 120*pu-b*, and the three beams of light (Stokes beam 120S and the two pump beams are directed to the sample 150. The Stokes beam 120S and the two pump beams 120_pu-a_ and 120_pu-b_ have the two pump-Stokes frequency offsets $\Omega_1$ and $\Omega_2$, and the three beams of light may interact with a particular molecule in the sample via intramolecular vibrational coupling to produce an IVC signal 162. The IVC signal 162 in FIG. 23 is collected and directed to the optical receiver 200 for measurement. Measurement of the IVC signal 162 may include coherent mixing of the IVC signal with the probe beam 120_pr-c_ at the optical detector 220 to produce a photocurrent signal i. The frequency of the IVC signal 162 is $\nu_4$, and the frequency offset between the IVC signal 162 and the probe beam 120_pr-c_ is $|\nu_4-\nu_{3c}|$. The probe-beam frequency $\nu_{3c}$ may be selected so that the IVC-probe frequency offset $|\nu_4-\nu_{3c}|$ is within the bandwidth of the optical receiver 200 (e.g., the IVC-probe frequency may be less than the upper cutoff frequency of the optical receiver). Additionally, the probe-beam frequency $\nu_{3c}$ may be selected so that the IVC-probe frequency offset is between approximately 10 MHz and approximately 2 GHz.

Figure 27:
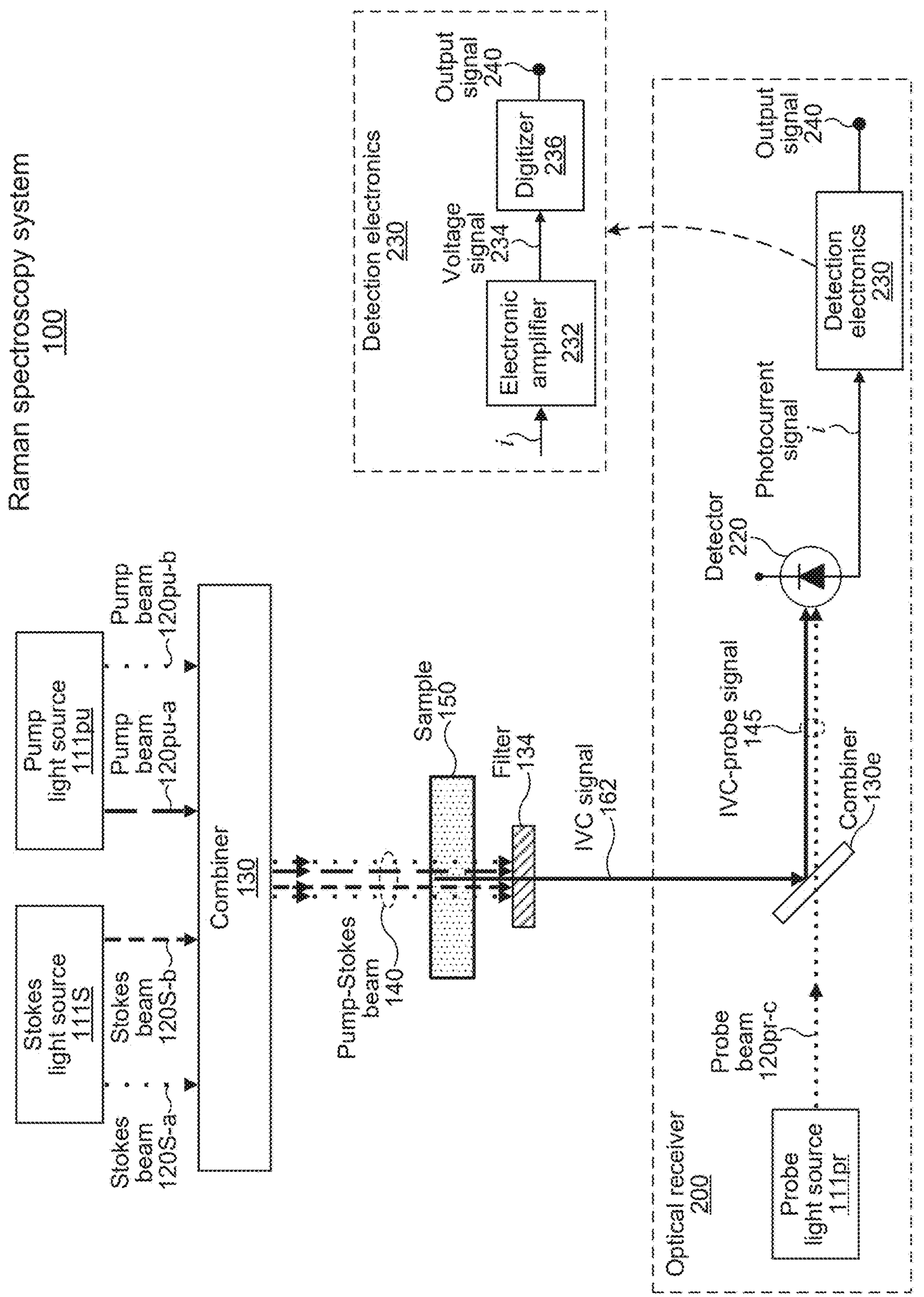
FIG. 27 illustrates an example Raman spectroscopy system configured to measure an IVC signal.

FIG. 27 illustrates an example Raman spectroscopy system 100 configured to measure an intramolecular vibrational coupling (IVC) signal 162. The Raman spectroscopy system includes a pump light source 111_pu_ that produces two pump beams of light 120_pu-a_ and 120_pu-b_ and a Stokes light source 111S that produces two Stokes beams of light 120S-a and 120S-b. The optical combiner 130 (which may be similar to the combiner 130 in FIG. 14) combines the four beams of light to produce a combined pump-Stokes beam of light 140. The combined pump-Stokes beam 140, which includes two pump beams 120_pu-a_ and 120_pu-b_ and two Stokes beams 120S-a and 120S-b, is directed to a sample 150. The optical combiner 130 may include one or more fiber-optic, waveguide-based, or free-space optical combiners, and the pump-Stokes beam 140 may be directed to the sample 150 via optical fiber, via an optical waveguide, or as a free-space optical beam. The four pump and Stokes beams may interact with a particular material (e.g., a molecule having a particular composition) in the sample 150 via intramolecular vibrational coupling (IVC) to produce an IVC signal 162, which is directed to the optical receiver 200 for measurement.

Figure 28:
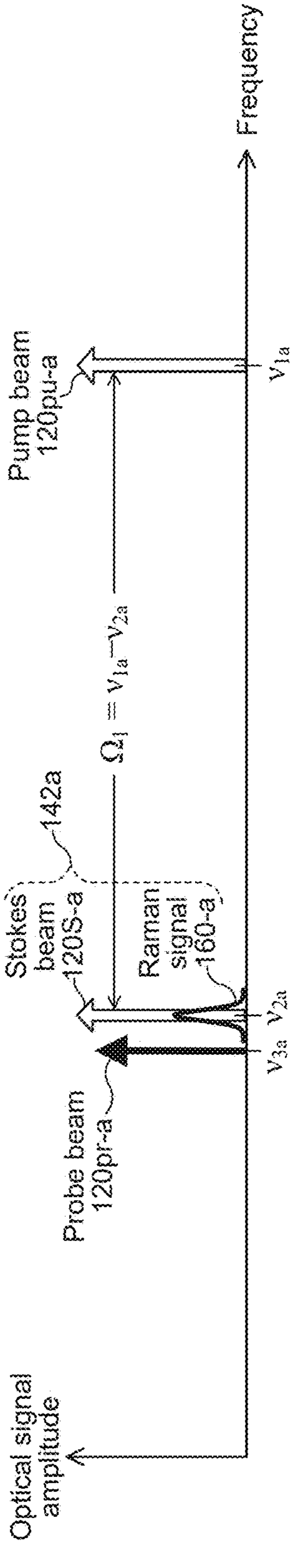
FIGS. 28-30 each illustrate example optical signals produced in the Raman spectroscopy system of FIG. 27.
Figure 29:
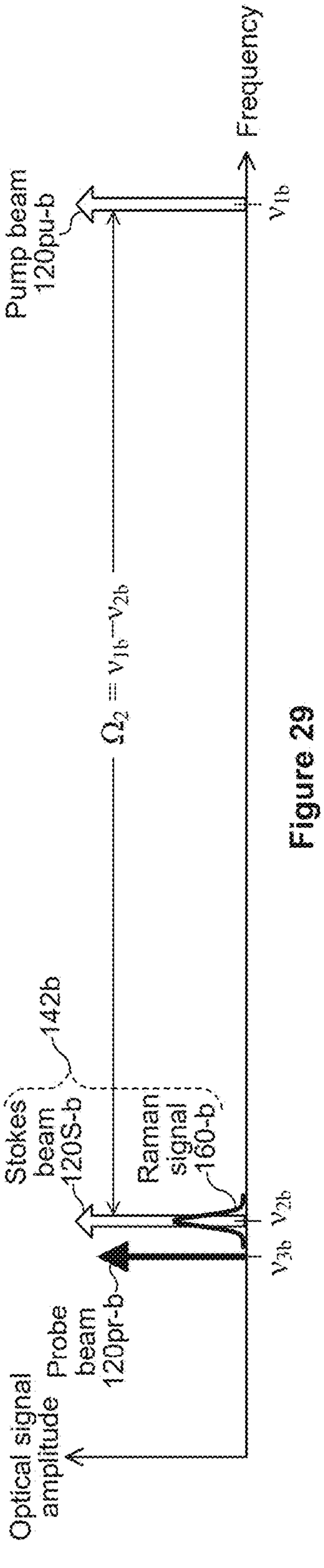
Figure 30:
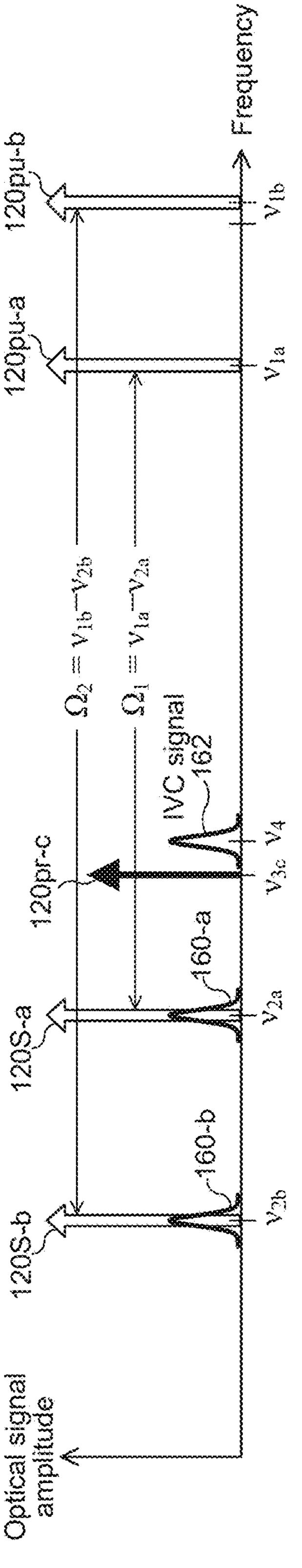

FIGS. 28-30 each illustrate example optical signals produced in the Raman spectroscopy system 100 of FIG. 27. FIG. 28 illustrates optical signals for measurement of a first Raman signal 160-_a_ produced with a first pump-Stokes frequency offset of $\Omega_1$. In FIG. 28, the pump beam 120_pu-a_ is at frequency $\nu_{1a}$, the Stokes beam 120S-a is at frequency $\nu_{2a}$, and the probe beam 120_pr-a_ is at frequency $\nu_{3a}$. FIG. 29 illustrates optical signals for measurement of a second Raman signal 160-_b_ produced with a second pump-Stokes frequency offset of $\Omega_2$. In FIG. 29, the pump beam 120_pu-b_ is at frequency $\nu_{1b}$, the Stokes beam 120S-b is at frequency $\nu_{2b}$, and the probe beam 120_pr-b_ is at frequency $\nu_{3b}$. In FIGS. 28-30, the first pump-Stokes frequency offset $\Omega_1$ may be approximately equal to a frequency of a first vibrational mode of a molecule that is part of the sample 150, and the second pump-Stokes frequency offset $\Omega_2$ may be approximately equal to a frequency of a second vibrational mode of the molecule. FIG. 30 illustrates optical signals for measurement of an IVC signal 162 produced when both vibrational modes of the molecule are excited by the four beams of light (the two pump beams 120_pu-a_ and 120_pu-b_ and the two Stokes beams 120S-a and 120S-b). The pump light source 111_pu_ produces the first pump beam 120_pu-a_ at the first pump frequency $\nu_{1a}$, and the Stokes light source 111S produces the first Stokes beam 120S-a at the first Stokes frequency $\nu_{2a}$ (where the first pump and Stokes frequencies are offset by the first pump-Stokes frequency offset $\Omega_1=\nu_{1a}-\nu_{2a}$). Additionally, the pump light source 111_pu_ produces the second pump beam 120_pu-b_ at the second pump frequency $\nu_{1b}$, and the Stokes light source 111S produces the second Stokes beam 120S-b at the second Stokes frequency $\nu_{2b}$ (where the second pump and Stokes frequencies are offset by the second pump-Stokes frequency offset $\Omega_2=\nu_{1b}-\nu_{2b}$). In FIG. 30, in addition to producing the two Raman signals 160-_a_ and 160-_b_ (e.g., by coherent Raman scattering), an IVC signal 162 is also produced. The IVC signal 162 may result from vibrational coupling between the first and second vibrational modes of the molecule.

The measurements of the first and second Raman signals 160-_a_ and 160-_b_ illustrated in FIGS. 28 and 29 are performed by the Raman spectroscopy system 100 in FIG. 27 and may be performed in a manner similar to the measurement of the Raman signal 160 illustrated in FIG. 15 and described herein. For the measurement of the first Raman signal 160-_a_ illustrated in FIG. 28, the pump light source 111_pu_ in FIG. 27 produces the first pump beam 120_pu-a_ (and may not produce a second pump beam 120_pu-b_) and the Stokes light source 111S produces the first Stokes beam 120S-a (and may not produce a second Stokes beam 120S-b). The first pump beam 120_pu-a_ and the first Stokes beam 120S-a (with pump-Stokes frequency offset $\Omega_1=\nu_{1a}-\nu_{2a}$) are directed to the sample 150. The pump and Stokes beams may interact with the sample 150 to produce the first Raman signal 160-_a_ (e.g., by coherent Raman scattering of the pump and Stokes beams at the sample). The Raman-Stokes signal 142_a_ (which includes the first Raman signal 160-_a_ and the Stokes beam 120S-a after interacting with the sample) is collected and directed to the optical receiver 200 for measurement. Measurement of the Raman-Stokes signal 142_a_ may include coherent mixing of the Raman-Stokes signal with the probe beam 120_pr-a_ at an optical detector 220 to produce a photocurrent signal i. The frequency offset between the Stokes beam 120S-a and the probe beam 120_pr-a_ is $|\nu_{2a}-\nu_{3a}|$, and the probe-beam frequency $\nu_{3a}$ may be selected so that the frequency offset is (i) within the bandwidth of the optical receiver 200 and (ii) between approximately 10 MHz and approximately 2 GHz.

For the measurement of the second Raman signal 160-_b_ illustrated in FIG. 29, the pump light source 111_pu_ in FIG. 27 produces the second pump beam 120_pu-b_ (and may not produce a first pump beam 120_pu-a_) and the Stokes light source 111S produces the second Stokes beam 120S-b (and may not produce a first Stokes beam 120S-a). The second pump beam 120_pu-b_ and the second Stokes beam 120S-b (with pump-Stokes frequency offset $\Omega_2=\nu_{1b}-\nu_{2b}$) are directed to the sample 150. The pump and Stokes beams may interact with the sample 150 to produce the second Raman signal 160-_b_ (e.g., by coherent Raman scattering of the pump and Stokes beams at the sample). The Raman-Stokes signal 142_b_ (which includes the second Raman signal 160-_b_ and the Stokes beam 120S-b after interacting with the sample) is collected and directed to the optical receiver 200 for measurement. Measurement of the Raman-Stokes signal 142_b_ may include coherent mixing of the Raman-Stokes signal with the probe beam 120_pr-b_ at an optical detector 220 to produce a photocurrent signal i. The frequency offset between the Stokes beam 120S-b and the probe beam 120_pr-b_ is $|\nu_{2b}-\nu_{3b}|$, and the probe-beam frequency $\nu_{3b}$ may be selected so that the frequency offset is (i) within the bandwidth of the optical receiver 200 and (ii) between approximately 10 MHz and approximately 2 GHz.

In FIG. 30, the pump light source 111_pu_ in FIG. 27 produces both pump beams 120_pu-a_ and 120_pu-b_, and the Stokes light source 111S produces both Stokes beams 120S-a and 120S-b. The four beams of light (two pump beams and two Stokes beams) are directed to the sample 150. The two pump beams 120*pu-a* and 120*pu-b* and the two Stokes beams 120S-a and 120S-b have the two pump-Stokes frequency offsets 221 and 22, and the four beams of light may interact with molecules in the sample via intramolecular vibrational coupling to produce an IVC signal 162. The IVC signal 162 in FIG. 27 is collected and directed to the optical receiver 200 for measurement. Measurement of the IVC signal 162 may include coherent mixing of the IVC signal with the probe beam 120*pr-c* at the optical detector 220 to produce a photocurrent signal i. The frequency of the IVC signal 162 is $\nu_4$, and the frequency offset between the IVC signal 162 and the probe beam 120*pr-c* is $|\nu_4-\nu_{3c}|$. The probe-beam frequency $\nu_{3c}$ may be selected so that the IVC-probe frequency offset $|\nu_4-\nu_{3c}|$ is within the bandwidth of the optical receiver 200 (e.g., the IVC-probe frequency may be less than the upper cutoff frequency of the optical receiver). Additionally, the probe-beam frequency $\nu_{3c}$ may be selected so that the IVC-probe frequency offset is between approximately 10 MHz and approximately 2 GHz.

The Raman spectroscopy system 100 in each of FIGS. 19, 23, and 27 may be referred to as a Raman spectroscopy system for measurement of an intramolecular vibrational coupling (IVC) signal. The Raman spectroscopy system 100 in each of FIGS. 19, 23, and 27 is similar to the system illustrated in FIG. 15, and each of the systems in FIGS. 19, 23, and 27 may be used to measure a Raman signal 160 as well as an IVC signal 162. For example, a Raman spectroscopy system 100 may measure one or more Raman signals 160, and the system may then measure an IVC signal 162 that is associated with the previously measured Raman signals. As another example, prior to measuring the IVC signal 162 illustrated in FIG. 22, the system in FIG. 19 may measure the Raman signals 160-*a* and 160-*b* as illustrated in FIGS. 20 and 21. The two Raman signals 160-*a* and 160-*b* and the IVC signal 162 may be associated with a particular molecule of interest (e.g., the particular molecule may have vibrational modes at the frequencies $\Omega_1$ and $\Omega_2$, and the IVC signal may be produced by intramolecular vibrational coupling between the two vibrational modes). The system may first measure the Raman signals 160-*a* and 160-*b* to determine that those signals are present, and then the system may measure the IVC signal 162. If the IVC signal 162 is not present (or if the size of the IVC signal is below a threshold value), then the system may determine that the particular molecule of interest is not present in the sample.

The pump and Stokes light sources of a Raman spectroscopy system 100 may produce any suitable combination of three or more beams of light having two different pump-Stokes frequency offsets $\Omega_1$ and $\Omega_2$. The three or more beams of light include at least one pump beam 120*pu* and at least one Stokes beam 120S, and each pump-Stokes frequency offset Q corresponds to a frequency difference between one of the pump beams and one of the Stokes beams. The Raman spectroscopy systems 100 in FIGS. 19, 23, and 27 are similar to one another, with the primary difference being the number of pump and Stokes beams used to produce the frequency offsets $\Omega_1$ and $\Omega_2$ and the associated IVC signal 162. In FIG. 19, the pump and Stokes light sources produce three beams of light: a pump beam 120*pu*, a first Stokes beam 120S-a, and a second Stokes beam 120S-b. In FIG. 23, the pump and Stokes light sources produce three beams of light: a Stokes beam 120S, a first pump beam 120*pu-a*, and a second pump beam 120*pu-b*. In FIG. 27, the pump and Stokes light sources produce four beams of light: a first pump beam 120*pu-a*, a second pump beam 120*pu-b*, a first Stokes beam 120S-a, and a second Stokes beam 120S-b. Each of the Raman spectroscopy systems 100 of FIGS. 19, 23, and 27 includes a pump light source 111*pu* and a Stokes light source 111S which together produce three or more beams of light that include at least one pump beam 120*pu* and at least one Stokes beam 120S. The three or more beams of light have a first pump-Stokes frequency offset $\Omega_1$ and a second pump-Stokes frequency offset $\Omega_2$, where each pump-Stokes frequency offset is produced by a frequency difference between one pump beam 120*pu* and one Stokes beam 120S. Generally, the frequency of each of the pump beams is greater than the frequency of each of the Stokes beams, and the frequency $\nu_4$ of the IVC signal 162 is less than the frequency of each of the pump beams.

Each of the light sources 111 in FIGS. 19, 23, and 27 may be similar to or may include a light source, laser diode, or laser as illustrated in any of FIGS. 1-7 or described herein. For example, each of the light sources 111 in FIGS. 19, 23, and 27 may be a free-space light source, a fiber-coupled light source, or a waveguide-based light source. Additionally, each of the light sources 111 in FIGS. 19, 23, and 27 may be a fixed-wavelength light source or a wavelength-tunable light source. For example, the pump light source 111*pu*, Stokes light source 111S, or probe light source 111*pr* may be a wavelength-tunable light source that includes a wavelength-tunable laser or a wavelength-tunable laser diode. As another example, a pump or Stokes light source may be a wavelength-tunable light source, and the pump-Stokes frequency offset of pump and Stokes beams produced by the light sources may be adjustable by changing the wavelength of light produced by the wavelength-tunable light source. As another example, the probe light source 111*pr* in FIG. 19 may be a wavelength-tunable light source with a wavelength-tuning range of 840 nm to 880 nm (e.g., probe beam 120*pr-a* in FIG. 20 may have a wavelength of approximately 845 nm, and probe beam 120*pr-b* in FIG. 21 may have a wavelength of approximately 875 nm). As another example, the pump light source 111*pu* in FIG. 23 may include two or more fixed-wavelength laser diodes (e.g., in FIG. 26, pump beam 120*pu-a* may be produced by a fixed-wavelength 800-nm laser diode, and pump beam 120*pu-b* may be produced by a fixed-wavelength 740-nm laser diode).

The Raman spectroscopy system 100 in each of FIGS. 19, 23, and 27 may include one or more optical elements that direct the pump and Stokes beams to a sample 150. For example, the optical elements include an optical combiner 130 that combines the pump and Stokes beams into a pump-Stokes beam 140 that is directed to the sample 150. Additionally, each Raman spectroscopy system 100 may include one or more optical elements that collect an IVC signal 162 and direct the IVC signal to an optical receiver 200. For example, the optical elements may include (i) a focusing lens that focuses the pump-Stokes beam 140 into or onto the sample 150 or (ii) a collection lens that collects the IVC signal 162 from the sample. A collection lens may receive the IVC signal 162 and produce a collimated or focused beam that is directed to the optical receiver 200.

The optical elements of a Raman spectroscopy system 100 may include one or more optical filters 134. An optical filter 134 located between the sample 150 and the optical receiver 200 may transmit light at one or more wavelengths associated with an IVC signal 162 and may block or reflect light at one or more wavelengths associated with the pump or Stokes beams of light. Alternatively, an optical filter 134 may reflect light at one or more wavelengths associated with an IVC signal 162 (e.g., to direct a reflected IVC signal to an optical receiver) and may block or transmit light at one or more wavelengths associated with the pump or Stokes beams of light. In FIG. 19, the optical filter 134 transmits the IVC signal 162 to direct the IVC signal to the optical receiver 200 and blocks the pump beam 120*pu* and the two Stokes beams 120S-a and 120S-b, which prevents the pump and Stokes beams from propagating to the detector 220. In FIG. 23, the optical filter 134 transmits the IVC signal 162 and the Stokes beam 120S and blocks the two pump beams 120*pu-a* and 120*pu-b*. In FIG. 27, the optical filter 134 transmits the IVC signal 162 and blocks the two Stokes beams 120S-a and 120S-b and the two pump beams 120*pu-a* and 120*pu-b*.

An optical filter 134 may include a dichroic filter, an interference filter, an absorption filter, a Bragg grating, a diffraction grating, a Fabry-Perot cavity, or any combination thereof. For example, the optical filter 134 in FIG. 23 may be a long-pass interference filter that transmits the Stokes beam 120S and IVC signal 162 and blocks or reflects the two pump beams 120*pu-a* and 120*pu-b*. An optical filter 134 may include a combination of two or more optical filters. For example, the optical filter 134 in FIG. 19 may include two optical filters: (i) a first optical filter that blocks or reflects the pump beam 120*pu* and (ii) a second optical filter that blocks or reflects the two Stokes beams 120S-a and 120S-b. The first optical filter may be a long-pass interference filter that blocks or reflects the pump beam 120*pu* and transmits the IVC signal 162 and the two Stokes beams 120S-a and 120S-b. The second optical filter may be a Bragg grating, a diffraction grating, or a Fabry-Perot cavity that transmits the IVC signal 162 and blocks or reflects the two Stokes beams 120S-a and 120S-b. For example, the second optical filter may be a diffraction grating that diffracts the IVC signal 162 at an angle to direct the IVC signal to the detector 220, while the two Stokes beams 120S-a and 120S-b are diffracted at angles that direct the beams away from the detector.

In some embodiments, a Raman spectroscopy system 100 may not include an optical filter 134 located between the sample 150 and the optical receiver 200. For example, an IVC signal 162 may be directed to an optical receiver 200 along with one or more pump or Stokes beams of light. The optical receiver 200 may measure the IVC signal 162 by coherent mixing of the IVC signal with a probe beam of light 120*pr* at an optical detector 220. The IVC signal 162 may be measured without significant interference from the pump or Stokes beams that accompany the IVC signal 162 since the pump or Stokes beams may not contribute significantly to the coherent mixing process.

The pump and Stokes beams in FIGS. 19, 23, and 27 may each have any suitable polarization. For example, each pump beam and each Stokes beam that is directed to the sample 150 may be linearly, circularly, or elliptically polarized. As another example, the pump beam 120*pu* and the two Stokes beams 120S-a and 120S-b in FIG. 19 may each be linearly polarized and oriented along the same direction (e.g., horizontal or vertical). As another example, the pump beam 120*pu* in FIG. 19 may be linearly polarized, and each of the two Stokes beams 120S-a and 120S-b may be (i) linearly polarized along the same direction as the pump beam, (ii) linearly polarized at 45 degrees with respect to the pump beam, (iii) linearly polarized at 90 degrees with respect to the pump beam, or (iv) circularly or elliptically polarized.

The Raman spectroscopy system 100 in each of FIGS. 19, 23, and 27 includes an optical receiver 200 that measures an IVC signal 162 produced by the pump and Stokes beams at the sample 150. The optical receiver 200 in FIGS. 19, 23, and 27 is similar to the optical receiver illustrated in FIG. 15 and described herein. Additionally, measurement of the IVC signal 162 as illustrated in FIGS. 19, 23, and 27 and described herein is similar to the measurement of the Raman signal 160 illustrated in FIG. 15 and described herein. The optical receiver 200 (which may be referred to as a heterodyne optical receiver or an optical receiver with coherent detection) measures the IVC signal 162 using an optical heterodyne technique in which the IVC signal 162 is coherently mixed with a probe beam of light 120*pr-c*. The optical receiver 200 includes a detector 220 and detection electronics 230. The optical combiner 130*e* (which may be a free-space, fiber-optic, or waveguide-based optical combiner) combines the IVC signal 162 and the probe beam 120*pr-c* to produce an IVC-probe signal 145 that is directed to the detector 220. The IVC-probe signal 145 may be directed to the detector 220 as a free-space optical beam, as a fiber-coupled optical beam, or as a waveguide-coupled optical beam. The IVC signal 162 and the probe beam 120*pr-c* are coherently mixed at the detector 220, and this optical-heterodyne mixing process produces an analog photocurrent signal i (which may be referred to as a photocurrent, a photocurrent signal, or a current signal). The detection electronics 230 receives the photocurrent signal i and produces an electronic output signal 240 that corresponds to the photocurrent signal. The detection electronics 230 may include or may be referred to as an electronic circuit. The output signal 240 may be a digital signal that is sent to a processor, and the processor may determine a characteristic of the photocurrent signal i based on the digital output signal 240.

The optical receiver 200 in each of FIGS. 19, 23, and 27 includes an optical detector 220 that detects the IVC-probe signal 145. The optical detector 220 in FIGS. 19, 23, and 27 may be similar to the optical detector 220 illustrated in FIG. 15 and described herein. For example, the IVC signal 162 and the probe beam 120*pr-c* in FIG. 19 may each have a wavelength in the 400-1100 nm range, and the detector 220 may include a silicon PIN photodiode or a silicon APD. As another example, the IVC signal 162 and the probe beam 120*pr-c* in FIG. 19 may each have a wavelength in the 1000-1700 nm range, and the detector 220 may include an InGaAs PIN photodiode.

The detection electronics 230 of an optical receiver 200 may include an electronic amplifier 232 and a digitizer 236. The electronic amplifier 232 may include a transimpedance amplifier that amplifies the photocurrent signal i to produce an analog voltage signal 234 that corresponds to the photocurrent signal i. For example, the photocurrent signal i and the voltage signal 234 may have similar temporal shapes or may include similar electronic frequency components. The electronic amplifier 232 may include an additional gain stage that further amplifies an intermediate voltage signal produced by the transimpedance amplifier to produce the voltage signal 234. Additionally, the electronic amplifier 232 may include an electronic filter (e.g., a low-pass, high-pass, or band-pass filter) that filters the photocurrent signal or voltage signal. For example, the electronic amplifier 232 may include (i) a high-pass filter that removes a DC offset and low-frequency components (e.g., frequency components below 10 MHz) from the photocurrent signal or (ii) a band-pass filter that removes the DC and low-frequency components as well as high-frequency components (e.g., frequency components above 2 GHz). As another example, the electronic amplifier 232 may include a band-pass filter having a pass-band that includes the frequency $|\nu_4-\nu_{3c}|$, which corresponds to the frequency offset Δf between the IVC signal 162 and the probe beam 120*pr-c* in FIGS. 22, 26, and 30.

The digitizer 236 in each of FIGS. 19, 23, and 27 receives the voltage signal 234 and produces an electronic output signal 240 that corresponds to the voltage signal 234. The output signal 240 may be referred to as corresponding to or representing the photocurrent signal, since the output signal corresponds to the voltage signal 234 which in turn corresponds to the photocurrent signal i. The output signal 240 may be a digital signal that includes a digital representation of the voltage signal 234 or may include a digital value corresponding to the voltage signal. For example, the digitizer 236 may include an analog-to-digital converter (ADC) that produces a digital version of the voltage signal 234, and the output signal 240 may include a time-domain digital representation of the voltage signal 234. Additionally or alternatively, the output signal 240 may include a frequency-domain representation of the voltage signal, or the time-domain digital representation of the voltage signal 234 may be sent to a processor that determines a frequency-domain representation. As another example, the digitizer 236 may include a lock-in amplifier or a boxcar averager, and the output signal 240 may include a digital value that corresponds to the size of an amplitude modulation of the voltage signal 234, which in turn corresponds to the size of an amplitude modulation of the photocurrent signal i. As another example, the digitizer 236 may include a sample-and-hold circuit, and the output signal may include a digital value that corresponds to the size of an amplitude modulation of the voltage signal 234.

The optical receiver 200 in each of FIGS. 19, 23, and 27 may have an electronic bandwidth between approximately 10 MHz and approximately 10 GHz. For example, the optical receiver 200 in FIG. 19 may have an electronic bandwidth that extends from a lower cutoff frequency to an upper cutoff frequency. The lower cutoff frequency may be approximately DC (i.e., zero hertz), 1 MHz, 10 MHz, 50 MHz, 100 MHz, or any other suitable lower-frequency value, and the upper cutoff frequency may be approximately 10 MHz, 100 MHz, 1 GHZ, 2 GHZ, 5 GHZ, 10 GHz, or any other suitable upper-frequency value.

Figure 31:
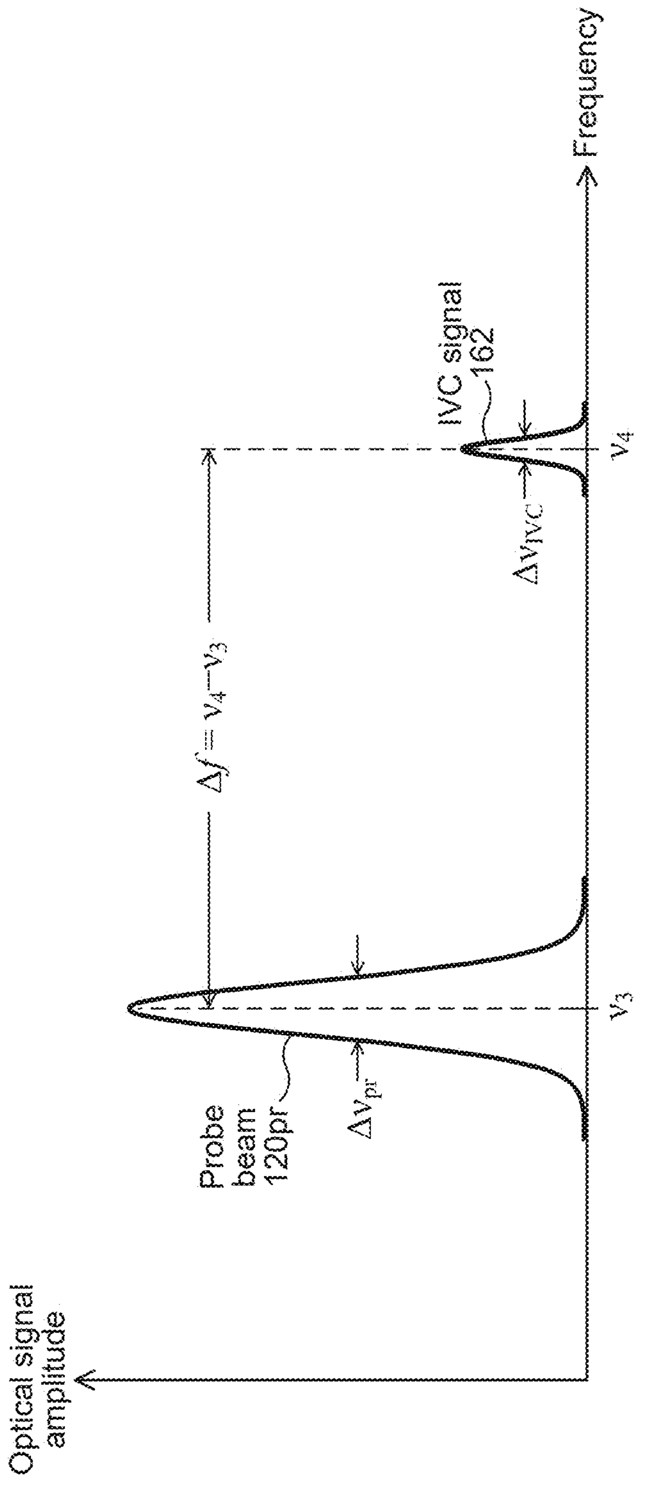
FIGS. 31-32 illustrate an example probe beam of light and IVC signal.

As illustrated in FIG. 31, an IVC signal 162 and a probe beam 120*pr* may have a frequency offset of Δf, where $\Delta f = |\nu_4 - \nu_3|$. Coherent mixing of the IVC signal 162 and the probe beam 120*pr* may produce a photocurrent signal i with an amplitude modulation at the frequency Δf, and an optical receiver 200 may have an electronic bandwidth that includes the frequency Δf. For example, the frequency of the probe beam may be selected so that the IVC-probe frequency offset Δf is less than an upper cutoff frequency of the optical receiver 200 and greater than a lower cutoff frequency of the optical receiver. As another example, the frequency offset Δf between an IVC signal 162 and a probe beam 120*pr* may be 500 MHz, and coherent mixing of the IVC signal and probe beam at a detector 220 may produce a photocurrent signal i that includes an amplitude modulation at 500 MHz. The optical receiver 200 may have a 100-MHz electronic bandwidth that extends from a lower cutoff at 450 MHz to an upper cutoff at 550 MHz to allow the optical receiver to amplify and measure the 500-MHz amplitude-modulated photocurrent signal.

In FIGS. 19-30, a combined pump-Stokes beam 140 is directed to a sample 150, and Raman signals 160-*a* and 160-*b* are produced by coherent Raman scattering of pump and Stokes beams at the sample 150. Additionally, three or more pump and Stokes beams interact with the sample 150 to produce an IVC signal 162. The three or more pump and Stokes beams may interact with a particular material in the sample 150 via intramolecular vibrational coupling to produce the IVC signal 162. The sample 150 may be a solid, liquid, or gas, or any combination thereof. The sample 150 may include a biological material (e.g., blood, urine, saliva, sweat, or cerebrospinal fluid), an organic material, an inorganic material, a crystalline material, an amorphous solid material, or any other suitable material or combination of suitable materials. The particular material that produces the IVC signal 162 may be a molecule having a particular composition, where the composition refers to the chemical formula and the structure of the molecule (e.g., a glucose molecule with the chemical formula $C_6H_{12}O_6$). For example, the sample 150 may be a biological material, and the particular molecule of interest may be a medicine or drug, such as for example, ibuprofen, acetaminophen, a benzodiazepine, a cannabinoid, a barbiturate, or amphetamine. As another example, the sample 150 may be a biological material obtained from a dog, and the particular molecule of interest may be a canine toxin (e.g., ethylene glycol, theobromine from chocolate, tartaric acid from grapes or raisins, xylitol, or a rodenticide). As another example, the sample may be a biological material obtained from a human or animal patient, and the particular molecule of interest may be an endogenous substance, such as for example, cortisol, glucose, cholesterol, creatinine, bilirubin, liver enzymes, or albumin.

In FIGS. 19-30, three or more pump and Stokes beams of light with two pump-Stokes frequency offsets $\Omega_1$ and $\Omega_2$ are directed to a sample 150. The pump and Stokes beams interact with a particular material in the sample via intramolecular vibrational coupling (IVC) to produce an IVC signal 162 at an IVC frequency $\nu_4$. Herein, a particular material may refer to a particular molecule, where the molecule has a particular composition, and the sample 150 may include multiple of these molecules of interest (e.g., 10, $10^3$, $10^6$, $10^9$, $10^{12}$, or any other suitable number of these molecules). The first pump-Stokes frequency offset $\Omega_1$ may be approximately equal to a frequency of a first vibrational mode of the molecule of interest, and the second pump-Stokes frequency offset $\Omega_2$ may be approximately equal to a frequency of a second vibrational mode of the molecule. The IVC signal 162 (which may be referred to as a multi-mode vibrational coupling signal) may result from vibrational coupling between the first and second vibrational modes of the molecule. Intramolecular vibrational coupling refers to the interaction and energy exchange between different vibrational modes of the same molecule. Instead of each vibrational mode acting independently, two or more vibrational modes of a molecule can influence and couple with one another through various mechanisms, including anharmonic coupling, Fermi resonance, Coriolis coupling, or vibronic coupling. The pump and Stokes beams may excite two vibrational modes of the same molecule at the two frequencies $\Omega_1$ and $\Omega_2$, and the two vibrational modes may interact with one another to produce an IVC signal 162 at another frequency $\nu_4$. In some embodiments, the IVC frequency $\nu_4$ may be a linear combination of one or more of: a frequency $\nu_1$ of a pump beam 120*pu*, a frequency $\nu_2$ of a Stokes beam 120S, the first pump-Stokes frequency offset $\Omega_1$, and the second pump-Stokes frequency offset $\Omega_2$. An IVC signal 162 may only be produced by a single molecular species when two or more of its vibrational modes are excited. Accordingly, an IVC signal will not be produced by two different molecules, where one molecule has a resonant vibrational frequency of $\Omega_1$ and the other molecule has a resonant vibrational frequency of $\Omega_2$. For example, if theobromine has a vibrational frequency of $\Omega_1$ and xylitol has a vibrational frequency of $\Omega_2$, a sample 150 containing theobromine and xylitol may not produce an IVC signal when excited with beams of light having the two frequency offsets $\Omega_1$ and $\Omega_2$. Alternatively, if ethylene glycol has vibrational frequencies of $\Omega_1$ and $\Omega_2$, a sample 150 containing ethylene glycol may produce an IVC signal 162 when excited with beams of light having the two frequency offsets $\Omega_1$ and $\Omega_2$.

A technical advantage of a Raman spectroscopy system 100 as described herein is an improved chemical sensitivity as compared to a conventional Raman spectroscopy system. A conventional Raman spectroscopy system may measure a Raman spectrum produced by a sample and identify one or more components of the sample based on the measured spectrum. However, different molecules may exhibit Raman peaks that overlap or are located close to one another, which can make unambiguous identification of a particular molecule difficult. A Raman spectroscopy system 100 configured to measure an IVC signal 162 as described herein may allow for a particular molecule to be measured despite potential interference from other molecules with overlapping Raman peaks. By measuring both a Raman spectrum as well as an IVC signal 162, a Raman spectroscopy system 100 may unambiguously determine (i) whether the particular molecule is present in a sample 150 or (ii) an amount or a concentration of the particular molecule in the sample. A sample 150 may be measured to identify two or more Raman peaks that are produced by the particular molecule as well as an IVC signal 162 that is associated with the Raman peaks and the particular molecule.

For example, a particular molecule may have known Raman peaks at frequencies $\Omega_1$ and $\Omega_2$ and may produce an IVC signal 162 associated with the two Raman frequencies $\Omega_1$ and $\Omega_2$ at frequency $\nu_4$, as illustrated in FIGS. 20-22. A sample 150 may be measured to identify a first Raman signal 160-*a* produced with a first pump-Stokes frequency offset of $\Omega_1$ (as illustrated in FIG. 20) and a second Raman signal 160-*b* produced with a second pump-Stokes frequency offset of $\Omega_2$ (as illustrated in FIG. 21). After the two Raman signals 160-*a* and 160-*b* are measured, the Raman spectroscopy system 100 may measure the IVC signal 162 at frequency $\nu_4$. If the sample 150 does not exhibit the first Raman signal 160-*a* or the second Raman signal 160-*b* (or if the size of these Raman signals is below a threshold value), then the system may determine that the particular molecule is not present in the sample 150. Alternatively, if the sample 150 exhibits both Raman signals 160-*a* and 160-*b* and exhibits the associated IVC signal 162 at frequency $\nu_4$, then the system may determine that the particular molecule is present in the sample 150. Additionally, the system may determine an amount or a concentration of the particular molecule in the sample 150 based on the measurement of the Raman signals or the IVC signal. Finally, if the sample 150 exhibits both Raman signals 160-*a* and 160-*b* but does not exhibit the associated IVC signal 162 at frequency $\nu_4$, then the system may determine that the particular molecule of interest is not present in the sample 150 (or that the amount or concentration of the particular molecule is below a threshold value). In this case, the two Raman signals 160-*a* and 160-*b* may be produced by different molecules that have interfering Raman peaks that overlap the Raman peaks associated with the particular molecule of interest. If the two Raman signals 160-*a* and 160-*b* are produced by two different molecular species, then an IVC signal 162 at frequency $\nu_4$ will not be produced, since the IVC signal results from vibrational coupling between vibrational modes of a single molecular species. In this manner, a Raman spectroscopy system 100 configured to measure an IVC signal 162 as described herein may determine whether a particular molecule is present in a sample 150 despite the presence of other molecules that produce Raman signals that interfere with the particular molecule of interest.

Another technical advantage of a Raman spectroscopy system 100 as described herein is a higher spectral resolution than a conventional Raman spectroscopy system. In a conventional Raman spectroscopy system, a Raman signal produced by a sample may be measured in the optical domain using an optical spectrometer. A spectrometer typically uses a dispersive optical element (e.g., a diffraction grating) to separate the Raman signal into its various spectral components. However, this type of measurement performed in the optical domain typically has a spectral resolution on the order of 1 $cm^{-1}$ (or, about 30 GHZ). In contrast, the spectral resolution of a Raman spectroscopy system with coherent detection, as described herein, may be determined primarily by the spectral linewidth $\Delta\nu_{pr}$ of the probe beam 120*pr* that is coherently mixed with a Raman signal 160 or IVC signal 162. The probe light source 111*pr* may include a wavelength-tunable laser diode with a linewidth of 200 MHz or less, which corresponds to a spectral resolution of less than 200 MHz (or, less than 0.007 $cm^{-1}$). This 200-MHz spectral resolution is more than 100 times better than the 30-GHz spectral resolution of a conventional Raman spectroscopy system. In some embodiments, the probe light source 111*pr* may have a linewidth of 2 MHz or less, which corresponds to a spectral resolution of less than 2 MHz (or, less than $66\times10^{-6}$ $cm^{-1}$).

An additional related advantage of a Raman spectroscopy system 100 as described herein is that the signal capture and analysis are performed in the electronic domain (e.g., at electronic frequencies between DC and 50 GHZ) rather than in the optical domain (e.g., at optical frequencies between 60 THz and 1,000 THz). The coherent mixing of two optical signals (IVC signal 162 and probe beam 120*pr*) produces an electronic signal which can be analyzed in the electronic domain with relatively high resolution compared to an optical signal. This electronic signal analysis, along with the relatively narrow spectral linewidth of the probe light source, provides a Raman spectroscopy system 100 with a high spectral resolution. The higher spectral resolution of a Raman spectroscopy system 100 as described may provide a corresponding improvement in the ability of the system to measure to sense various chemical species. For example, a Raman spectroscopy system with coherent detection may be able to distinguish between different chemical species that have Raman peaks or IVC signals located relatively close together, whereas a conventional Raman spectroscopy system may not be able to resolve spectral features below about 1 $cm^{-1}$. Additionally, the higher spectral resolution of a Raman spectroscopy system 100 may allow for lower concentrations of materials to be detected, as compared to a conventional Raman spectroscopy system. For example, a Raman spectroscopy system with coherent detection may be able to detect small deviations in the chemical signature of a biological sample, which may indicate the presence of damage or a mutation, which in turn may be correlated with a disease or pathogen.

Another technical advantage of a Raman spectroscopy system 100 as described herein is its relatively compact size. A Raman spectroscopy system with coherent detection may be packaged in a relatively compact enclosure as compared to a conventional Raman spectroscopy system. Since the spectral resolution of an optical spectrometer scales inversely with the optical path length of the spectrometer (e.g., a longer path length provides better spectral resolution), an optical spectrometer with a spectral resolution around 1 $cm^{-1}$ can be quite large or bulky. In contrast, since the spectral resolution of a Raman spectroscopy system as described herein is determined primarily by the spectral linewidth of the probe beam 120*pr*, a Raman spectroscopy system does not require a long optical path length to provide high spectral resolution. Thus, an enclosure for a Raman spectroscopy system with coherent detection may be significantly smaller than that for a conventional Raman spectroscopy system. In some embodiments, a Raman spectroscopy system as described herein may be packaged as a compact device that may be referred to as a lab-on-a-chip, a spectrometer on a chip, or a photonic integrated circuit (PIC). For example, a Raman spectroscopy system may be packaged as a portable or wearable device that provides ongoing, continual monitoring for a person or an animal.

Figure 32:
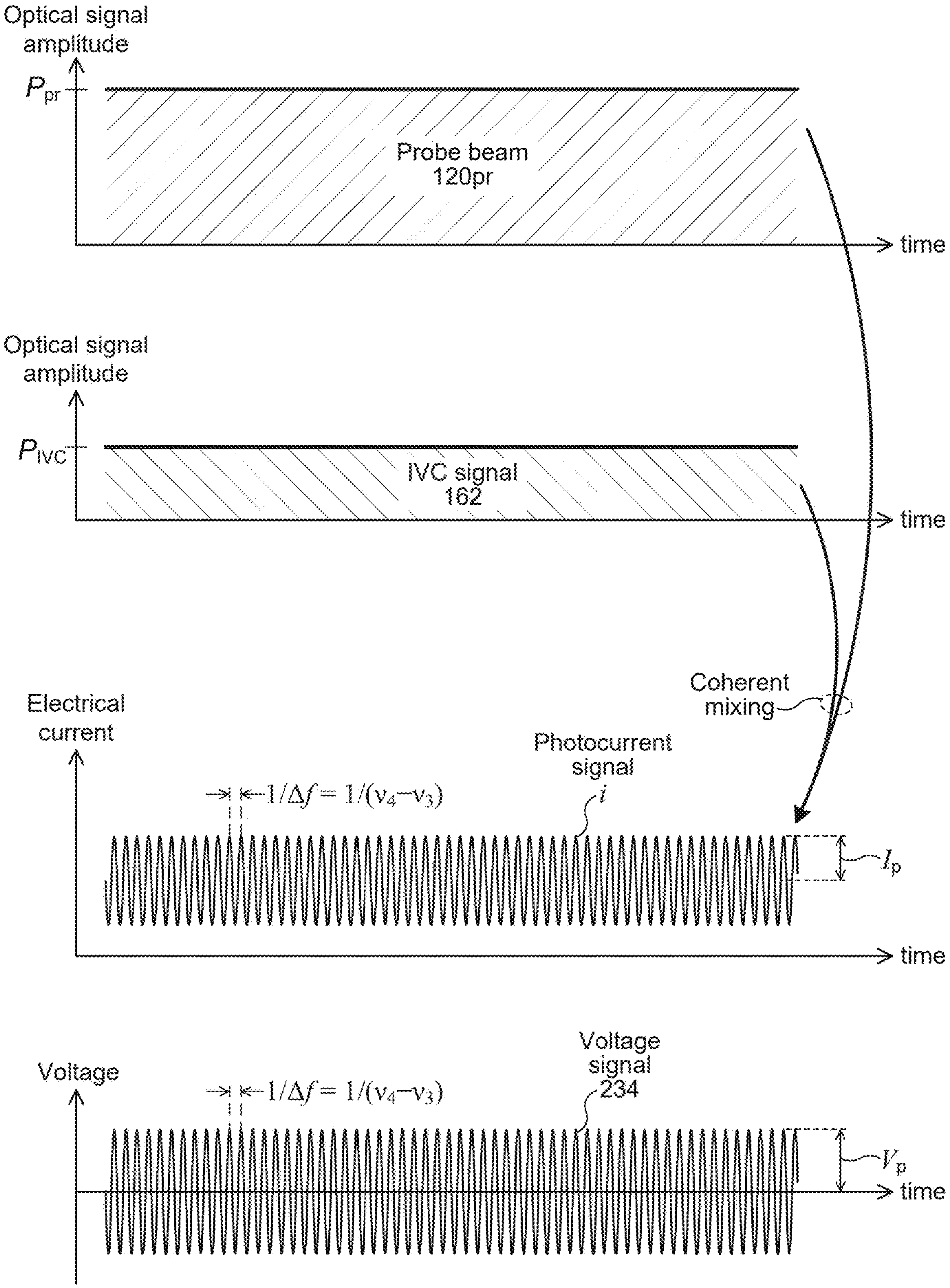

FIGS. 31-32 illustrate an example probe beam of light 120*pu* and IVC signal 162. The probe beam 120*pr* and the IVC signal 162 may be produced in any of the Raman spectroscopy systems 100 of FIGS. 19, 23, and 27. The IVC signal 162 may be produced by intramolecular vibrational coupling resulting from the interaction of the three or more pump and Stokes beams (with two pump-Stokes frequency offsets $\Omega_1$ and $\Omega_2$) with a particular molecule in a sample 150. FIG. 31 includes a frequency-domain plot of the probe beam 120*pr* and the IVC signal 162, and FIG. 32 includes time-domain plots of the same signals. Additionally, FIG. 32 includes (i) a time-domain plot of the photocurrent signal i produced by coherent mixing of the probe beam 120*pr* and the IVC signal 162 at a detector 220 and (ii) a time-domain plot of a corresponding voltage signal 234.

A Raman spectroscopy system 100 may use coherent detection to measure an IVC signal 162 and then, based on the measurement, may determine one or more characteristics (e.g., a size) of the IVC signal 162. The size of the IVC signal 162 (which may correspond to the optical power of the IVC signal) may depend on the two pump-Stokes frequency offsets $\Omega_1$ and $\Omega_2$ and on the composition of the sample 150. For example, the pump-Stokes frequency offsets $\Omega_1$ and $\Omega_2$ may correspond to resonant vibrational frequencies of a particular molecule, and the IVC signal 162 may be produced by intramolecular vibrational coupling between the two vibrational modes. The size of the IVC signal 162 may indicate the amount or concentration of the particular molecule of interest in the sample 150. Alternatively, if there is little or no IVC signal 162 (or the size of the IVC signal is below a threshold value), then it may be determined that the sample 150 contains little to none of the particular molecule of interest.

As illustrated in FIG. 31, the frequency of the probe beam 120*pr* is $\nu_3$, and the frequency of the IVC signal 162 is $\nu_4$. The probe frequency $\nu_3$ is less than the IVC-signal frequency $\nu_4$, and the frequency offset $\Delta f$ between the probe and IVC signals is $\nu_4-\nu_3$. In general, the probe frequency may be greater than or less than the IVC-signal frequency, and the IVC-probe frequency offset may be expressed as $\Delta f=|\nu_4-\nu_3|$. The probe frequency $\nu_3$ may be within 10 GHz of the IVC-signal frequency $\nu_4$ so that $\Delta f$ is less than or equal to 10 GHz. For example, the IVC-probe frequency offset $\Delta f$ may be between approximately 10 MHz and approximately 2 GHz.

The spectral linewidth $\Delta\nu_{pr}$ of the probe beam 120*pr* may be less than 200 MHz. For example, the probe-beam spectral linewidth $\Delta\nu_{pr}$ may be less than 200 MHz, 100 MHz, 50 MHz, 10 MHz, 10 MHz, 1 MHz, 100 kHz, or 10 KHz when measured over a time interval of approximately 1 ms, 100 ms, 1 s, 10 s, 100 s, or 1 hour. The IVC signal 162 in FIG. 31 has a frequency of $\nu_4$ and a spectral linewidth of $\Delta\nu_{IVC}$. The IVC-signal frequency $\nu_4$ may be referred to as a center frequency and may represent a peak frequency or an average frequency of the IVC signal 162.

As illustrated in FIG. 32, the probe beam 120*pr* and the IVC signal 162 are each optical signals with a substantially constant optical power. Since the IVC signal 162 is produced by three or more pump and Stokes beams, the pump and Stokes beams may also have substantially constant optical power. For example, the optical power of each of the pump, Stokes, and probe beams may vary by less than 1% over a time interval of approximately 10 ms. In other embodiments, an amplitude modulation may be applied to a pump or Stokes beam, and the resulting IVC signal 162 may include a corresponding amplitude modulation.

Figure 33:
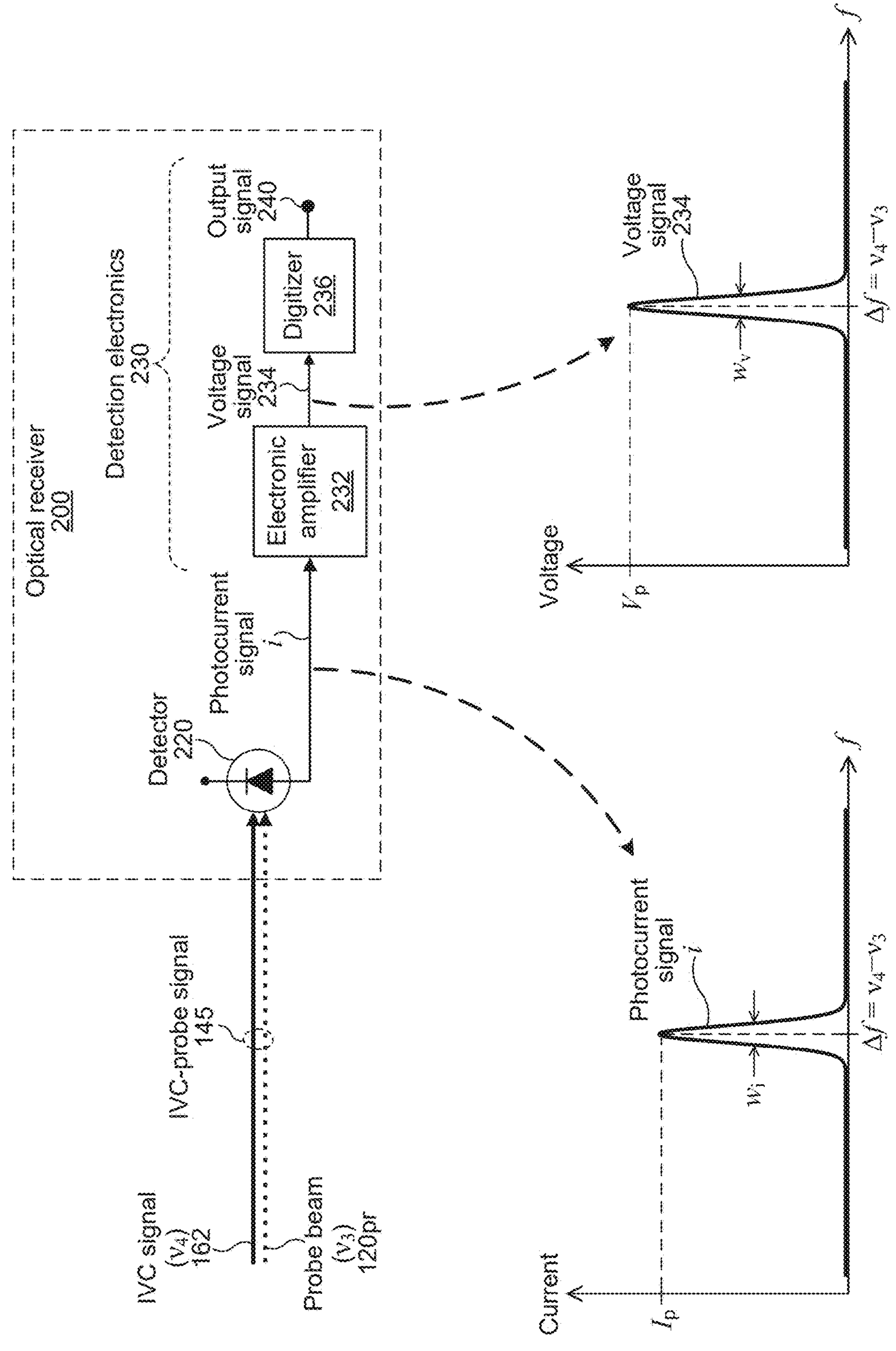
FIG. 33 illustrates an example optical receiver configured to measure the IVC signal of FIGS. 31-32.

FIG. 33 illustrates an example optical receiver 200 configured to measure the IVC signal 162 of FIGS. 31-32. The optical receiver 200 in FIG. 33 (which corresponds to the optical receiver in each of FIGS. 19, 23, and 27) is similar to that illustrated in FIG. 15. Measurement of the IVC signal as illustrated in FIG. 33 may be performed in a similar manner to measurement of the Raman signal 160 as illustrated in FIG. 15 and as discussed herein. In each of FIGS. 19, 23, and 27, an optical combiner 130*e* combines a probe beam 120*pr-c* and an IVC signal 162 to produce a combined IVC-probe signal 145 that is directed to an optical detector 220. In FIG. 33, the IVC signal 162 and the probe beam 120*pr* are coherently mixed at the detector 220, and the detector produces a photocurrent signal i in response to the IVC signal and the probe beam. The electronic amplifier 232 amplifies the photocurrent signal i to produce a corresponding voltage signal 234. The plots at the bottom of FIG. 32 are time-domain plots of the photocurrent signal i and the corresponding volage signal 234, and the plots in FIG. 33 are frequency-domain plots of the two signals. The voltage signal 234 is similar to the photocurrent signal i. For example, the time-domain plots of the photocurrent signal i and voltage signal 234 in FIG. 32 both include an amplitude modulation at the IVC-probe frequency offset $\Delta f$, and the frequency-domain plots of the photocurrent signal i and voltage signal 234 in FIG. 33 both include a peak at the frequency $\Delta f$.

In a Raman spectroscopy system with coherent detection in which the IVC-signal frequency $\nu_4$ and the probe frequency $\nu_3$ are offset by a frequency offset $\Delta f$ (where $\Delta f=|\nu_4-\nu_3|$), at least a portion of the photocurrent signal i that results from coherent mixing of the IVC signal 162 and the probe beam 120*pr* may include a sinusoidal amplitude modulation with a frequency $\Delta f$. The frequency $\nu_3$ of the probe beam may be selected so that the IVC-probe frequency offset $\Delta f$ is (i) within the electronic bandwidth of the optical receiver 200 and (ii) between approximately 10 MHz and approximately 2 GHz. For example, the optical receiver 200 in FIG. 33 may have a 200-MHz electronic bandwidth that extends from 900 MHz to 1.1 GHZ, and the IVC-probe frequency offset $\Delta f$ may be selected to be approximately 1 GHz. As illustrated by the time-domain and frequency-domain plots of the photocurrent signal i in FIGS. 32 and 33, the photocurrent signal includes a sinusoidal amplitude modulation with a frequency $\Delta f$ (where $\Delta f=\nu_4-\nu_3$) and a peak current amplitude $I_p$. The time-domain and frequency-domain plots of the corresponding voltage signal 234 in FIGS. 32 and 33 indicate that the voltage signal also includes a sinusoidal amplitude modulation at the same frequency $\Delta f$ and a peak voltage amplitude of $V_p$. In FIG. 33, the photocurrent signal i has an electronic linewidth of $w_i$, and the voltage signal 234 has an electronic linewidth of $w_v$. The electronic linewidths $w_i$ and $w_v$ may be related to one or more of the spectral linewidths $\Delta\nu_{pr}$ and $\Delta\nu_{IVC}$.

Coherent mixing of a probe beam 120*pr* and an IVC signal 162, which may be referred to as heterodyne mixing or heterodyne detection, occurs when the two optical signals are optically combined and then detected by a detector 220. Optically combining the probe beam 120*pr* and the IVC signal 162 may refer to combining the two optical signals so that their electric fields are summed together. For example, the probe beam and IVC signal may be combined (e.g., with an optical combiner 130) so that the two signals are spatially overlapped and co-propagate together in the same direction and along approximately the same optical path. Additionally, the probe beam and the IVC signal may be combined so that at least a portion of their polarizations have the same orientation to allow at least a portion of their electric fields to be summed together. Once the probe beam 120*pr* and IVC signal 162 are optically combined to produce a combined IVC-probe signal 145, the probe beam and the IVC signal may be coherently mixed at a detector 220. The detector 220 may produce a photocurrent signal i corresponding to the coherent mixing of the probe beam 120*pr* and the IVC signal 162. The photocurrent signal i produced by the detector 220 in response to the coherent mixing of the IVC signal 162 and the probe beam 120*pr* may include one or more electronic frequency components, where each electronic frequency component corresponds to a frequency difference between the IVC signal and the probe beam. Accordingly, the frequency offset $\Delta f$ between the IVC signal 162 and the probe beam 120*pr* in FIG. 31 results in an amplitude-modulated photocurrent signal i (and a corresponding amplitude-modulated voltage signal 234) with a frequency of $\Delta f$, as illustrated in FIGS. 32-33.

The photocurrent signal i produced by a detector 220 in response to coherent mixing of an IVC signal 162 and a probe beam 120*pr* may be proportional to the square of the summed electric fields of the IVC signal and the probe beam. The photocurrent signal i may be expressed as $i(t)=k|\varepsilon_{IVC}(t)+\varepsilon_{pr}(t)|^2$, where k is a constant (e.g., k may account for the responsivity of the detector 220 as well as other constant parameters or conversion factors). In this expression for i(t), $\varepsilon_{IVC}(t)$ is the electric field of the IVC signal 162, and $\varepsilon_{pr}(t)$ is the electric field of the probe beam 120*pr*. The electric field of the IVC signal 162 may be expressed as $\varepsilon_{IVC}\cos[2\pi\nu_4 t]$, where $E_{IVC}$ is the amplitude of the electric field of the IVC signal. The electric field of the probe beam 120*pr* may be expressed as $E_{pr}\cos[2\pi\nu_3 t]$, where $E_{pr}$ is the amplitude of the electric field of the probe beam.

The photocurrent signal i that results from coherent mixing of an IVC signal 162 and a probe beam 120*pr* may include a coherent-mixing term that is proportional to a product of $E_{IVC}$ and $E_{pr}$. The above expression for the photocurrent signal i may be expanded and written as $$i(t) = E_{IVC}^2 + E_{pr}^2 + 2E_{IVC}E_{pr}\cos[2\pi(\nu_4 - \nu_3)t],$$

where, for clarity and as discussed above, the constant k is not included. In this expanded expression for the photocurrent signal i(t), the first term $$E_{IVC}^2$$

corresponds to the optical power ($P_{IVC}$) of the IVC signal 162, and the second term Er corresponds to the optical power (Por) of the probe beam 120*pr*. The third term in the above expression is $2E_{IVC}E_{pr}\cos[2\pi(\nu_4-\nu_3)t]$ and may be referred to as a coherent-mixing term that represents coherent mixing between the electric fields of the IVC signal 162 and the probe beam 120*pr*. The coherent-mixing term is proportional to $E_{IVC}\times E_{pr}$, which is the product of the electric-field amplitudes of the IVC signal 162 and the probe beam 120*pr*. Additionally, the coherent-mixing term includes a cosine function that varies in time based on the IVC-probe frequency offset $\Delta f$, where $\Delta f=|\nu_4-\nu_3|$. The coherent-mixing term may also be expressed as $2E_{IVC}E_{pr}\cos[2\pi(\Delta f)t]$ or as $2\sqrt{P_{IVC}}\sqrt{P_{pr}}\cos[2\pi(\Delta f)t]$, where $P_{IVC}$ is the optical power of the IVC signal 162 and Ppr is the optical power of the probe beam 120*pr*.

In the time-domain photocurrent and voltage-signal plots in FIG. 32, the coherent-mixing term corresponds to the sinusoidal amplitude modulation of the signals at frequency $\Delta f$. In the frequency-domain plots in FIG. 33, the coherent-mixing term corresponds to the peak at frequency $\Delta f$ in the photocurrent and voltage signals. The voltage signal 234 may be approximately proportional to the photocurrent signal i, and both the voltage and photocurrent signals may be proportional to $P_{IVC}+P_{pr}+2\sqrt{P_{IVC}}\sqrt{P_{pr}}\cos[2\pi(\Delta f)t]$. Over the time duration of a measurement, the optical powers of the IVC signal 162 and the probe beam 120*pr* in FIG. 32 may be substantially constant, and so the contribution of $P_{IVC}+P_{pr}$ in the above expression may correspond to a DC offset with little or no time variation. The detector 220 in FIG. 33 may be AC-coupled to the electronic amplifier 232, or the electronic amplifier may include a high-pass or band-pass filter that removes or attenuates the DC or low-frequency components. This results in a voltage signal 234 with little or no DC offset (as illustrated in FIG. 32), where the voltage signal corresponds to the coherent-mixing term $2\sqrt{P_{IVC}}\sqrt{P_{pr}}\cos[2\pi(\Delta f)t]$, and measurement of the IVC signal 162 may include determining one or more characteristics of the voltage signal.

The detection electronics 230 in FIG. 33 includes a digitizer 236 that receives the voltage signal 234 and produces an electronic output signal 240 that corresponds to the voltage signal 234 (which in turn corresponds to the photocurrent signal i). The electronic output signal 240 may include a value that corresponds to the size of the amplitude modulation of the photocurrent signal i, where the size of the photocurrent-signal amplitude modulation is determined based on the voltage signal 234. For example, the electronic output signal 240 may include a value corresponding to the peak voltage amplitude $V_p$ of the voltage signal 234 at the frequency $\Delta f$, where the value of $V_p$ may be proportional to the peak current amplitude. The digitizer 236 may include a lock-in amplifier, a boxcar averager, or a sample-and-hold circuit, and the output signal 240 may include a digital value that corresponds to the size of the amplitude modulation of the voltage signal 234 at the frequency $\Delta f$.

In some embodiments, the digitizer 236 may include an analog-to-digital converter (ADC) that produces a time-domain digital representation of the voltage signal 234. For example, a time-domain digital representation of a voltage signal 234 may be a digitized version of the time-domain plot of the voltage signal 234 in FIG. 32. The output signal 240 may include the digital representation of the voltage signal 234 produced by the ADC, and the output signal may be sent to a processor. Based on the time-domain digital representation of the voltage signal 234, the processor may determine a value that corresponds to the size of the photocurrent-signal amplitude modulation. For example, the processor may determine the amplitude $V_p$ of the amplitude-modulated portion of the voltage signal 234, from which the amplitude $I_p$ of the corresponding photocurrent signal i may be determined. As another example, the processor may determine a frequency-domain representation of the voltage signal 234 based on the time-domain representation of the voltage signal 234 received from the digitizer 236. The frequency-domain representation of the voltage signal 234 may be a digital signal that is similar to the voltage-signal frequency-domain plot in FIG. 33. Based on the frequency-domain representation of the voltage signal 234, the processor may determine one or more characteristics of the voltage signal. For example, the voltage-signal characteristics may include a peak value (e.g., the peak voltage amplitude $V_p$), an average value associated with the voltage-signal peak at frequency $\Delta f$, an area of the voltage-signal peak (e.g., an integral or sum that corresponds to the area under the peak curve), the linewidth $w_v$ of the voltage-signal peak, or the center frequency of the voltage-signal peak (which may equal $\Delta f$).

A processor may use any suitable algorithm to determine a frequency-domain representation of a voltage signal 234 based on a time-domain digital representation of the voltage signal. For example, a digital time-domain voltage signal may be analyzed using a frequency-domain analysis technique such as a discrete Fourier transform (DFT), fast Fourier transform (FFT), or Goertzel algorithm to determine frequency-domain characteristics. A DFT or FFT may be applied to the digital time-domain voltage signal to produce a frequency-domain representation of the voltage signal (e.g., similar to the voltage-signal plot in FIG. 33). Alternatively, a Goertzel algorithm may be applied to the digital time-domain voltage signal to determine frequency-domain characteristics of the voltage signal at one or more particular frequencies. For example, a Goertzel algorithm may be applied to a digital time-domain voltage signal to determine the amplitude of the voltage signal at the frequency $\Delta f$.

In a Raman spectroscopy system with coherent detection, the IVC-signal frequency $\nu_4$ and the probe frequency $\nu_3$ are offset by a frequency offset $\Delta f$ (where $\Delta f=|\nu_4-\nu_3|$). The probe frequency may be selected so that the IVC-probe frequency offset $\Delta f$ has a particular value (e.g., $\Delta f$ may be a particular frequency between approximately 10 MHz and approximately 2 GHZ). A Raman spectroscopy system 100 may include a processor that maintains the frequency offset $\Delta f$ at the particular target frequency. Maintaining the IVC-probe frequency offset $\Delta f$ at a particular fixed value may allow the optical receiver 200 or the processor to accurately determine one or more characteristics of the photocurrent signal i at one or more particular frequencies of interest. For example, the optical receiver 200 or the processor may be configured to determine one or more characteristics of a photocurrent signal i at one or more particular frequencies of interest that are related to the frequency offset $\Delta f$. If the IVC-probe frequency offset $\Delta f$ drifts over time, then the particular frequencies of interest of the photocurrent signal i may also change, which may prevent the photocurrent-signal characteristics from being accurately determined. To maintain the IVC-probe frequency offset $\Delta f$ at a particular target value, the processor may periodically measure the actual IVC-probe frequency offset. For example, the processor may measure the frequency of the photocurrent-signal amplitude modulation (e.g., based on the location of the peak of the voltage signal 234 as illustrated in FIG. 33). If the measured IVC-probe frequency offset differs from the target frequency offset, then the processor may send an instruction to adjust the probe frequency so that the IVC-probe frequency offset is approximately equal to the particular target frequency. For example, if the target IVC-probe frequency offset $\Delta f$ is 500 MHz, and the actual IVC-probe frequency offset in FIG. 31 is measured to be 480 MHz, then the processor may instruct the probe light source 111*pr* to decrease the probe frequency $\nu_3$ by 20 MHz.

Figure 34:
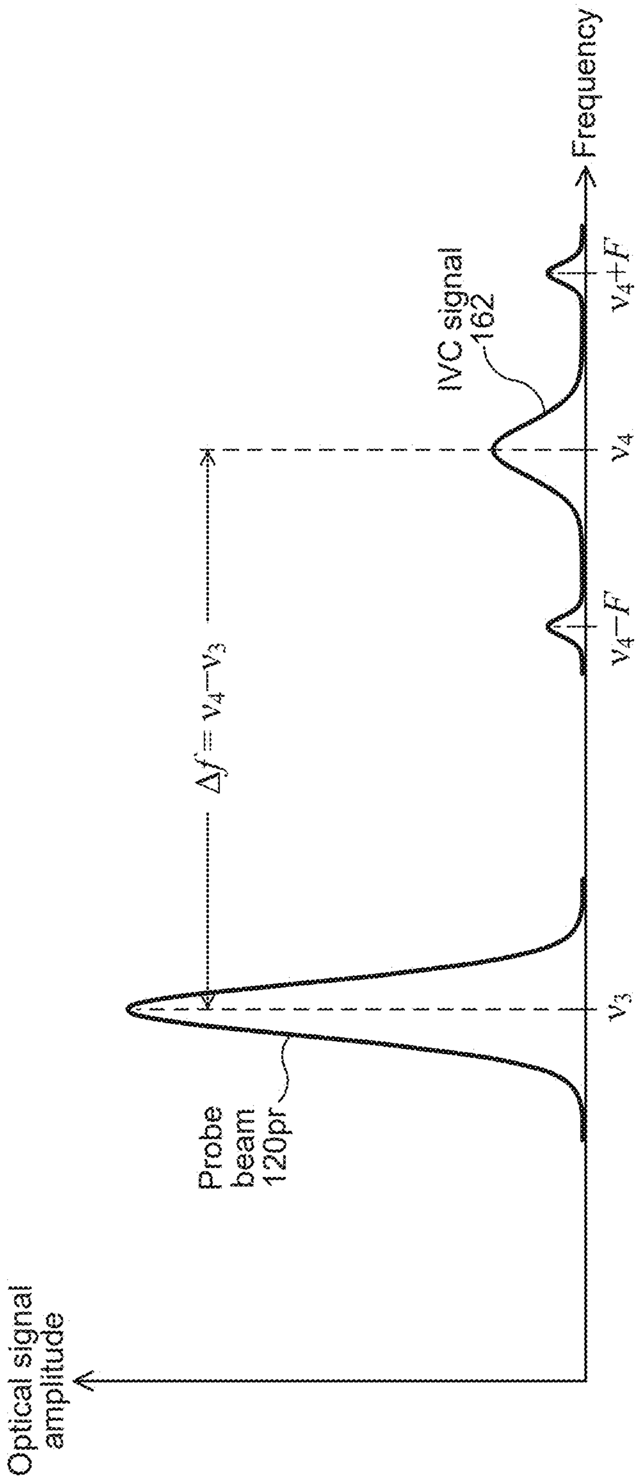
FIGS. 34-35 illustrate an example probe beam of light and an IVC signal produced with a modulated pump or Stokes beam of light.
Figure 35:
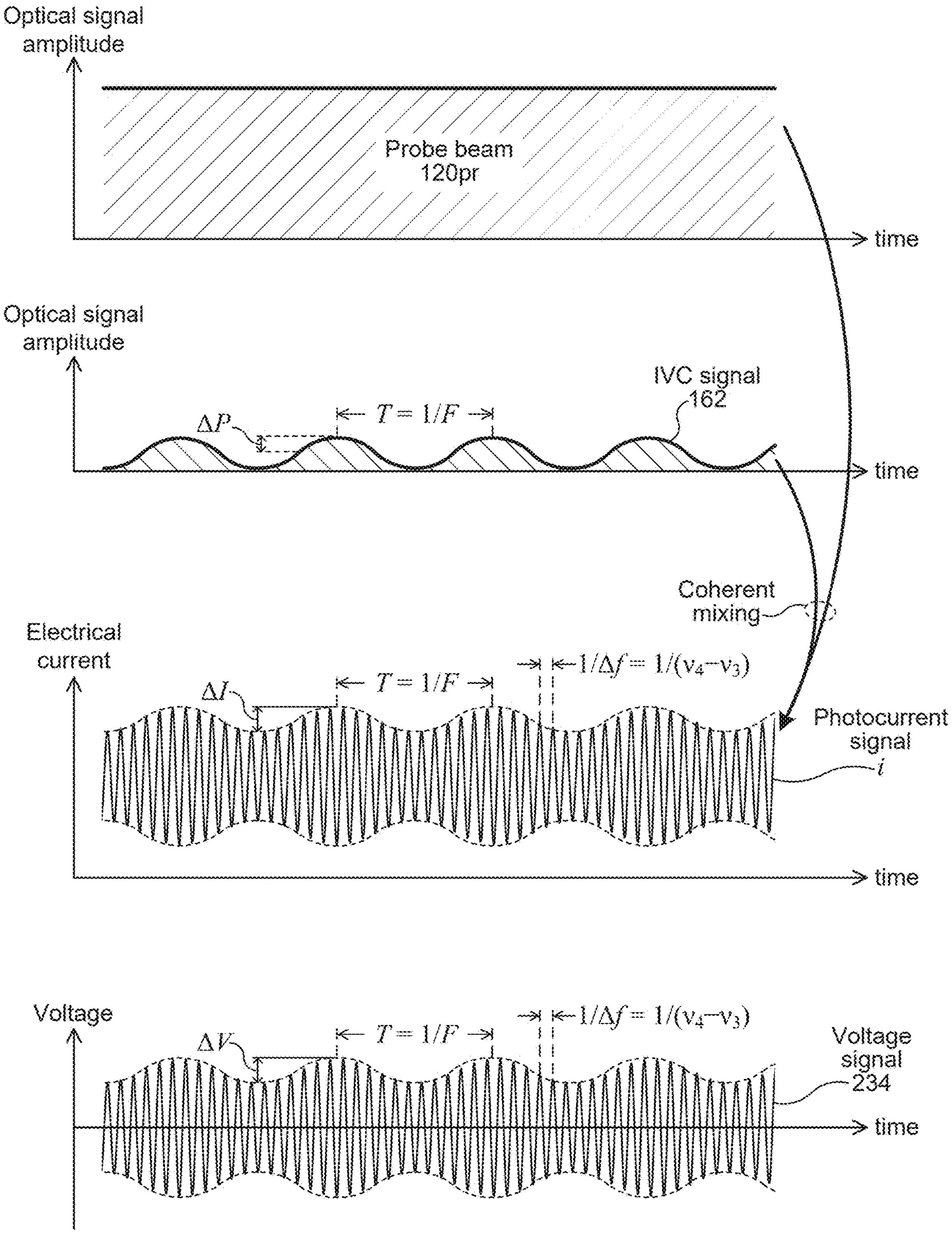

FIGS. 34-35 illustrate an example probe beam of light 120*pr* and an IVC signal 162 produced with a modulated pump or Stokes beam of light. The probe beam 120*pr* and the IVC signal 162 may be produced in any of the Raman spectroscopy systems 100 of FIGS. 19, 23, and 27. The IVC signal 162 may be produced by intramolecular vibrational coupling resulting from the interaction of the three or more pump and Stokes beams (with two pump-Stokes frequency offsets $\Omega_1$ and $\Omega_2$) with a particular molecule in a sample 150. One or more of the three or more beams of light may include an amplitude modulation, which results in the IVC signal 162 having a corresponding amplitude modulation. FIG. 34 includes a frequency-domain plot of the probe beam 120*pr* and the IVC signal 162, and FIG. 35 includes time-domain plots of the same signals. Additionally, FIG. 35 includes (i) a time-domain plot of the photocurrent signal i produced by coherent mixing of the probe beam 120*pr* and the IVC signal 162 at a detector 220 and (ii) a time-domain plot of a corresponding voltage signal 234.

The probe beam 120*pr* in FIG. 35 has a substantially constant optical power, and the IVC signal 162 includes an amplitude modulation with a modulation frequency F. The amplitude modulation of the IVC signal 162 results from an amplitude modulation of one of the three or more beams of light that interact with a sample 150 to produce the IVC signal. For example, the pump beam 120*pu*, Stokes beam 120S-a, or Stokes beam 120S-b in FIG. 19 may include a sinusoidal amplitude modulation at the modulation frequency F, and the resulting IVC signal 162 may include a corresponding sinusoidal amplitude modulation at the frequency F. The pump light source 111*pu* or the Stokes light source 111S may be similar to any of the light sources in FIG. 8 and may include a modulator that applies a modulation to the pump or Stokes light source or to one of the pump or Stokes beams of light. An amplitude-modulated pump or Stokes beam may include pulses of light (e.g., similar to output beam 120-M1 in FIG. 8) or a waveform modulation (e.g., similar to output beam 120-M2 in FIG. 8), such as a sinusoidal, square-wave, triangle-wave, or saw-tooth-wave amplitude modulation. The amplitude-modulated pump or Stokes beam that results in the IVC signal 162 in FIGS. 34-35 may include a sinusoidal amplitude modulation with a modulation frequency F. For example, the pump beam 120*pu* in FIG. 19 may include a sinusoidal amplitude modulation at the modulation frequency F, which results in the IVC signal 162 having a corresponding sinusoidal amplitude modulation at the same frequency F.

The frequency-domain plot in FIG. 34 indicates that the IVC signal 162 includes a central peak at the IVC-signal frequency $\nu_4$. Additionally, because of the amplitude modulation imparted to the IVC signal 162 by the amplitude-modulated pump or Stokes beam, the IVC signal 162 also includes an upper optical sideband at frequency $\nu_4+\Delta f$ and a lower optical sideband at frequency $\nu_4-\Delta f$. The sinusoidal amplitude modulation of the pump or Stokes beam results in the IVC signal 162 in FIG. 34 having one upper optical sideband and one lower optical sideband. Other types of amplitude modulation may produce an IVC signal 162 having multiple upper optical sidebands and multiple lower optical sidebands. For example, a pump or Stokes beam that includes pulses of light or a square-wave amplitude modulation may result in an IVC signal 162 with two or more upper optical sidebands and two or more lower optical sidebands.

The IVC signal 162 and the probe beam 120*pr* in FIGS. 34-35 are coherently mixed at a detector 220, and the detector produces a photocurrent signal i, as illustrated in FIG. 35. The photocurrent signal i includes a higher-frequency amplitude modulation at the IVC-probe frequency offset Δf and a lower-frequency amplitude modulation at the modulation frequency F, which results from the amplitude modulation of the pump or Stokes beam. The IVC-probe frequency offset Δf (where $\Delta f=|\nu_4-\nu_3|$) may be between 10 MHz and 2 GHz, and the modulation frequency F may be less than Δf and between 10 KHz and 200 MHz.

The IVC signal 162 in FIG. 35 has a modulation with an amplitude of ΔP at frequency F, where ΔP corresponds to the amplitude of the optical-power variation of the IVC signal. The photocurrent signal i has a corresponding modulation with an amplitude of ΔI at frequency F. The amplitude ΔP of the IVC signal 162 may depend on the two pump-Stokes frequency offsets $\Omega_1$ and $\Omega_2$ and on the composition of the sample 150. For example, if the pump-Stokes frequency offsets $\Omega_1$ and $\Omega_2$ correspond to resonant vibrational frequencies of a particular molecule that is part of the sample 150, then the IVC signal 162 and the corresponding IVC-signal amplitude ΔP may be relatively large. Alternatively, if the pump-Stokes frequency offsets $\Omega_1$ and $\Omega_2$ do not match resonant vibrational frequencies of a molecule in the sample 150 or if the sample contains little or none of that molecule, then the IVC-signal amplitude ΔP may be relatively small. The amplitude ΔI of the photocurrent signal at frequency F may scale with or may be proportional to the IVC-signal amplitude ΔP. By measuring the amplitude modulation ΔV of the corresponding voltage signal 234 (which may be proportional to the amplitude modulation ΔI of the photocurrent signal), the amplitude ΔP of the IVC signal 162 may be determined. Additionally, based on the amplitude ΔP of the IVC signal 162, the amount or the concentration of the molecule of interest in the sample 150 may be determined.

Figure 36:
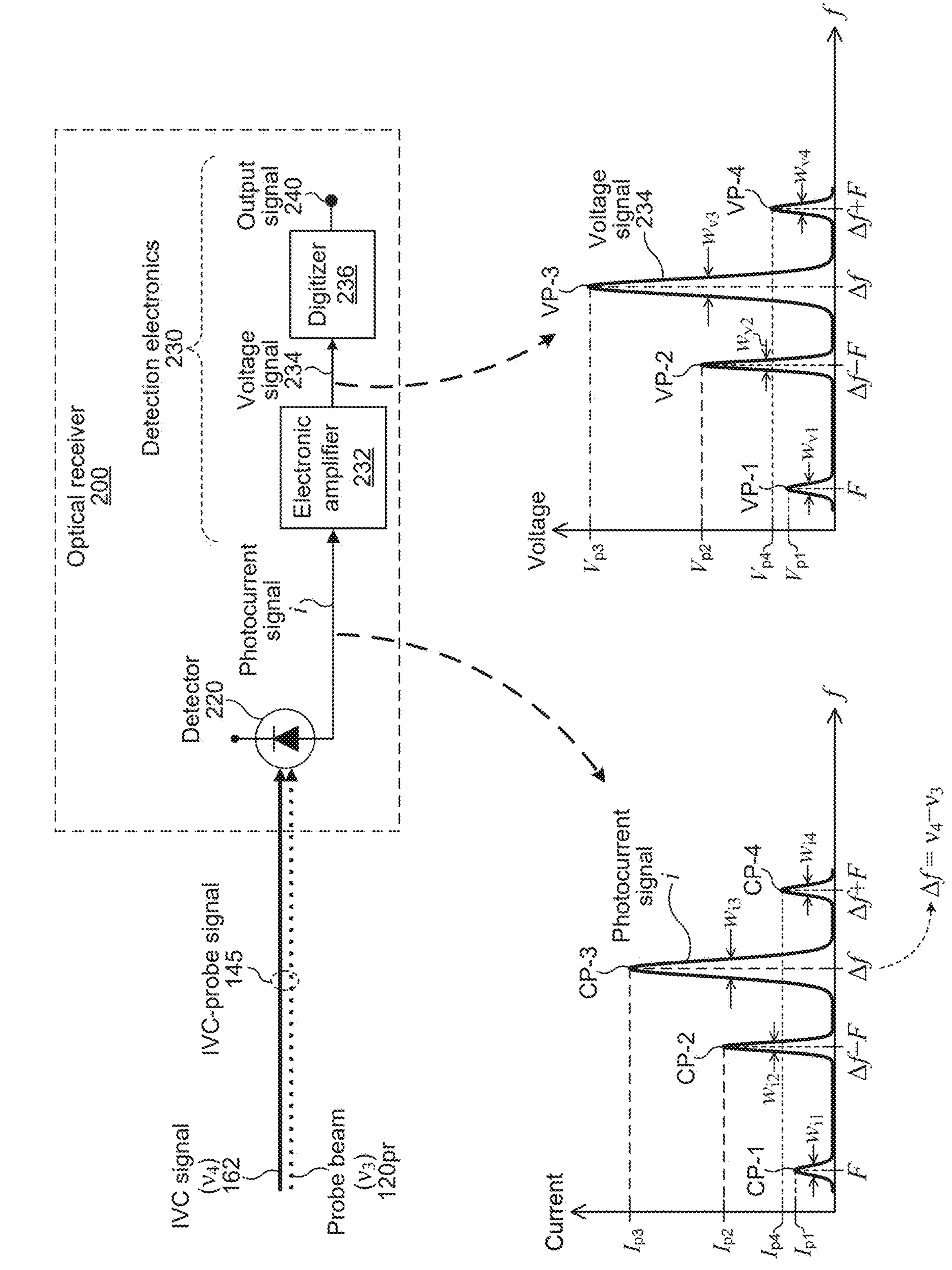
FIG. 36 illustrates an example optical receiver configured to measure the IVC signal of FIGS. 34-35.

FIG. 36 illustrates an example optical receiver 200 configured to measure the IVC signal of FIGS. 34-35. The optical receiver 200 in FIG. 36 corresponds to the optical receiver in each of FIGS. 19, 23, 27, and 33. In FIG. 36, an IVC-probe signal 145, which includes an IVC signal 162 and a probe beam 120*pr*, is directed to an optical detector 220. The IVC signal 162 and the probe beam 120*pr* are coherently mixed at the detector 220, and the detector produces a photocurrent signal i in response to the IVC signal and the probe beam. The detection electronics 230 receives the photocurrent signal i and produces an electronic output signal 240 that corresponds to the photocurrent signal. The detection electronics 230 includes an electronic amplifier 232 that amplifies the photocurrent signal i to produce a corresponding voltage signal 234. The plots at the bottom of FIG. 35 are time-domain plots of the photocurrent signal i and the corresponding voltage signal 234, and the plots in FIG. 36 are frequency-domain plots of the two signals. The voltage signal 234 is similar to the photocurrent signal i. For example, the time-domain plots of the photocurrent signal i and voltage signal 234 in FIG. 35 both include a higher-frequency amplitude modulation at the IVC-probe frequency offset Δf and a lower-frequency amplitude modulation at the modulation frequency F.

The frequency-domain plots of the photocurrent signal i and voltage signal 234 in FIG. 36 are similar and both include multiple peaks. The photocurrent signal i includes the following: a central current peak (CP-3) at the IVC-probe frequency offset Δf; a lower sideband current peak (CP-2) at frequency Δf−F; and an upper sideband current peak (CP-4) at frequency Δf+F. The central current peak CP-3 at frequency Δf indicates that a frequency of at least a portion of the photocurrent signal i is approximately equal to $|\nu_4-\nu_3|$. Additionally, the photocurrent signal includes a lower-frequency current peak (CP-1) at the modulation frequency F. For example, if the IVC-probe frequency offset Δf is 200 MHz and the modulation frequency F of one of the pump or Stokes beams is 10 MHz, then the central current peak CP-3 is located at 200 MHz, and the lower and upper sidebands are located at 190 MHz and 210 MHz, respectively. Additionally, the lower-frequency current peak CP-1 is located at 10 MHz. The current peak CP-1 has an electronic linewidth of $w_{i1}$ and an amplitude of $I_{p1}$; current peak CP-2 has an electronic linewidth of $w_{i2}$ and an amplitude of $I_{p2}$; current peak CP-3 has an electronic linewidth of $w_{i3}$ and an amplitude of $I_{p3}$; and current peak CP-4 has an electronic linewidth of $w_{i4}$ and an amplitude of $I_{p4}$. The upper and lower sidebands of the photocurrent signal i may be symmetric so that the amplitudes $I_{p2}$ and $I_{p4}$ are approximately equal.

The frequency-domain plot of the voltage signal 234 is similar to the photocurrent signal i and includes multiple voltage peaks, where each voltage peak corresponds to a current peak of the photocurrent signal. For example, voltage peak VP-1 may result from the electronic amplifier 232 amplifying frequencies associated with current peak CP-1. The voltage signal 234 includes the following: a central voltage peak (VP-3) at the IVC-probe frequency offset Δf; a lower sideband voltage peak (VP-2) at frequency Δf−F; and an upper sideband voltage peak (VP-4) at frequency Δf+F. Additionally, the voltage signal includes a lower-frequency voltage peak (VP-1) at the pump-beam modulation frequency F. For example, if the IVC-probe frequency offset Δf is 200 MHz and the modulation frequency F of one of the pump or Stokes beams is 10 MHz, then the central voltage peak VP-3 is located at 200 MHz, and the lower and upper sidebands are located at 190 MHz and 210 MHz, respectively. Additionally, the lower-frequency voltage peak VP-1 is located at 10 MHz. The voltage peak VP-1 has an electronic linewidth of $w_{v1}$ and an amplitude of $V_{p1}$; voltage peak VP-2 has an electronic linewidth of $w_{v2}$ and an amplitude of $V_{p2}$; voltage peak VP-3 has an electronic linewidth of $w_{w3}$ and an amplitude of $V_{p3}$; and voltage peak VP-4 has an electronic linewidth of $w_{v4}$ and an amplitude of $V_{p4}$. The upper and lower sidebands of the voltage signal may be symmetric so that the amplitudes $V_{p2}$ and $V_{p4}$ are approximately equal.

The photocurrent signal i produced by the detector 220 in response to the coherent mixing of the IVC signal 162 and the probe beam 120*pr* may include one or more electronic frequency components, where each electronic frequency component corresponds to a frequency difference between (i) frequency components of the IVC signal 162 or (ii) frequency components of the IVC signal and the probe beam 120*pr*. For example, current peak CP-1 at frequency F may result from (i) coherent mixing between the lower optical sideband of the IVC signal 162 at frequency $\nu_4$−F and the central IVC signal peak at frequency $\nu_4$ and (ii) coherent mixing between the upper optical sideband of the IVC signal 162 at frequency $\nu_4$+F and the central IVC signal peak. As another example, current peak CP-3 at frequency Δf may result from coherent mixing between the probe beam at frequency $\nu_3$ and the central IVC signal peak at frequency $\nu_4$. As another example, current peak CP-2 at frequency Δf−F may result from coherent mixing between the probe beam at frequency $\nu_3$ and the lower optical sideband of the IVC signal 162 at frequency $\nu_4$−F, and current peak CP-4 at frequency Δf+F may result from coherent mixing between the probe beam at frequency $\nu_3$ and the upper optical sideband of the IVC signal 162 at frequency $\nu_4$+F.

As illustrated in FIG. 36, the photocurrent signal i produced by coherent mixing of the IVC signal 162 and the probe beam 120*pr* may include multiple frequency components located from the modulation frequency F to the upper-sideband frequency Δf+F. To allow measurement of the frequency components of the photocurrent signal i, the optical receiver 200 in FIG. 36 may have an electronic bandwidth with (i) a lower cutoff frequency that is less than the modulation frequency F and (ii) an upper cutoff frequency that is greater than Δf+F. In a system where the optical receiver 200 only measures the lower-frequency voltage peak VP-1, the optical receiver may have an electronic bandwidth that includes the modulation frequency F (e.g., the electronic bandwidth may extend from 0.8×F to 1.2×F). In a system where the optical receiver 200 measures the central voltage peak VP-3 and its sidebands, the optical receiver may have an electronic bandwidth with (i) a lower cutoff frequency that is less than Δf−F and (ii) an upper cutoff frequency that is greater than Δf+F. In a system in which a non-sinusoidal amplitude modulation is applied to one of the pump or Stokes beams (e.g., the pump or Stokes beam includes pulses of light or a square-wave modulation), then the central voltage peak VP-3 at frequency Δf may include multiple upper and lower sidebands. In this case, the optical receiver 200 may have an electronic bandwidth with (i) a lower cutoff frequency that is less than Δf−nF and (ii) an upper cutoff frequency that is greater than Δf+nF, where n is an integer greater than or equal to 2 corresponding to the number of upper and lower sidebands that are measured. Alternatively, if the measurement also includes the lower-frequency voltage peak VP-1 at frequency F, then the optical receiver may have an electronic bandwidth with (i) a lower cutoff frequency that is less than F and (ii) an upper cutoff frequency that is greater than Δf+nF.

The detection electronics 230 in FIG. 36 includes a digitizer 236 that receives a voltage signal 234 and produces an electronic output signal 240 that corresponds to the voltage signal 234 (which in turn corresponds to the photocurrent signal i). The photocurrent signal i in FIG. 35 includes an amplitude modulation at the modulation frequency F. The electronic output signal 240 may include a value that corresponds to the size of the amplitude modulation of the photocurrent signal i at the modulation frequency F, where the size of the photocurrent-signal amplitude modulation is determined based on the corresponding voltage signal 234. For example, the electronic output signal 240 in FIG. 36 may include a value corresponding to (i) the amplitude $V_{p1}$ of the voltage-signal peak VP-1 at the frequency F or (ii) the amplitude ΔV of the modulation at the frequency F of the voltage signal 234 in FIG. 35. Additionally, the value corresponding to the amplitude $V_{p1}$ or ΔV may be proportional to (i) the amplitude $I_{p1}$ of the photocurrent-signal peak CP-1 in FIG. 36 or (ii) the amplitude ΔI of the modulation at the frequency F of the photocurrent signal in FIG. 35. Additionally, the amplitude $V_{p1}$ or ΔV may be proportional to the amplitude ΔP of the IVC signal 162 in FIG. 35. The digitizer 236 may include a lock-in amplifier or a boxcar averager that receives the voltage signal 234 and determines, based on the voltage signal, a value corresponding to the size of the amplitude modulation of the photocurrent signal i at the modulation frequency F. For example, the voltage signal 234 may be sent to a lock-in amplifier that determines the amplitude of the voltage signal at the modulation frequency F, where the determined voltage-signal amplitude corresponds to the size of the photocurrent-signal amplitude at the modulation frequency F.

In some embodiments, a digitizer 236 may include an analog-to-digital converter (ADC) that receives an analog voltage signal 234 and produces a time-domain digital representation of the voltage signal. For example, a time-domain digital representation of a voltage signal 234 may be a digitized version of the time-domain plot of the voltage signal 234 in FIG. 35. The time-domain digital representation of a voltage signal 234 may be a digitally sampled version of the voltage signal that is sampled by the ADC at a sample rate greater than Δf. The output signal 240 may include the time-domain digital representation of the voltage signal 234 produced by the ADC, and the output signal may be sent to a processor. Based on the time-domain digital representation of the voltage signal 234, the processor may determine a value that corresponds to the size of the amplitude modulation of the photocurrent signal i at the modulation frequency F. For example, the processor may determine the amplitude ΔV of the voltage signal at the modulation frequency F, where the determined voltage-signal amplitude corresponds to the size of the photocurrent-signal amplitude at the modulation frequency F.

In some embodiments, a processor may determine a frequency-domain representation of a voltage signal 234 based on a time-domain digital representation of the voltage signal 234 received from the digitizer 236. The processor may use any suitable algorithm to determine a frequency-domain representation of a voltage signal 234, such as a DFT, FFT, or Goertzel algorithm. For example, a Goertzel algorithm may be applied to the digital time-domain voltage signal to determine frequency-domain characteristics of the voltage signal at one or more particular frequencies (e.g., at frequency F, Δf−F, Δf, or Δf+F). As another example, the processor may use a DFT or FFT to produce a frequency-domain representation of the voltage signal 234 similar to the voltage-signal frequency-domain plot in FIG. 36. A frequency-domain representation of the voltage signal 234 may include one or more of the following: a central voltage peak (VP-3) at the IVC-probe frequency offset Δf; a lower sideband voltage peak (VP-2) at frequency Δf−F; an upper sideband voltage peak (VP-4) at frequency Δf+F; and a lower-frequency voltage peak (VP-1) at the pump-beam modulation frequency F. Based on the frequency-domain representation of the voltage signal 234, the processor may determine one or more characteristics of one or more peaks (VP-1, VP-2, VP-3, VP-4) of the voltage signal. For example, the voltage-signal characteristics may include a peak value (e.g., a peak voltage amplitude $V_{p1}$, $V_{p2}$, $V_{p3}$, or $V_{p4}$), an average value associated with a voltage-signal peak, an area of a voltage-signal peak (e.g., an integral or sum that corresponds to the area under the peak curve), a linewidth of a voltage-signal peak (e.g., $w_{v1}$, $w_{v2}$, $w_{v3}$, or $w_{v4}$), or a center frequency of a voltage-signal peak (which may be approximately equal to F, Δf−F, Δf, or Δf+F).

The central voltage peak VP-3 in FIG. 36 is located at the IVC-probe frequency offset Δf. To maintain the IVC-probe frequency offset Δf at a particular target value, a processor may periodically measure the actual Stokes-probe frequency offset. For example, the processor may periodically measure the frequency of the voltage peak VP-3. If the measured frequency of the voltage peak VP-3 differs from the target IVC-probe frequency offset, then the processor may send an instruction to adjust the probe frequency ($\nu_3$) so that the IVC-probe frequency offset $|\nu_4-\nu_3|$ is approximately equal to the target frequency offset. For example, if the target IVC-probe frequency offset $\Delta f$ in FIG. 34 is 500 MHz, and the frequency of the voltage peak VP-3 in FIG. 36 is measured to be 520 MHz, then the processor may instruct the probe light source 111*pr* to increase the probe frequency $\nu_3$ by 20 MHz.

In some embodiments, a Raman spectroscopy system 100 may include two or more modulators, and two or more of the pump and Stokes beams of light that produce an IVC signal 162 may include an amplitude modulation. For example, a system may include two modulators that each apply a modulation to one of the three or more pump and Stokes beams of light that produce the IVC signal 162. A first pump or Stokes beam of light may include an amplitude modulation at a first modulation frequency $F_1$, and a second pump or Stokes beam of light may include an amplitude modulation at a second modulation frequency $F_2$ different from the first modulation frequency. The resulting IVC signal 162 may have an amplitude modulation that includes both the first and second modulation frequencies $F_1$ and $F_2$. Measurement of the IVC signal 162 may include measuring the corresponding voltage signal 234 at one or more frequencies that are combinations of the two modulation frequencies. For example, the corresponding voltage signal 234 may be measured at a sum frequency $F_1+F_2$ or at a difference frequency $F_1-F_2$.

A Raman spectroscopy system 100 may measure an IVC signal 162 produced by a sample 150, and the system may produce a corresponding electronic output signal 240. Based on the output signal 240, the system may determine (i) whether a particular material is present in the sample 150 or (ii) an amount or a concentration of the particular material in the sample. For example, the amount or the concentration of a particular molecule in the sample 150 may correspond to the size of the IVC signal 162 produced by the sample. Additionally, the size (e.g., the optical power) of the IVC signal 162 may correspond to at least a portion of the photocurrent signal i that results from coherent mixing of the IVC signal and a probe beam 120*pr*. In FIGS. 32-33, the amplitude $V_p$ of the voltage signal 234 may correspond to the amplitude $I_p$ of the photocurrent signal i, which in turn may correspond to the size of the IVC signal 162. For example, the output signal 240 in FIG. 33 may include a value that corresponds to the voltage-signal amplitude $V_p$, from which the system may determine (i) whether the molecule of interest is present in the sample 150 or (ii) an amount or a concentration of the molecule. In FIGS. 35-36, the amplitude $V_{p1}$ or $\Delta V$ of the voltage signal 234 may correspond to the amplitude $I_{p1}$ or $\Delta I$ of the photocurrent signal i, which in turn may correspond to the size of the IVC signal 162. For example, the output signal 240 in FIG. 36 may include a value that corresponds to the voltage-signal amplitude $V_{p1}$ or $\Delta V$, from which the system may determine (i) whether the molecule of interest is present in the sample 150 or (ii) an amount or a concentration of the molecule. If the measurement of an IVC signal 162 indicates that the size of the IVC signal is above a particular threshold value, then the system may determine that the particular molecule of interest is present in the sample 150 or that the concentration of the particular molecule is above a particular threshold concentration. Additionally, based on the size of the IVC signal 162, the system may determine the amount or the concentration of the particular molecule in the sample 150. Alternatively, if a sample 150 produces little to no measurable IVC signal 162, then the system may determine, based on a corresponding output signal 240, that the sample contains little to none of the particular molecule or that the concentration of the particular molecule is below a particular threshold concentration.

A Raman spectroscopy system 100 may be configured to measure a time associated with the decay of an IVC signal 162. An IVC signal 162 may be produced by the interaction of three or more pump and Stokes beams of light with a sample 150, and when any of the three or more beams of light are switched off, the IVC signal 162 may decay over some period of time. One or more of the three or more pump and Stokes beams of light may be switched off, and the optical receiver 200 of a Raman spectroscopy system 100 may measure the size of the decaying IVC signal 162 over time. For example, the size of the decaying IVC signal 162 may be determined by measuring a size of a corresponding voltage signal 234 over time. Based on that measurement, the system may determine a time associated with the IVC-signal decay. For example, the IVC signal 162 may exhibit a substantially exponential decay having the form $e^{-t/\tau}$, and the system may measure the time constant $\tau$ of the exponential decay. To switch off a pump or Stokes beam of light to initiate an IVC-signal decay measurement, the current supplied to a laser diode may be reduced or turned off, or an optical modulator or optical switch may be instructed to block the beam of light.

The decay time of an IVC signal 162 may be in the range of 1 picosecond (ps) to 100 ps. This relatively fast decay time may be difficult to determine by directly measuring the size of a decaying IVC signal, in which case an indirect measurement may be used. For example, an amplitude modulation may be applied to one of the pump or Stokes beams. The modulation rate or period of the amplitude modulation may be varied, and the IVC-signal decay time may be determined by measuring a time-average of the size of the IVC signal 162 as a function of the amplitude-modulation variation.

Figure 37:
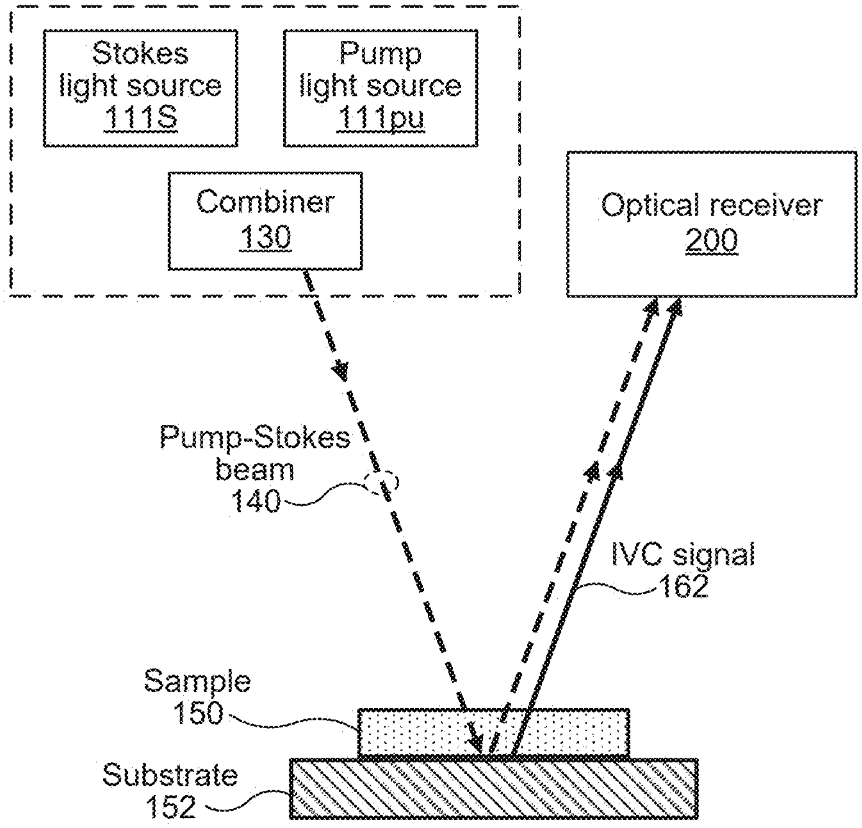
FIG. 37 illustrates an example Raman spectroscopy system that operates in a backscatter mode.

FIG. 37 illustrates an example Raman spectroscopy system 100 that operates in a backscatter mode. A Raman spectroscopy system 100 may operate in a transmission mode or in a backscatter mode. In a Raman spectroscopy system operating in a transmission mode, the pump and Stokes beams are directed to propagate through the sample 150 (e.g., as illustrated in FIGS. 15, 19, 23, and 27). Additionally, in a transmission-mode Raman spectroscopy system in which an IVC signal 162 is measured, the IVC signal may be collected after the pump and Stokes beams have propagated through the sample 150.

In a Raman spectroscopy system 100 that operates in a backscatter mode, the three or more pump and Stokes beams are backscattered or reflected from the sample 150 or from a substrate 152 on which the sample is disposed. In FIG. 37, the combined pump-Stokes beam 140 (which includes three or more pump and Stokes beams of light) is directed to the sample 150, which is disposed on a substrate 152. The three or more pump and Stokes beams interact with a particular material in the sample 150 to produce an IVC signal 162. The pump and Stokes beams may be backscattered or reflected from the sample 150 or from the substrate 152. Additionally, the IVC signal 162 produced at the sample 150 may be backscattered or reflected from the sample or from the substrate 152. For example, the substrate 152 may include a reflective material that reflects the pump and Stokes beams and the IVC signal 162. Additionally or alternatively, the substrate 152 may include a scattering material that scatters the pump and Stokes beams and the IVC signal 162. After the pump and Stokes beams interact with the sample 150, the backscattered or reflected pump and Stokes beams and the IVC signal 162 are directed to the optical receiver 200 where the IVC signal is measured. The system may include an optical filter (not illustrated in FIG. 37) that blocks one or more of the backscattered or reflected pump and Stokes beams. The process for measuring an IVC signal 162 in a backscatter-mode Raman spectroscopy system may be similar to the measurement process in a transmission-mode Raman spectroscopy system (e.g., as illustrated in FIGS. 19, 23, and 27, and as described herein). For example, at the optical receiver 200 in FIG. 37, the IVC signal 162 may be coherently mixed with a probe beam 120*pr* to produce a photocurrent signal i. Additionally, detection electronics 230 may receive the photocurrent signal i and produce an electronic output signal 240 that corresponds to the photocurrent signal.

A backscatter mode may be used in a Raman spectroscopy system 100 that performs surface-enhanced Raman spectroscopy (SERS) in which a sample 150 is disposed on a specially prepared substrate 152. A SERS measurement may provide enhanced Raman scattering effects by positioning the sample 150 on or in a specially prepared metallic surface, and the enhanced Raman scattering effects may result in a larger IVC signal 162 than might otherwise be produced. For example, the substrate 152 for SERS may include metallic nanostructures (e.g., a roughened metallic surface or a lithographically patterned substrate) or a film-based substrate (e.g., with island films or rough metal films). A substrate 152 in a SERS-based Raman spectroscopy system 100 may backscatter or reflect at least a portion of the incident pump and Stokes beams as well as at least a portion of the IVC signal 162.

Figure 38:
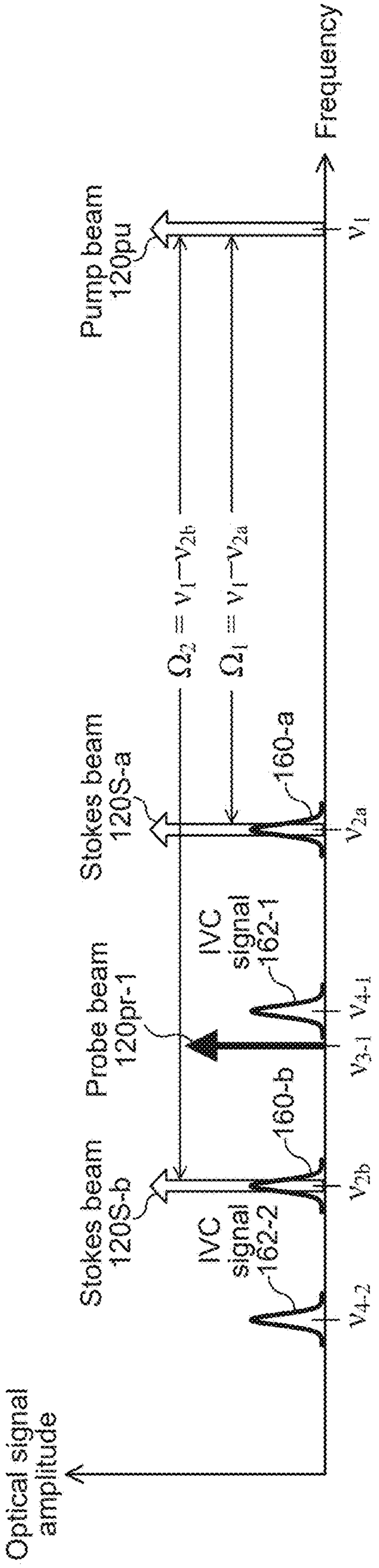
FIGS. 38-39 illustrate example optical signals produced in a measurement of two IVC signals.
Figure 39:
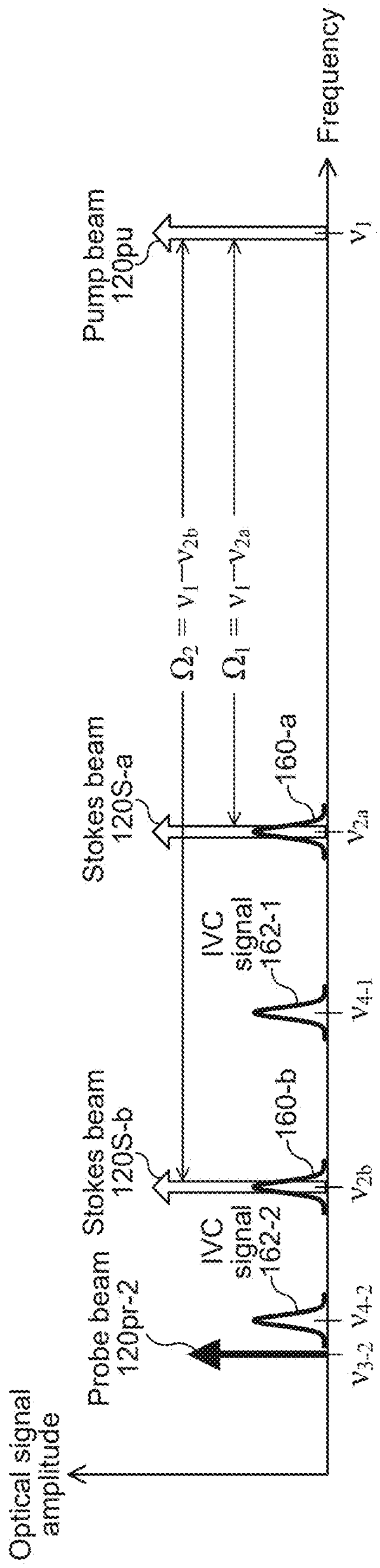

FIGS. 38-39 illustrate example optical signals produced in a measurement of two IVC signals 161-1 and 162-2. The interaction of three or more pump and Stokes beams of light with a particular material in a sample 150 may produce multiple IVC signals 162 at multiple different frequencies. The particular material may be a particular molecule of interest, and each IVC signal 162 may result from vibrational coupling between vibrational modes of the molecule. A Raman spectroscopy system 100 may be configured to measure two or more of the IVC signals 162. Measuring multiple IVC signals 162 at multiple different frequencies may allow for the determination of whether a particular molecule is present in a sample 150. Additionally, measuring multiple IVC signals 162 may provide increased certainty as to whether the particular molecule is present in a sample 150.

The measurements illustrated in FIGS. 38 and 39 may be performed by a Raman spectroscopy system 100 as illustrated in FIG. 19. In each of FIGS. 38 and 39, the pump and Stokes beams have a first pump-Stokes frequency offset $\Omega_1$ and a second pump-Stokes frequency offset $\Omega_2$, and the frequency offsets $\Omega_1$ and $\Omega_2$ may be approximately equal to frequencies of first and second vibrational modes of a particular molecule in the sample 150. The three pump and Stokes beams interact with these particular molecules in the sample via intramolecular vibrational coupling to produce a first IVC signal 162-1 at a first IVC frequency $\nu_{4\text{-}1}$ and a second IVC signal 162-2 at a second IVC frequency $\nu_{4\text{-}2}$. The two IVC signals 162-1 and 162-2 may be sent to an optical receiver 200 for measurement. FIG. 38 represents the optical signals for measurement of the first IVC signal 162-1. In FIG. 38, the probe beam 120*pr*-1 is at frequency $\nu_{3\text{-}1}$ and is coherently mixed with the first IVC signal 162-1 at frequency $\nu_{4\text{-}1}$ to produce a first photocurrent signal. The first photocurrent signal may be sent to detection electronics 230, which may produce a first output signal 240 corresponding to the photocurrent signal. The probe-beam frequency $\nu_{3\text{-}1}$ may be selected so that the first IVC-probe frequency offset $|\nu_{4\text{-}1}-\nu_{3\text{-}1}|$ is within the bandwidth of the optical receiver 200. Additionally, the probe-beam frequency $\nu_{3\text{-}1}$ may be selected so that the first IVC-probe frequency offset is between approximately 10 MHz and approximately 2 GHz.

FIG. 39 represents the optical signals for measurement of the second IVC signal 162-2. After the first IVC signal 162-1 is measured (as illustrated in FIG. 38), the probe light source 111*pr* may change the probe-beam frequency to produce probe beam 120*pr*-2 at frequency $\nu_{3\text{-}2}$, while the other beams (pump beam 120*pu*, Stokes beam 120S-a, and Stokes beam 120S-b) remain at their respective frequencies. In FIG. 39, the probe beam 120*pr*-2 at frequency $\nu_{3\text{-}2}$ is coherently mixed with the second IVC signal 162-2 at frequency $\nu_{4\text{-}2}$ to produce a second photocurrent signal. The second photocurrent signal may be sent to detection electronics 230, which may produce a second output signal 240 corresponding to the photocurrent signal. The probe-beam frequency $\nu_{3\text{-}2}$ may be selected so that the second IVC-probe frequency offset $|\nu_{4\text{-}2}-\nu_{3\text{-}2}|$ is within the bandwidth of the optical receiver 200. Additionally, the probe-beam frequency $\nu_{3\text{-}2}$ may be selected so that the second IVC-probe frequency offset is between approximately 10 MHz and approximately 2 GHZ. The two probe-beam frequencies $\nu_{3\text{-}1}$ and $\nu_{3\text{-}2}$ may be selected so that the two IVC-probe frequency offsets are approximately equal (e.g., $|\nu_{4\text{-}1}-\nu_{3\text{-}1}|$ and $|\nu_{4\text{-}2}-\nu_{3\text{-}2}|$ may be approximately equal).

Figure 40:
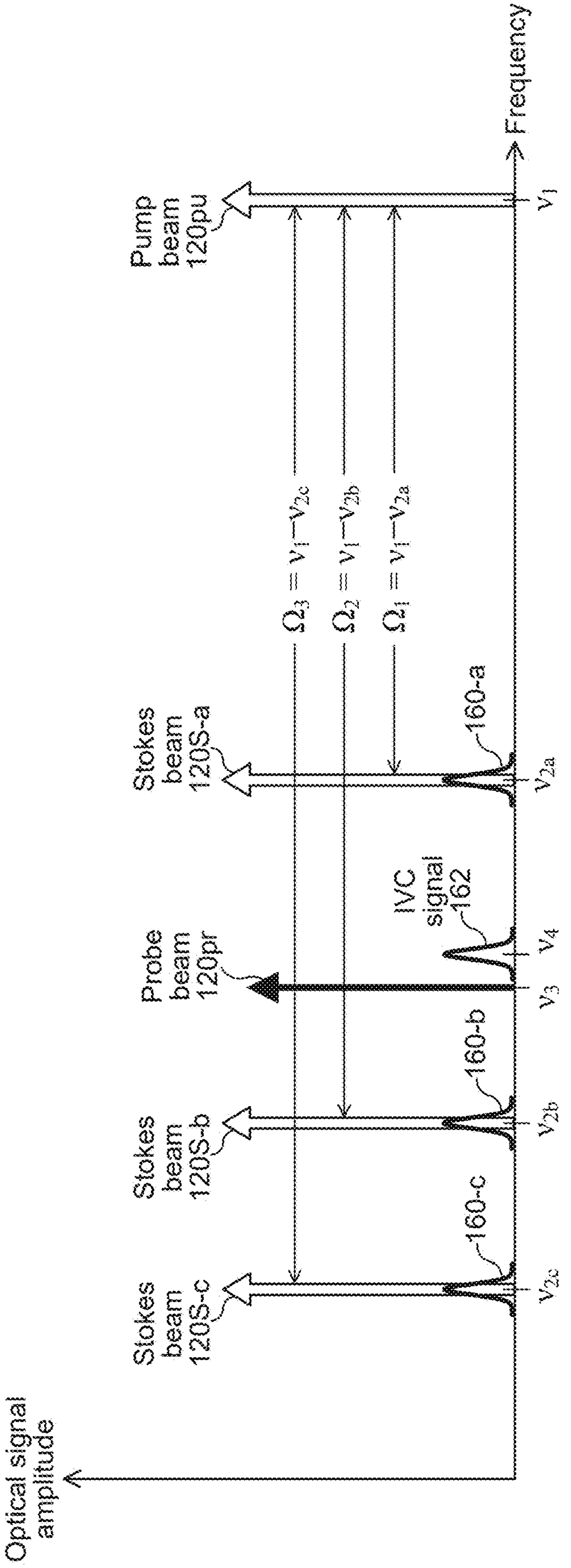
FIG. 40 illustrates example optical signals produced in a measurement of an IVC signal corresponding to three pump-Stokes frequency offsets.

FIG. 40 illustrates example optical signals produced in a measurement of an IVC signal 162 corresponding to three pump-Stokes frequency offsets. In some embodiments, a Raman spectroscopy system 100 may operate with four or more pump and Stokes beams of light having three pump-Stokes frequency offsets $\Omega_1$, $\Omega_2$, and $\Omega_3$. The four or more pump and Stokes beams of light may include: one pump beam and three Stokes beams (e.g., as illustrated in FIG. 40), two pump beams and two Stokes beams, three pump beams and one Stokes beam, or any other suitable combination of four or more pump and Stokes beams of light having three pump-Stokes frequency offsets.

In FIG. 40, a pump light source 111*pu* produces a pump beam 120*pu* at the pump frequency $\nu_1$. A Stokes light source 111S produces (i) a first Stokes beam 120S-a at a first Stokes frequency $\nu_{2a}$ (where the pump and first Stokes frequencies are offset by the first pump-Stokes frequency offset $\Omega_1=\nu_1-\nu_{2a}$), (ii) a second Stokes beam 120S-b at a second Stokes frequency $\nu_{2b}$ (where the pump and second Stokes frequencies are offset by the second pump-Stokes frequency offset $\Omega_2=\nu_1-\nu_{2b}$), and (iii) a third Stokes beam 120S-c at a third Stokes frequency $\nu_{2c}$ (where the pump and third Stokes frequencies are offset by the third pump-Stokes frequency offset $\Omega_3=\nu_1-\nu_{2c}$). The pump beam 120*pu* and the three Stokes beams 120S-a, 120S-b, and 120S-c may be directed to a sample 150, and the first pump-Stokes frequency offset $\Omega_1$ may be approximately equal to a frequency of a first vibrational mode of a particular molecule in the sample 150. This results in the first Raman signal 160-*a* being produced (e.g., by stimulated Raman scattering of the pump beam 120*pu* and the first Stokes beam 120S-a at the sample 150). Additionally, the second pump-Stokes frequency offset $\Omega_2$ may be approximately equal to a frequency of a second vibrational mode of the molecule (which results in the second Raman signal 160-*b* being produced), and the third pump-Stokes frequency offset $\Omega_3$ may be approximately equal to a frequency of a third vibrational mode of the molecule (which results in the third Raman signal 160-*c* being produced). In addition to the three Raman signals, an IVC signal 162 is produced, where the IVC signal (which may be referred to as a multi-mode vibrational coupling signal) may result from vibrational coupling between the first, second, and third vibrational modes of the particular molecule of interest in the sample 150. The IVC signal 162 may be sent to an optical receiver 200 for measurement. Measurement of an IVC signal 162 produced by pump and Stokes beam having three pump-Stokes frequency offsets may be performed in a manner similar to the measurements of the IVC signals 162 illustrated in any of FIGS. 19-36 and described herein. For example, the IVC signal 162 in FIG. 40 may be coherently mixed with the probe beam 120*pr* at a detector 220 to produce a photocurrent signal. The photocurrent signal may be sent to detection electronics 230, which may produce an output signal 240 corresponding to the photocurrent signal.

Figure 41:
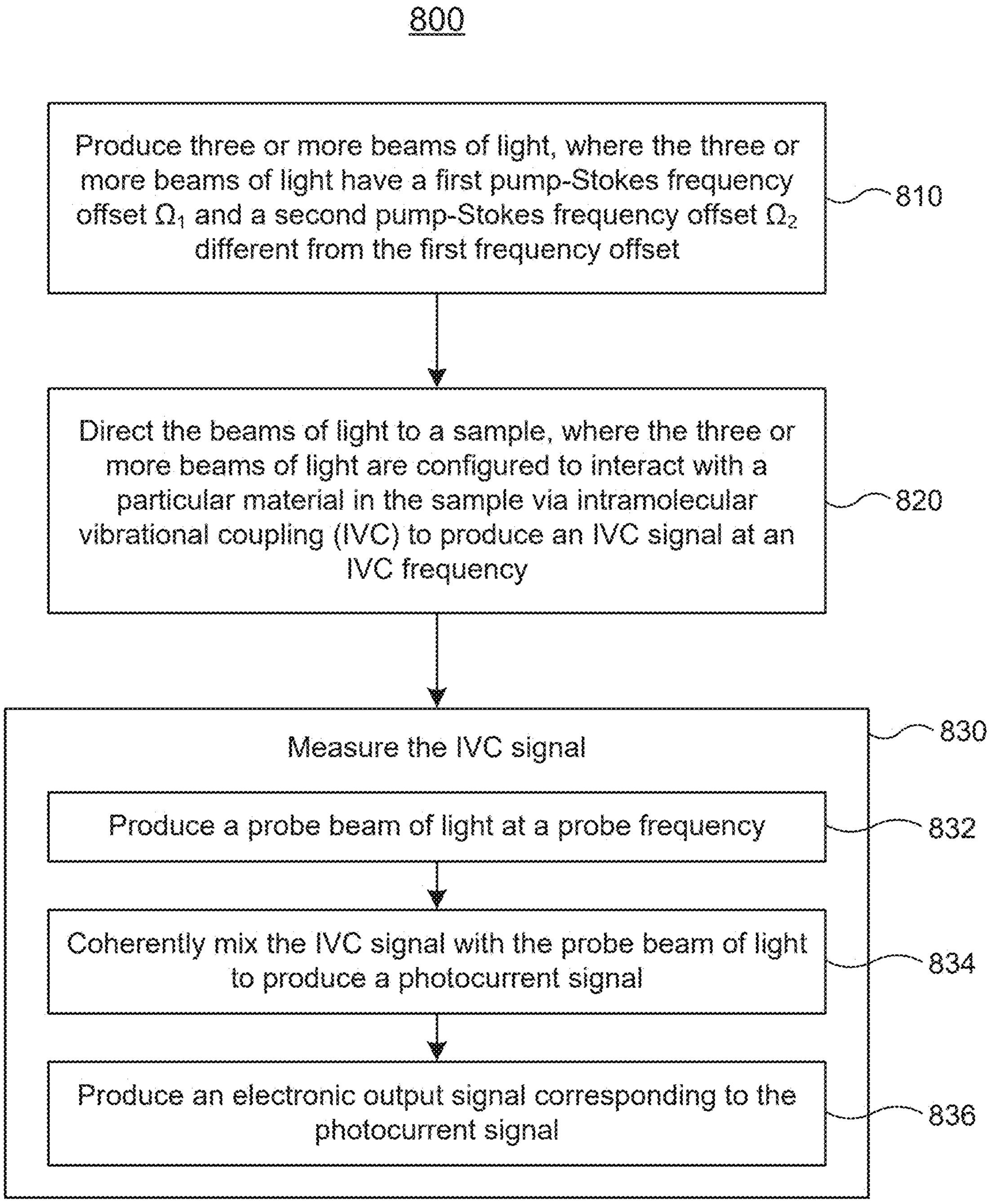
FIG. 41 illustrates an example method for measuring an IVC signal.

FIG. 41 illustrates an example method 800 for measuring an IVC signal 162. The method may be performed by a Raman spectroscopy system as described herein. For example, the method may be performed by the Raman spectroscopy system 100 illustrated in any of FIGS. 19, 23, 27, and 37. The method may begin at step 810 by producing three or more beams of light 120, where the three or more beams of light have a first pump-Stokes frequency offset $\Omega_1$ and a second pump-Stokes frequency offset $\Omega_2$ that is different from the first frequency offset. For example, the three or more beams of light may be produced by a pump light source 111*pu* and a Stokes light source 111S and may include: (i) three beams of light (e.g., one pump beam and two Stokes beams; or two pump beams and one Stokes beam), (ii) four beams of light (e.g., two pump beams and two Stokes beams), or (iii) any other suitable combination of three or more pump and Stokes beams of light. The frequencies of each of the pump and Stokes beams may correspond to a wavelength between approximately 300 nm and approximately 5,000 nm, and each of the pump-Stokes frequency offsets $\Omega_1$ and $\Omega_2$ may be between approximately 5 THz and approximately 100 THz. The pump and Stokes beams of light may each be produced by a light source that includes one or more laser diodes, where each laser diode is a fixed-wavelength laser diode or a wavelength-tunable laser diode. The pump light source 111*pu* or the Stokes light source 111S may include a modulator that applies a modulation to the pump or Stokes light source or to one of the pump or Stokes beams of light so that the pump or Stokes beam of light includes pulses of light or an amplitude modulation at a particular modulation frequency F.

At step 820, the three or more beams of light are directed to a sample 150. The three or more beams of light may be directed to the sample 150 by one or more optical elements that include a free-space, fiber-optic, or waveguide-based optical element. For example, the three or more beams of light may be combined by a fiber-optic combiner 130 to produce a combined pump-Stokes beam of light 140 that is directed to a sample 150 via optical fiber 116. The three or more beams of light may interact with a particular material in the sample 150 via intramolecular vibrational coupling (IVC) to produce an IVC signal 162 at an IVC frequency ($\nu_4$). The particular material that produces the IVC signal 162 may be a particular molecule. The first pump-Stokes frequency offset $\Omega_1$ may be approximately equal to a frequency of a first vibrational mode of the molecule, and the second pump-Stokes frequency offset $\Omega_2$ may be approximately equal to a frequency of a second vibrational mode of the molecule. The IVC signal 162 may result from vibrational coupling between the first and second vibrational modes of the molecule.

At step 830, the IVC signal 162 is measured, at which point the method may end. The IVC signal 162 may be collected from the sample 150 by one or more free-space, fiber-optic, or waveguide-based optical elements and directed to an optical receiver 200 for measurement. Measurement of the IVC signal 162, which may be performed by an optical receiver 200, includes steps 832, 834, and 836. At step 832, a probe beam of light 120*pr* at a probe frequency ($\nu_3$) is produced. The probe beam of light 120*pr* may be produced by a probe light source 111*pr* that includes one or more laser diodes, where each laser diode is a fixed-wavelength laser diode or a wavelength-tunable laser diode. At step 834, the IVC signal 162 is coherently mixed with the probe beam of light 120*pr* to produce a photocurrent signal i. The IVC signal and the probe beam may be coherently mixed at a detector 220 of an optical receiver 200. A frequency of at least a portion of the photocurrent signal i may be approximately equal to $|\nu_4-\nu_3|$, which is the frequency offset $\Delta f$ between the IVC and probe frequencies. At step 836, an electronic output signal 240 corresponding to the photocurrent signal i is produced. The electronic output signal 240 may be produced by an electronic circuit 230 (which may be referred to as detection electronics) that may include an electronic amplifier 232 and a digitizer 236. The electronic output signal 240 may be sent to a processor, and the processor may determine, based on the electronic output signal, a size of the IVC signal 162. Additionally or alternatively, the processor may determine, based on the electronic output signal 240, (i) that the particular material is present in the sample 150 or (ii) an amount or a concentration of the particular material in the sample.

Figure 42:
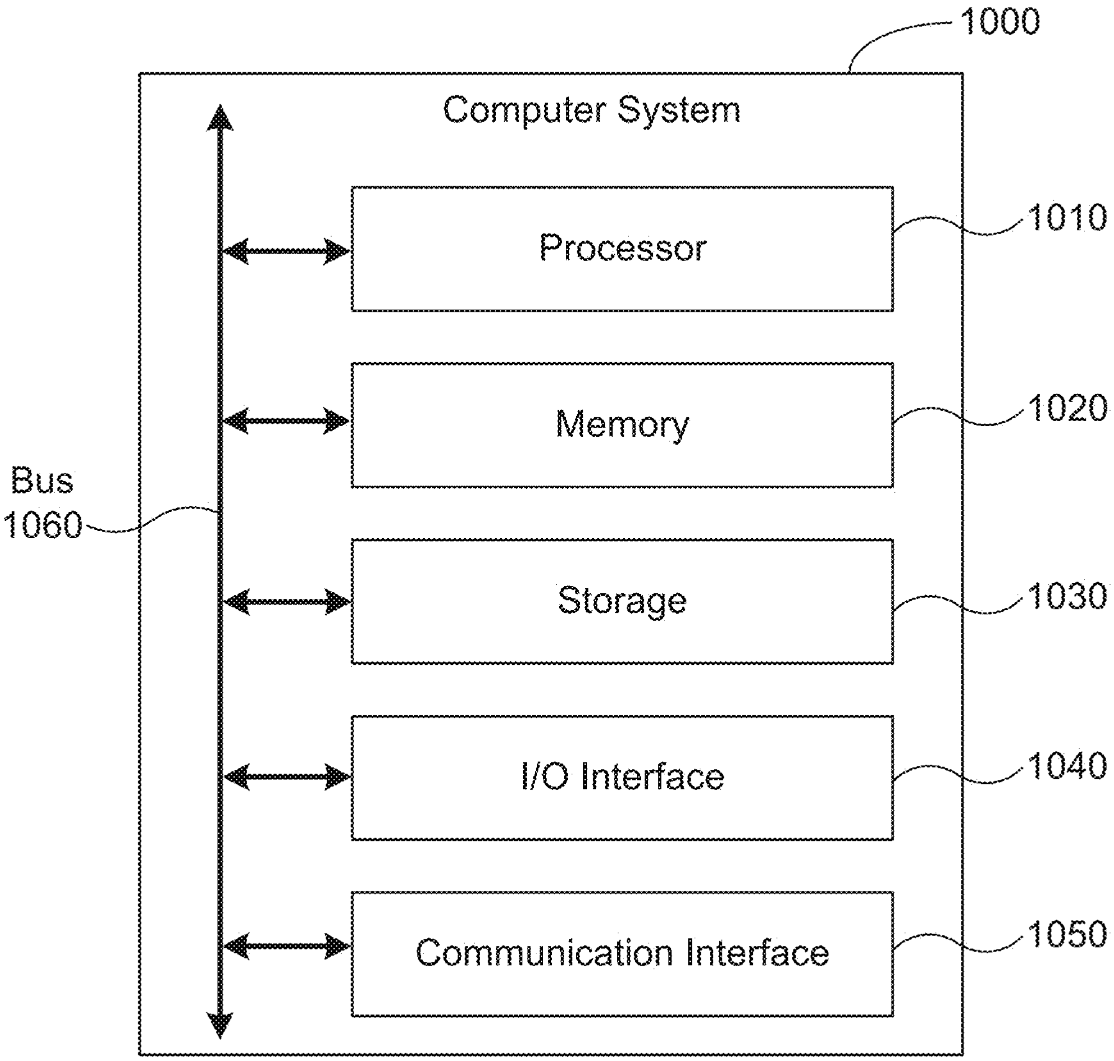
FIG. 42 illustrates an example computer system.

FIG. 42 illustrates an example computer system 1000. One or more computer systems 1000 may perform one or more steps of one or more methods described or illustrated herein. One or more computer systems 1000 may provide functionality described or illustrated herein. Software running on one or more computer systems 1000 may perform one or more steps of one or more methods described or illustrated herein or may provide functionality described or illustrated herein. A computer system 1000 may include or may be referred to as a processor, a controller, a computing device, a computing system, a computer, or a data-processing apparatus. Herein, reference to a computer system may encompass one or more computer systems, where appropriate. A processor of a Raman spectroscopy system 100 may include or may be referred to as a computer system, a controller, a computing device, a computing system, a computer, or a data-processing apparatus.

Computer system 1000 may take any suitable physical form. As an example, computer system 1000 may be an embedded computer system, a system-on-chip (SOC), an application-specific integrated circuit (ASIC), a field-programmable gate array (FPGA), a single-board computer system (SBC), a desktop computer system, a laptop or notebook computer system, a graphics processing unit (GPU), a mainframe, a mesh of computer systems, a server, a tablet computer system, or any suitable combination of two or more of these. As another example, all or part of computer system 1000 may be combined with, coupled to, or integrated into a variety of devices, including, but not limited to, a medical device, wearable device, camera, camcorder, personal digital assistant (PDA), mobile telephone, smartphone, electronic reading device (e.g., an e-reader), game console, smart watch, clock, calculator, television monitor, flat-panel display, computer monitor, eyewear, or head-mounted display. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

As illustrated in the example of FIG. 42, computer system 1000 may include a processor 1010, memory 1020, storage 1030, an input/output (I/O) interface 1040, a communication interface 1050, or a bus 1060. Computer system 1000 may include any suitable number of any suitable components in any suitable arrangement.

Processor 1010 may include hardware for executing instructions, such as those making up a computer program. As an example, to execute instructions, processor 1010 may retrieve (or fetch) the instructions from an internal register, an internal cache, memory 1020, or storage 1030; decode and execute them; and then write one or more results to an internal register, an internal cache, memory 1020, or storage 1030. A processor 1010 may include one or more internal caches for data, instructions, or addresses. A processor 1010 may include one or more internal registers for data, instructions, or addresses. Processor 1010 may include any suitable number of any suitable internal registers, where appropriate. Where appropriate, processor 1010 may include one or more arithmetic logic units (ALUs); may be a multi-core processor; or may include one or more processors 1010.

Memory 1020 may include main memory for storing instructions for processor 1010 to execute or data for processor 1010 to operate on. As an example, computer system 1000 may load instructions from storage 1030 or another source (such as, for example, another computer system 1000) to memory 1020. Processor 1010 may then load the instructions from memory 1020 to an internal register or internal cache. To execute the instructions, processor 1010 may retrieve the instructions from the internal register or internal cache and decode them. During or after execution of the instructions, processor 1010 may write one or more results (which may be intermediate or final results) to the internal register or internal cache. Processor 1010 may then write one or more of those results to memory 1020. One or more memory buses (which may each include an address bus and a data bus) may couple processor 1010 to memory 1020. Bus 1060 may include one or more memory buses. Memory 1020 may include random access memory (RAM). This RAM may be volatile memory, where appropriate. Where appropriate, this RAM may be dynamic RAM (DRAM) or static RAM (SRAM). Memory 1020 may include one or more memories 1020, where appropriate.

Storage 1030 may include mass storage for data or instructions. As an example, storage 1030 may include a hard disk drive (HDD), a floppy disk drive, flash memory, an optical disc, a magneto-optical disc, magnetic tape, or a Universal Serial Bus (USB) drive or a combination of two or more of these. Storage 1030 may include removable or non-removable (or fixed) media, where appropriate. Storage 1030 may be internal or external to computer system 1000, where appropriate. Storage 1030 may be non-volatile, solid-state memory. Storage 1030 may include read-only memory (ROM). Where appropriate, this ROM may be mask ROM (MROM), programmable ROM (PROM), erasable PROM (EPROM), electrically erasable PROM (EEPROM), flash memory, or a combination of two or more of these. Storage 1030 may include one or more storage control units facilitating communication between processor 1010 and storage 1030, where appropriate. Where appropriate, storage 1030 may include one or more storages 1030.

I/O interface 1040 may include hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example, an I/O device may include a keyboard, keypad, microphone, monitor, mouse, printer, scanner, speaker, camera, stylus, tablet, touch screen, trackball, another suitable I/O device, or any suitable combination of two or more of these. An I/O device may include one or more sensors. Where appropriate, I/O interface 1040 may include one or more device or software drivers enabling processor 1010 to drive one or more of these I/O devices. I/O interface 1040 may include one or more I/O interfaces 1040, where appropriate.

Communication interface 1050 may include hardware, software, or both providing one or more interfaces for communication (such as, for example, packet-based communication) between computer system 1000 and one or more other computer systems 1000 or one or more networks. As an example, communication interface 1050 may include a network interface controller (NIC) or network adapter for communicating with an Ethernet or other wire-based network or a wireless NIC (WNIC); a wireless adapter for communicating with a wireless network, such as a WI-FI network; or an optical transmitter (e.g., a laser or a light-emitting diode) or an optical receiver (e.g., a photodetector) for communicating using fiber-optic communication or free-space optical communication. Computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a Worldwide Interoperability for Microwave Access (WiMAX) network, a cellular telephone network (such as, for example, a Global System for Mobile Communications (GSM) network), or other suitable wireless network or a combination of two or more of these. As another example, computer system 1000 may communicate using fiber-optic communication based on 100 Gigabit Ethernet (100 GbE), 10 Gigabit Ethernet (10 GbE), or Synchronous Optical Networking (SONET). Computer system 1000 may include any suitable communication interface 1050 for any of these networks, where appropriate. Communication interface 1050 may include one or more communication interfaces 1050, where appropriate.

Bus 1060 may include hardware, software, or both coupling components of computer system 1000 to each other. As an example, bus 1060 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local bus (VLB), or another suitable bus or a combination of two or more of these. Bus 1060 may include one or more buses 1060, where appropriate.

Various modules, circuits, systems, methods, or algorithm steps described in connection with the implementations disclosed herein may be implemented as electronic hardware, computer software, or any suitable combination of hardware and software. Computer software (which may be referred to as software, computer-executable code, computer code, a computer program, computer instructions, or instructions) may be used to perform various functions described or illustrated herein, and computer software may be configured to be executed by or to control the operation of computer system 1000. As an example, computer software may include instructions configured to be executed by processor 1010. Owing to the interchangeability of hardware and software, the various illustrative logical blocks, modules, circuits, or algorithm steps have been described generally in terms of functionality. Whether such functionality is implemented in hardware, software, or a combination of hardware and software may depend upon the particular application or design constraints imposed on the overall system.

A computing device may be used to implement various modules, circuits, systems, methods, or algorithm steps disclosed herein. As an example, all or part of a module, circuit, system, method, or algorithm disclosed herein may be implemented or performed by a general-purpose single- or multi-chip processor, a digital signal processor (DSP), an ASIC, a FPGA, a GPU, any other suitable programmable-logic device, discrete gate or transistor logic, discrete hardware components, or any suitable combination thereof. A general-purpose processor may be a microprocessor, or any conventional processor, controller, microcontroller, GPU, or state machine. A processor may also be implemented as a combination of computing devices, e.g., a combination of a DSP and a microprocessor, a plurality of microprocessors, one or more microprocessors in conjunction with a DSP core, or any other such configuration.

One or more implementations of the subject matter described herein may be implemented as one or more computer programs (e.g., one or more modules of computer-program instructions encoded or stored on a computer-readable non-transitory storage medium). As an example, the steps of a method or algorithm disclosed herein may be implemented in a processor-executable software module which may reside on a computer-readable non-transitory storage medium. A computer-readable non-transitory storage medium may include any suitable storage medium that may be used to store or transfer computer software and that may be accessed by a computer system. Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs (e.g., compact discs (CDs), CD-ROM, digital versatile discs (DVDs), Blu-ray discs, or laser discs), optical disc drives (ODDs), magneto-optical discs, magneto-optical drives, floppy diskettes, floppy disk drives (FDDs), magnetic tapes, flash memories, solid-state drives (SSDs), RAM, RAM-drives, ROM, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Certain features described herein in the context of separate implementations may also be combined and implemented in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

While operations may be depicted in the drawings as occurring in a particular order, this should not be understood as requiring that such operations be performed in the particular order shown or in sequential order, or that all operations be performed. Further, the drawings may schematically depict one more example processes or methods in the form of a flow diagram or a sequence diagram. However, other operations that are not depicted may be incorporated in the example processes or methods that are schematically illustrated. For example, one or more additional operations may be performed before, after, simultaneously with, or between any of the illustrated operations. Moreover, one or more operations depicted in a diagram may be repeated, where appropriate. Additionally, operations depicted in a diagram may be performed in any suitable order. Furthermore, although particular components, devices, or systems are described herein as carrying out particular operations, any suitable combination of any suitable components, devices, or systems may be used to carry out any suitable operation or combination of operations. In certain circumstances, multitasking or parallel processing operations may be performed. Moreover, the separation of various system components in the implementations described herein should not be understood as requiring such separation in all implementations, and it should be understood that the described program components and systems may be integrated together in a single software product or packaged into multiple software products.

Various embodiments have been described in connection with the accompanying drawings. However, it should be understood that the figures may not necessarily be drawn to scale. As an example, distances or angles depicted in the figures are illustrative and may not necessarily bear an exact relationship to actual dimensions or layout of the devices illustrated.

One or more of the figures described herein may include example data that is prophetic. For example, the graphs illustrated in any of FIGS. 8, 16-18, 20-22, 24-26, 28-36, and 38-40 may include or may be referred to as prophetic examples.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes or illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend.

The term "or" as used herein is to be interpreted as an inclusive or meaning any one or any combination, unless expressly indicated otherwise or indicated otherwise by context. Therefore, herein, the expression "A or B" means "A, B, or both A and B." As another example, herein, "A, B, or C" means at least one of the following: A; B; C; A and B; A and C; B and C; A, B, and C. An exception to this definition will occur if a combination of elements, devices, steps, or operations is in some way inherently mutually exclusive.

As used herein, words of approximation such as, without limitation, "approximately, "substantially," or "about" refer to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as having the required characteristics or capabilities of the unmodified feature. In general, but subject to the preceding discussion, a numerical value herein that is modified by a word of approximation such as "approximately" may vary from the stated value by ±0.5%, ±1%, ±2%, ±3%, ±4%, ±5%, ±10%, ±12%, or ±15%. The term "substantially constant" refers to a value that varies by less than a particular amount over any suitable time interval. For example, a value that is substantially constant may vary by less than or equal to 20%, 10%, 1%, 0.5%, or 0.1% over a time interval of approximately $10^4$ s, $10^3$ s, $10^2$ s, 10 s, 1 s, 100 ms, 10 ms, 1 ms, 100 μs, 10 μs, or 1 μs. The term "substantially constant" may be applied to any suitable value, such as for example, an optical power, an electrical current, a wavelength, an optical or electrical frequency, or an optical or electrical phase.

As used herein, the terms "first," "second," "third," etc. may be used as labels for nouns that they precede, and these terms may not necessarily imply a particular ordering (e.g., a particular spatial, temporal, or logical ordering). As an example, a system may be described as determining a "first result" and a "second result," and the terms "first" and "second" may not necessarily imply that the first result is determined before the second result.

As used herein, the terms "based on" and "based at least in part on" may be used to describe or present one or more factors that affect a determination, and these terms may not exclude additional factors that may affect a determination. A determination may be based solely on those factors which are presented or may be based at least in part on those factors. The phrase "determine A based on B" indicates that B is a factor that affects the determination of A. In some instances, other factors may also contribute to the determination of A. In other instances, A may be determined based solely on B.

Various example aspects included in this disclosure may be presented in a range format. It should be understood that a description in range format is merely for convenience and brevity and should not be construed as an inflexible limitation on the scope of a disclosed aspect. Accordingly, the description of a range should be considered to have specifically disclosed all suitable sub-ranges as well as individual numerical values within that range, unless expressly indicated otherwise or indicated otherwise by context. For example, description of a range such as from 1 to 6 should be considered to have specifically disclosed sub-ranges such as from 1 to 3, from 1 to 4, from 1 to 5, from 2 to 4, from 2 to 6, from 3 to 6, etc., as well as individual values within that range, for example, 1.1, 2, 2.3, 5, and 5.9.

Although the foregoing embodiments have been described in some detail for purposes of clarity of understanding, the invention is not limited to the details provided. There may be numerous alternative ways of implementing the invention. The disclosed embodiments are illustrative and not restrictive.

The invention claimed is:

1. A system comprising:

a pump light source and a Stokes light source configured to produce three or more beams of light, wherein the three or more beams of light have a first pump-Stokes frequency offset $\Omega_1$ and a second pump-Stokes frequency offset $\Omega_2$ different from the first frequency offset;

one or more optical elements configured to direct the beams of light to a sample, wherein the three or more beams of light are configured to interact with a particular material in the sample via intramolecular vibrational coupling (IVC) to produce an IVC signal at an IVC frequency; and an optical receiver configured to measure the IVC signal, the optical receiver comprising:

a probe light source configured to produce a probe beam of light at a probe frequency;

an optical detector configured to coherently mix the IVC signal with the probe beam of light to produce a photocurrent signal; and an electronic circuit configured to produce an electronic output signal corresponding to the photocurrent signal.

2. The system of claim 1, wherein the particular material comprises a plurality of a molecule having a particular composition.

3. The system of claim 2, wherein:

the first pump-Stokes frequency offset $\Omega_1$ is approximately equal to a frequency of a first vibrational mode of the molecule;

the second pump-Stokes frequency offset $\Omega_2$ is approximately equal to a frequency of a second vibrational mode of the molecule; and the IVC signal results from vibrational coupling between the first and second vibrational modes of the molecule.

4. The system of claim 1, wherein:

the IVC frequency ($\nu_4$) and the probe frequency ($\nu_3$) are offset by a frequency offset of $|\nu_4-\nu_3|$; and a frequency of at least a portion of the photocurrent signal is approximately equal to $|\nu_4-\nu_3|$.

5. The system of claim 4, wherein the probe frequency is selected so that the IVC-probe frequency offset $|\nu_4-\nu_3|$ is less than an upper cutoff frequency of the optical receiver.

6. The system of claim 4, further comprising a processor configured to send an instruction to adjust the probe frequency so that the IVC-probe frequency offset $|\nu_4-\nu_3|$ is approximately equal to a particular target frequency.

7. The system of claim 1, wherein the IVC frequency is less than a frequency of a pump beam of light produced by the pump light source.

8. The system of claim 1, wherein the system further comprises a processor configured to determine, based on the electronic output signal, (i) that the particular material is present in the sample or (ii) an amount or a concentration of the particular material in the sample.

9. The system of claim 1, wherein:

the sample is a first sample, and the system is further configured to measure a second sample, wherein the second sample produces little to no IVC signal in response to the three or more beams of light; and the system further comprises a processor configured to determine, based on a second electronic output signal produced by the optical receiver, that the second sample contains little to none of the particular material.

10. The system of claim 1, wherein:

prior to producing the three or more beams of light, the pump and Stokes light sources are configured to produce a pump beam of light and a Stokes beam of light having the first pump-Stokes frequency offset or the second pump-Stokes frequency offset; and prior to measuring the IVC signal, the optical receiver is configured to measure a Raman signal produced by coherent Raman scattering of the pump and Stokes beams of light at the sample.

11. The system of claim 1, wherein:

the IVC signal at the IVC frequency is a first IVC signal at a first IVC frequency;

the three or more beams of light are further configured to interact with the material in the sample via intramolecular vibrational coupling to produce a second IVC signal at a second IVC frequency; and the optical receiver is further configured to measure the second IVC signal, wherein:

the probe light source is further configured to change the probe frequency to a second probe frequency;

the optical detector is further configured to coherently mix the second IVC signal with the probe beam of light at the second probe frequency to produce a second photocurrent signal; and the electronic circuit is further configured to produce a second electronic output signal corresponding to the second photocurrent signal.

12. The system of claim 1, wherein the pump light source or the Stokes light source comprises a modulator configured to apply a modulation at a particular modulation frequency so that one of the three or more beams of light comprises an amplitude modulation at the particular modulation frequency.

13. The system of claim 12, wherein the amplitude modulation of the beam of light results in the IVC signal having a corresponding amplitude modulation at the modulation frequency.

14. The system of claim 12, wherein the photocurrent signal comprises an amplitude modulation at the modulation frequency, wherein the electronic output signal comprises a value corresponding to a size of the photocurrent-signal amplitude modulation.

15. The system of claim 14, wherein the electronic circuit comprises a lock-in amplifier or a boxcar averager configured to:

receive a voltage signal corresponding to the photocurrent signal; and determine, based on the voltage signal, the value corresponding to the size of the photocurrent-signal amplitude modulation.

16. The system of claim 12, wherein:

the IVC frequency ($\nu_4$) and the probe frequency ($\nu_3$) are offset by a frequency offset of $\Delta f=|\nu_4-\nu_3|$;

the modulation frequency is F; and a frequency-domain representation of a voltage signal corresponding to the photocurrent signal comprises:

a central peak at the frequency $\Delta f$;

a lower sideband at frequency $\Delta f-F$; and an upper sideband at frequency $\Delta f+F$.

17. The system of claim 16, wherein:

the electronic output signal comprises a time-domain digital representation of the voltage signal corresponding to the photocurrent signal; and the system further comprises a processor configured to:

determine the frequency-domain representation of the voltage signal; and determine one or more characteristics of the central peak, lower sideband, or upper sideband based on the frequency-domain representation of the voltage signal, the characteristics comprising a peak value, an average value, an area, a linewidth, and a center frequency.

18. The system of claim 12, wherein:

the modulator is a first modulator, and the particular modulation frequency is a first modulation frequency; and the pump light source or the Stokes light source further comprises a second modulator configured to apply a modulation at a second modulation frequency so that another one of the three or more beams of light comprises an amplitude modulation at the second modulation frequency.

19. The system of claim 1, wherein:

the electronic circuit comprises:

an electronic amplifier configured to produce a voltage signal that corresponds to the photocurrent signal, wherein the photocurrent and voltage signals are time-domain signals; and a digitizer configured to produce a time-domain digital representation of the voltage signal, wherein the electronic output signal comprises the digital representation of the voltage signal; and the system further comprises a processor configured to determine a frequency-domain representation of the voltage signal based on the time-domain digital representation of the voltage signal.

20. The system of claim 1, wherein at least a portion of the photocurrent signal corresponds to a size of the IVC signal.

21. The system of claim 1, wherein the optical receiver is further configured to measure a time associated with a decay of the IVC signal.

22. The system of claim 1, wherein:

the pump light source is configured to produce a pump beam of light at a pump frequency;

the Stokes light source is configured to:

produce a first Stokes beam of light at a first Stokes frequency, wherein the pump and first Stokes frequencies are offset by the first frequency offset $\Omega_1$; and produce a second Stokes beam of light at a second Stokes frequency, wherein the pump and second Stokes frequencies are offset by the second frequency offset $\Omega_2$; and the three or more beams of light comprise the pump beam of light, the first Stokes beam of light, and the second Stokes beam of light.

23. The system of claim 1, wherein the system operates in a transmission mode, wherein the three or more beams of light are directed to propagate through the sample.

24. A method comprising:

producing three or more beams of light, wherein the three or more beams of light have a first pump-Stokes frequency offset $\Omega_1$ and a second pump-Stokes frequency offset $\Omega_2$ different from the first frequency offset;

directing the beams of light to a sample, wherein the three or more beams of light are configured to interact with a particular material in the sample via intramolecular vibrational coupling (IVC) to produce an IVC signal at an IVC frequency; and measuring the IVC signal, comprising:

producing a probe beam of light at a probe frequency;

coherently mixing the IVC signal with the probe beam of light to produce a photocurrent signal; and producing an electronic output signal corresponding to the photocurrent signal.

25. One or more computer-readable non-transitory storage media embodying software that is operable when executed to:

produce three or more beams of light, wherein the three or more beams of light have a first pump-Stokes frequency offset $\Omega_1$ and a second pump-Stokes frequency offset $\Omega_2$ different from the first frequency offset;

direct the beams of light to a sample, wherein the three or more beams of light are configured to interact with a particular material in the sample via intramolecular vibrational coupling (IVC) to produce an IVC signal at an IVC frequency; and measure the IVC signal, comprising:

produce a probe beam of light at a probe frequency;

coherently mix the IVC signal with the probe beam of light to produce a photocurrent signal; and produce an electronic output signal corresponding to the photocurrent signal.

* * * * *